United States Patent [19]

Faulkerson et al.

[11] Patent Number: 4,949,391

[45] Date of Patent: Aug. 14, 1990

[54] ADAPTIVE IMAGE ACQUISITION SYSTEM

[75] Inventors: James L. Faulkerson, Woodside; Raymond L. Picard, Scotts Valley; Edward J. Menard, Sunnyvale; Sanford M. Bennett, Mountain View; Timothy J. McCarthy, San Jose; Edwin S. Foden, Sunnyvale; Michael A. Gipe, Cupertino; Allan A. Moluf, San Jose; Michael W. Jacobs, Sunnyvale; Bruce E. Boatner, San Jose, all of Calif.

[73] Assignee: Everex Ti Corporation, Fremont, Calif.

[21] Appl. No.: 48,100

[22] Filed: May 8, 1987

Related U.S. Application Data

[63] Continuation-in-part of Ser. No. 912,834, Sep. 26, 1986, abandoned.

[51] Int. Cl.$^5$ ............................................. G06K 9/36
[52] U.S. Cl. .................................. 382/56; 382/34; 382/41; 382/59
[58] Field of Search .................. 382/44, 6, 59, 34, 56, 382/41, 49; 358/135, 136, 228

[56] References Cited

U.S. PATENT DOCUMENTS

| | | | |
|---|---|---|---|
| 3,379,826 | 4/1968 | Gray | 178/6 |
| 3,761,876 | 9/1973 | Flaherty et al. | 340/146.3 |
| 3,918,028 | 11/1975 | Humphrey et al. | 382/59 |
| 3,944,979 | 3/1976 | Kwok | 340/146.3 |
| 3,947,817 | 3/1976 | Requa | 340/146.3 |
| 4,005,286 | 1/1977 | Faulkner | 250/216 |
| 4,013,999 | 3/1977 | Erwin et al. | 340/146.3 |
| 4,020,463 | 4/1977 | Himmel | 340/146.3 |
| 4,024,578 | 5/1977 | Sanner et al. | 358/213 |
| 4,048,615 | 9/1977 | Chuang et al. | 340/146.3 |
| 4,048,617 | 9/1977 | Neff | 340/146.3 |
| 4,072,859 | 2/1978 | McWaters | 250/214 |
| 4,083,034 | 4/1978 | Hicks | 340/146.3 |
| 4,087,790 | 5/1978 | Neff | 340/146.3 |
| 4,093,941 | 6/1978 | Bryan et al. | 340/146.3 |
| 4,118,687 | 10/1978 | McWaters et al. | 340/146.3 |
| 4,124,797 | 12/1978 | Himmel | 382/54 |
| 4,136,332 | 1/1979 | Kadota et al. | 382/34 |
| 4,143,358 | 3/1979 | Neff | 340/146.3 |
| 4,157,533 | 6/1979 | DuVall | 340/146.3 |
| 4,162,481 | 7/1979 | DuVall | 340/146.3 |
| 4,173,015 | 10/1979 | Owens et al. | 340/146.3 |
| 4,218,703 | 8/1980 | Netravali et al. | 358/136 |
| 4,386,433 | 5/1983 | Neff | 382/48 |
| 4,402,088 | 8/1983 | McWaters et al. | 382/68 |
| 4,408,344 | 10/1983 | McWaters et al. | 382/62 |
| 4,411,016 | 10/1983 | Wakeland | 382/62 |
| 4,491,964 | 1/1985 | Sanner | 382/50 |
| 4,542,528 | 9/1985 | Sanner et al. | 382/62 |
| 4,551,717 | 11/1985 | Dreher | 340/712 |
| 4,562,468 | 12/1985 | Koga | 358/136 |
| 4,571,638 | 2/1986 | Schneider et al. | 358/293 |
| 4,601,056 | 8/1986 | Habitzreiter et al. | 382/56 |
| 4,606,068 | 8/1986 | Habitzreiter et al. | 392/56 |
| 4,635,293 | 1/1987 | Watanabe | 382/44 |
| 4,651,226 | 3/1987 | Motoori et al. | 358/228 |
| 4,688,987 | 5/1987 | Matsuda et al. | 358/136 |
| 4,691,230 | 9/1987 | Kaneko et al. | 358/136 |

Primary Examiner—Leo H. Boudreau
Assistant Examiner—Jose L. Couso
Attorney, Agent, or Firm—Roberts and Quiogue

[57] ABSTRACT

An adaptive image acquisition system employing a hand-held optical scanner or camera is disclosed. The system includes an adaptive camera exposure control system to adjust the camera exposure time to the media's reflectivity characteristics. The system assembles a "filmstrip" of images from compressed video data, wherein redundant image data appearing in successive image frames has been removed. The system employs a correlation process between successive frames to identify the redundant frame information and determined the camera velocity. By adapting the correlation process to the velocity of the camera, the effects of variations in the velocity may be substantially eliminated.

53 Claims, 37 Drawing Sheets

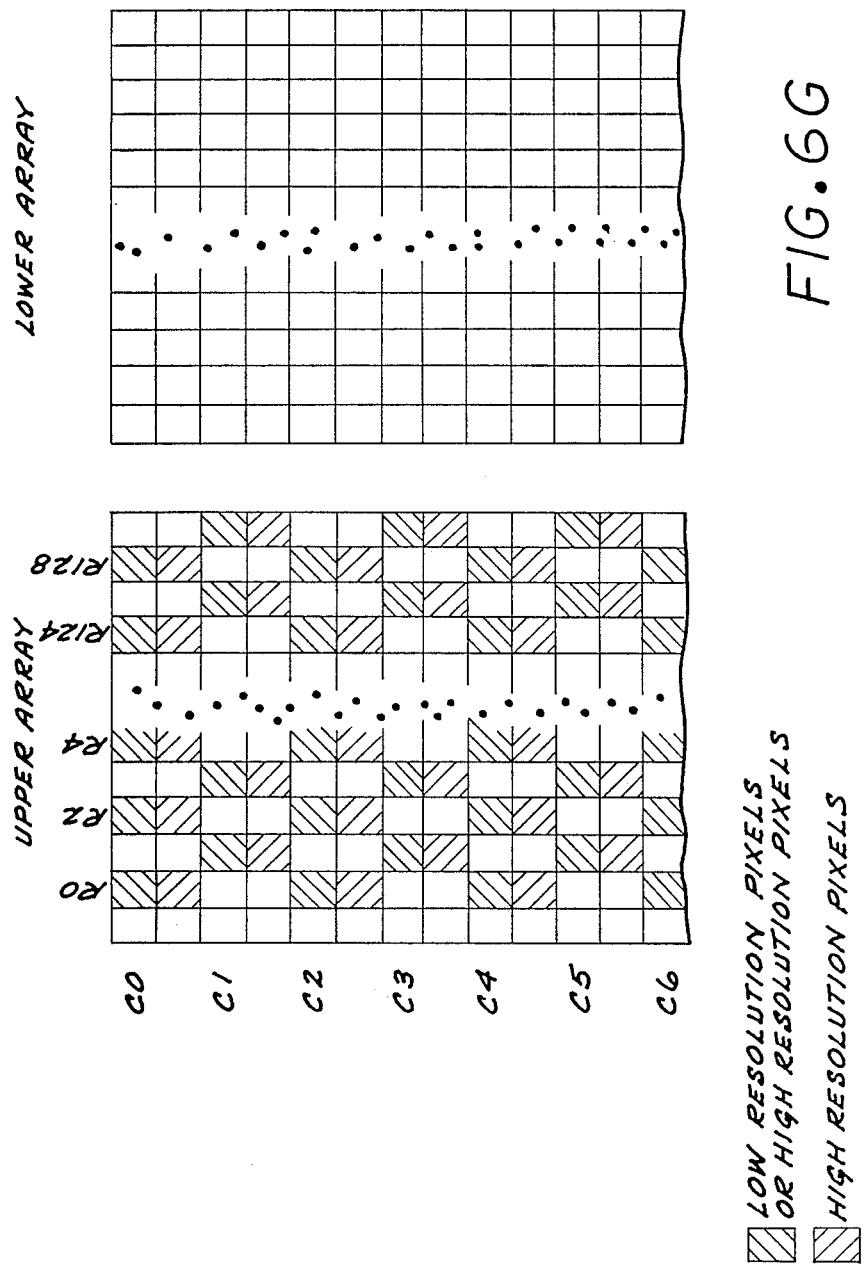

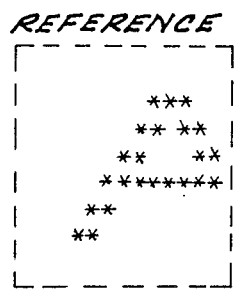
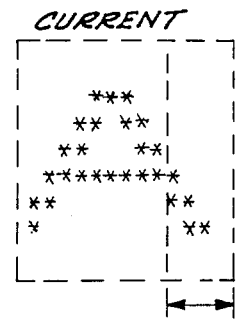
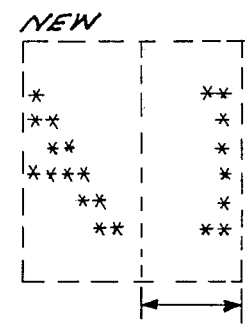
FIG.8A   FIG.8B   FIG.8C

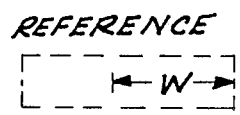
FIG.8E
FIG.8F
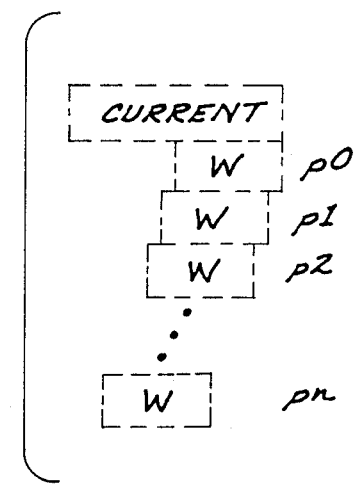
FIG.8G

CORRELATION EXAMPLE

REFERENCE WINDOW $P3 = W0 \oplus C3 + W1 \oplus C4 + W2 \oplus C5 + W3 \oplus C6 + W4 \oplus C7$ $P2 = W0 \oplus C2 + W1 \oplus C3 + W2 \oplus C4 + W3 \oplus C5 + W4 \oplus C6$ $P1 = W0 \oplus C1 + W1 \oplus C2 + W2 \oplus C3 + W3 \oplus C4 + W4 \oplus C5$ $P0 = W0 \oplus C0 + W1 \oplus C1 + W2 \oplus C2 + W3 \oplus C3 + W4 \oplus C4$

FIG. 17A

ADAPTIVE IMAGE ACQUISITION SYSTEM

This is a continuation-in-part of application serial number 912,834, filed Sept. 26, 1986 now abandoned.

The present invention relates to image acquisition systems for scanning and acquiring images of an object such as a document, and more particularly to a system providing improved exposure control and video processing of the acquired image data to remove redundant data.

Optical character recognition (OCR) systems typically employ optical scanner devices which are electronic camera units, providing electrical signals representative of an image of a document, label or other surface bearing visible information. In some systems, the scanner device is stationery, and the document or information bearing surface is passed through the field of view of the scanner optics at a controlled rate of movement and at a controlled orientation. This simplifies the task of reliably capturing images of the document, since the relative motion between the document and the scanner device may be controlled to provide sequential images of contiguous, non-overlapping portions of the document. Data representative of the images is then processed by an OCR processor to provide character data representative of recognized characters. Such systems are limited in flexibility as to the nature of the document being processed, since the document transport system is typically adapted to receive sheets of standard, uniformly sized paper.

Hand-held scanners for use with OCR systems are also commercially available and in widespread use for special purpose OCR functions, such as bar code readers. The scanners available prior to applicants' invention are understood to be limited in their usefulness for performing general OCR scanning functions. With hand-held scanners, the scan rate is controlled by the user and is, therefore, subject to variation. Another problem caused by the unknown scan rate is that of recognizing and eliminating redundant data caused by the overlap between successive images. The redundant data can lead to recognition errors and greatly increases the processing burden of handling large quantities of data on a substantially real-time basis.

Another problem inherent in the use of hand-held scanners for reading different types of documents is the possible differences in the reflectivity of the various media being scanned. If the scanner must read only one type of document, then the scanner design may assume a particular surface reflectivity and consequent exposure time for the scanner optics. Such a scanner may not satisfactorily capture images from surfaces having different reflectivity characteristics.

It is therefore an object of the present invention to provide an adaptive image acquisition system for adaptively adjusting the camera exposure time and correlating the image data in successive image frames to eliminate redundant image data.

Another object of the present invention is to provide an improved camera and video processor adapted to remove redundant data between successive camera images.

Another object of the invention is to provide a video processor arranged to process image data from a hand-held scanner so as to isolate the subsequent image data processing from variation in the camera velocity.

A further object of the invention is to provide an apparatus for adaptively adjusting the camera exposure in dependence on the the particular reflectivity of the media surface being scanned.

SUMMARY OF THE INVENTION

These and other objects, advantages and features are provided by the disclosed invention. An adaptive image acquisition system is described for optically scanning a media surface in a particular direction and providing in real time a compressed digital data representation of the scanned portion of the media surface.

The system includes a hand-held optical camera, comprising an image sensor array of photosensitive pixel elements arranged in rows and columns. In the disclosed embodiment, a camera light source is provided for illuminating the media surface and exposing the pixel elements during sequential exposure intervals of selectable duration. The image sensor array acquires images of the portion of the media surface within its field of view.

A means is provided for reading out from the image sensor after each exposure interval resulting digital data values for the pixel elements to provide sequential frames of digital image data in the form of rows and columns of digital data. In the disclosed embodiment, the digital data is in the form of bits, one state representing a white pixel, the other a black pixel.

The system further comprises a means for real time processing of successive ones of said frames of image data to remove data therefrom which is redundant to image data in the preceding image frame. The processing means includes a means for storing two successive frames, the initial or "reference" frame and the "current" frame. In this embodiment, the storing means is a DRAM.

A reference window size of N pixel value columns is determined, where the number N is less than the number of columns in each frame. Preferably, the window size is adaptively determined in dependence on the camera scan rate, so that the window size decreases as the scan rate increases. For character recognition applications, the camera is moved across the surface in a left-to-right direction.

The system further comprises a means for accessing the storing DRAM and comparing pixel element values comprising selected columns of the current frame with pixel elements comprising the N rightmost columns of the reference frame, i.e., the reference window. The system determines which columns of pixel data of the current frame are redundant to corresponding columns of data within the reference frame. This is accomplished by performing a correlation of the corresponding pixels of the current frame with the pixel values of the reference frame at a selectable number P of alignment positions of the reference window in relation to the current frame. By determining the alignment position resulting in the best match between the reference window and the current frame, the number of "new" data columns (DELTAX) is determined, which provides an indication of the camera scan rate. The number DELTAX is used to adaptively select the window size and the number of correlation positions to be used for correlation of the next successive image frame. Only the rightmost DELTAX columns of each image frame, i.e., the new data columns, are provided as the compressed video data output of the system.

Another feature of the invention is the particular correlation technique which reduces the processing time and therefore increases the quantity of image data which can be processed. By accessing the storing DRAM only once for each current frame operand and reference frame operand, the total access time is substantially reduced, thus permitting the use of slower, low cost memory. This allows relatively high resolution images to be captured and processed in real time to eliminate redundant image data.

Another feature of the system is selectable image resolution, wherein in a low resolution mode, only half the pixels of the image sensor are read, these pixels being distributed over the entire active area of the image sensor. In a high resolution mode, all active pixel elements are read, increasing the image resolution at the expense of increased processing time.

To improve the quality of the images captured by the system, an exposure control means is provided for adaptively selecting the exposure interval duration in accordance with the reflectivity of the media surface background and the sensitivity of the image sensor array. The exposure control means employs a binary search algorithm to determine the exposure interval durations which provide, in the disclosed embodiment, background images containing respectively 3% and 97% black pixels, and then calculates an optimum exposure time from these determined interval durations. The optimum duration provides a background image frame with substantially zero black pixels.

Other improvements and features are disclosed.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 6G is a further illustration of the pixel array of the image sensor, showing the pixels which are read during the low resolution mode and the high resolution mode.

FIGS. 8A-8C are diagrammatic depictions of three successive image frames, showing the respective "reference," "current" and "new" image frames. FIGS. 8E and 8F are one dimensional representations of exemplary reference and current frames. FIG. 8G illustrates various positions of the window for different position indices.

FIGS. 17A and 17B are exemplary control signal waveform diagram showing the interrelation of several control signals used to perform the simple correlation example of FIG. 8H.

DETAILED DESCRIPTION OF THE DISCLOSURE

Figure 1:
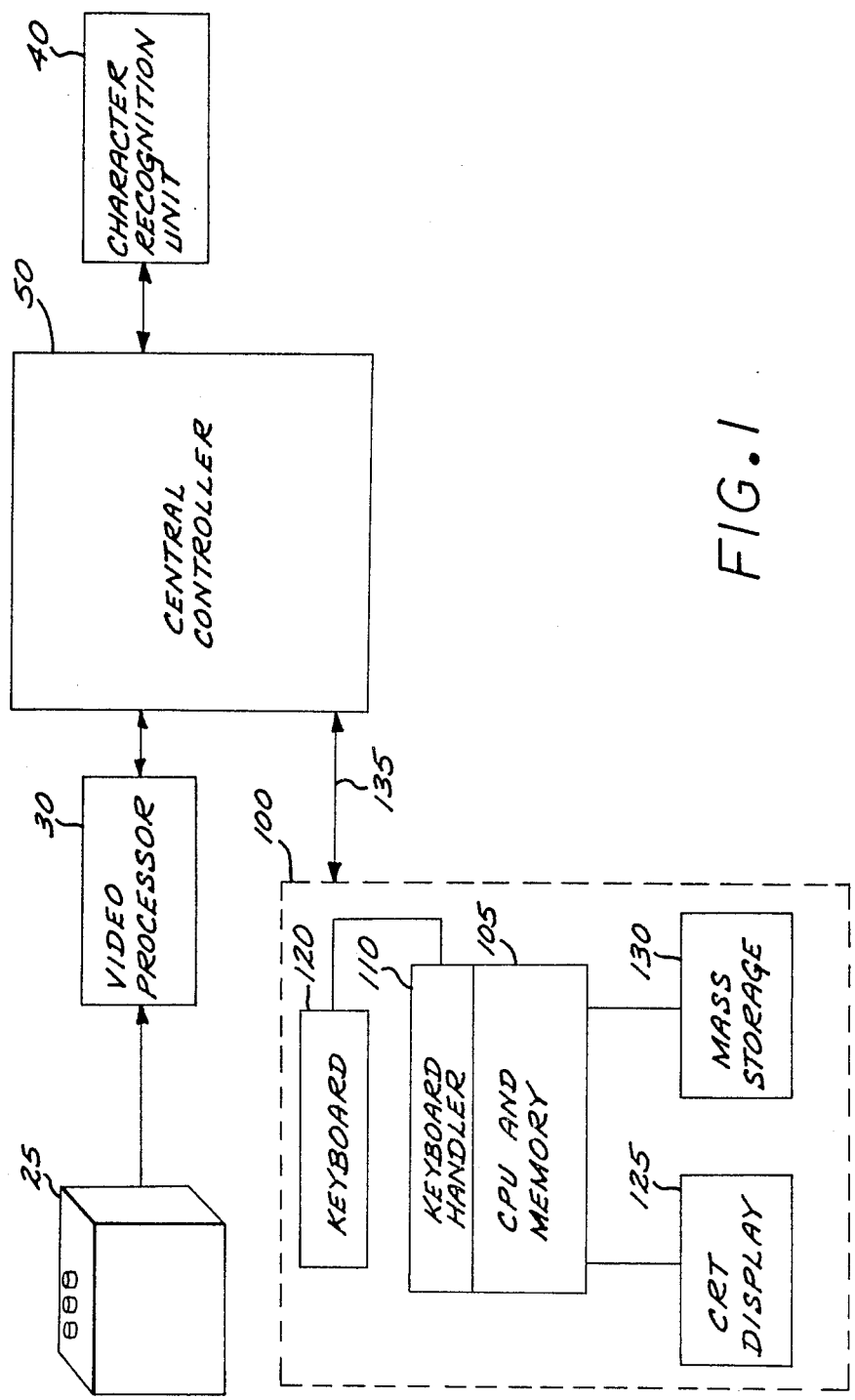
FIG. 1 is a simplified functional block diagram of an adaptive image acquisition system embodying the invention.

FIG. 1 illustrates a simplified functional block diagram of an adaptive image acquisition system employing the invention. The system of FIG. 1 comprises a hand-held optical scanner or camera 25, a video processor 30, a central controller 50, a utilization device for using the image data provided by the system, in this embodiment a character recognition unit 40, and a host computer or terminal 100. While FIG. 1 depicts a simplified functional block diagram of the system, it is to be understood that the functions of the various blocks may be implemented in a combination of hardware and software.

Figure 2:
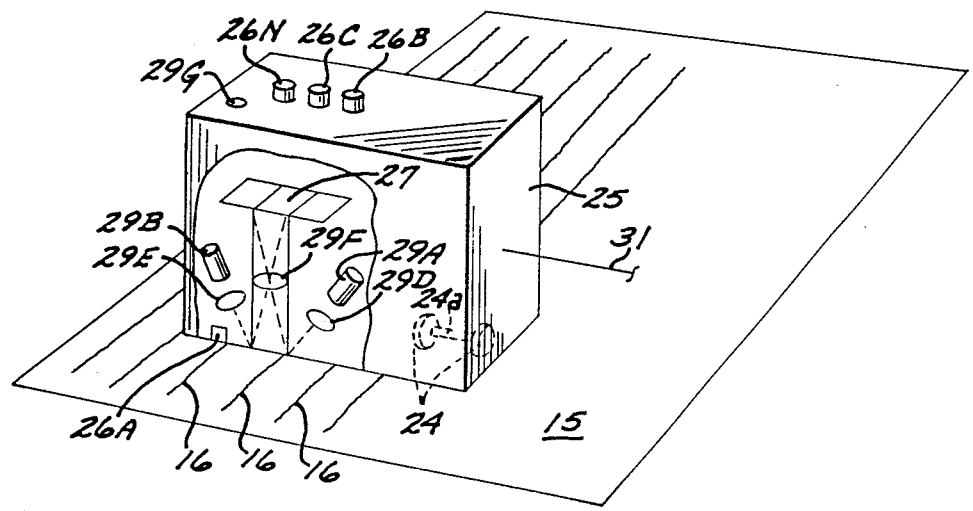
FIG. 2 is a broken-away diagrammatic perspective view of the hand-held optical scanner or camera of the system of FIG. 1, showing its principle optical elements.

As shown in FIG. 2, the camera 25 comprises a housing suitable for hand-held use which contains an optoelectronic transducer or image sensor 27 for optically and electronically capturing images, such as text which is printed, typed, or handwritten on paper 15. In one preferred embodiment, the image sensor 27 comprises a 64×256 pixel portion of a photosensitive array for capturing successive optical image frames or frame segments. An exemplary commercial device suitable for use as the photosensitive array is the model IS32A product marketed by Micron Technology, Inc., Boise, Idaho. This device is functionally a 64K dynamic random access memory, packaged to allow an image to be focused directly on the silicon die.

The camera 25 further comprises an internal light source for illuminating the surface of the medium bearing the characters. In a preferred form, the light source comprises two LED devices 29A and 29B and an LED driver circuit (not shown) capable of turning the LED devices on and off rapidly, with the turn-on time or duty cycle at which the LEDs are operated, also referred to as the camera exposure, being selectively variable in accordance with the reflectivity of the medium. Thus, the illumination source is a form of a stroboscopic light source illuminating the medium surface.

As generally depicted in FIG. 2, the light source LEDs 29A and 29B are arranged to direct the generated light via respective lens elements 29D and 29E onto the surface of the exemplary medium 15 bearing the lines 16 of text such that the reflected light will be directed by lens 29F onto the image sensor 27. An "on-page" sensor switch 26A is located as to be activated when the camera 25 is disposed in position on the media. A plurality of camera function keys 26B–N are located along a surface of the camera 25 to allow operator manipulation thereof. Key 26B is employed as a scanner enable control actuated by the scanner user to enable the optical scanning functions of the camera 25. A red/green status LED 29G provides a visual indication to the user of the camera status.

With the stroboscopic light source in operation, as the camera 25 is moved by hand along a line of characters, light generated by the light source is projected onto the medium surface and reflected therefrom onto the image sensor array, the intensity of the reflected light being spatially modulated in accordance with the particular character or characters being scanned. The tracking wheels 24 (FIG. 2) rotate about the axle 24A, and assist in maintaining the motion of the camera along the desired movement direction, i.e., along the line of text in this example. The image sensor 27 transforms the optical character data in the reflected light into digital data, with each pixel having a binary "1" or "0" associated therewith, with one value representing white and the other value representing black. After a frame has been captured by the image sensor 27, the digital image data may be read out of the sensor as a sequence of digital video data.

The video processor 30 in combination with the central controller 50 controls the camera exposure function and performs correlation functions on the successive frames of the video data to provide a sequence of compressed video data frames or frame segments, in the form of a data packet for each frame or frame segment, wherein duplicative image data have been removed from the compressed frames. The result is video data representing a sequence of frames or frame segments, analogous to a "filmstrip," which capture the image sequence, but which do not contain duplicative image data. Preferably, the video processor is embodied in one or more integrated circuits contained within the housing of the hand-held camera 25, although it may be located at an external location. The output of the video processor 30 comprises a digital bit stream of packets of video image data, correlation results packets and associated camera status data packets.

Figure 3:
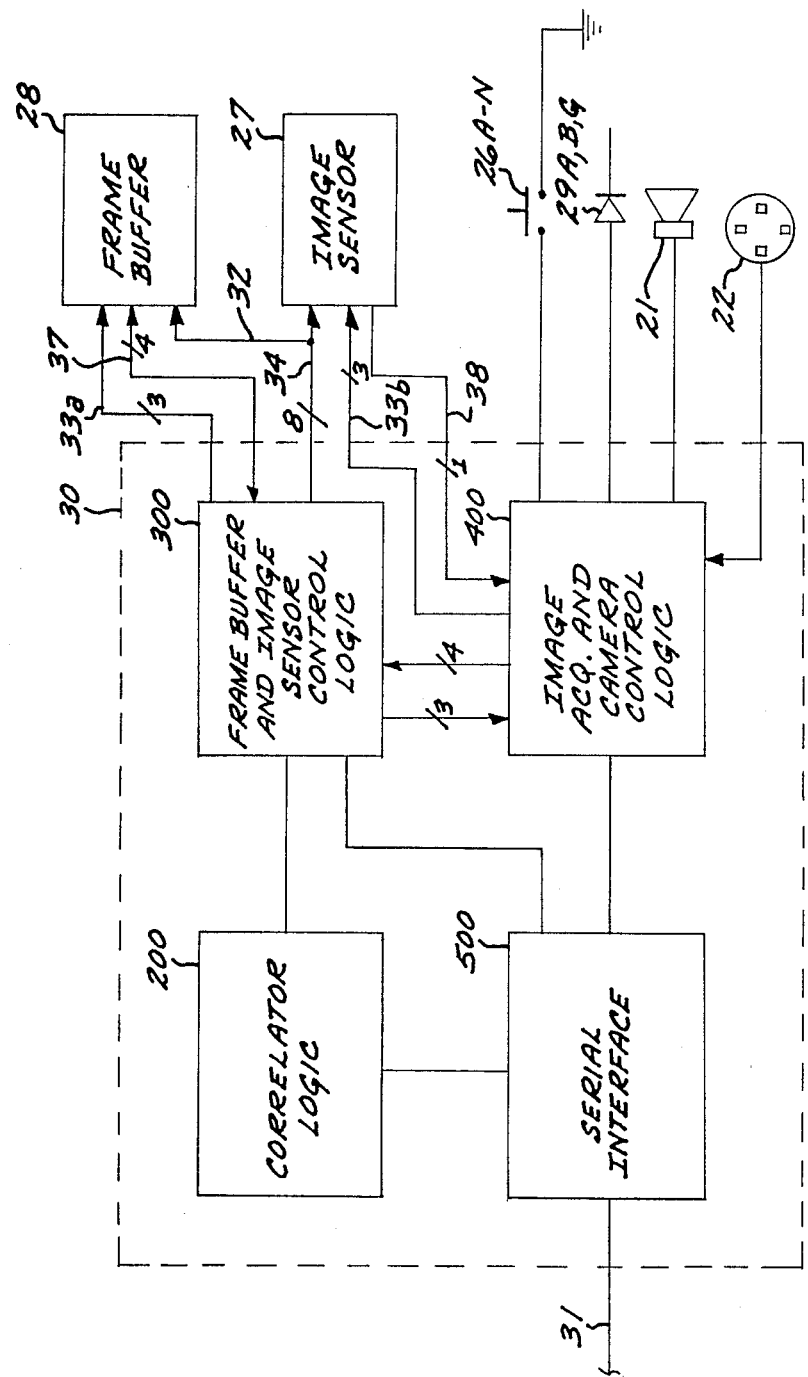
FIG. 3 is a simplified electrical schematic block diagram of the camera and video processor elements of the image acquisition system shown in FIG. 1.

Referring now to FIG. 3, a block diagram of the main electrical elements of camera 25 is shown. In this diagram the video processor 30 is shown in the form of one or more integrated circuits located within the housing of the camera 25. The camera 25 comprises the image sensor 27 and a frame buffer memory 28, which are coupled to the video processor 30 by address bus 32. A control bus 33A provides the control lines needed for the processor 30 to control the frame buffer 28. A second control bus 33B provides the control lines needed for the video processor 30 to acquire image data. Serial video data is transferred from array 27 to processor 30 over line 38.

As shown in FIG. 3, the video processor 30 comprises four modules, the correlator logic module 200, the frame buffer and image sensor control logic 300, the camera control logic 400 and the serial interface 500.

The cooperation of the array 27 and frame buffer 28 permits the video processor 30 to perform a correlation process between successive image data frames to eliminate duplicative image information. The frame buffer is employed to store the three most current frames of image data. A four-bit bi-directional data bus 37 between the video processor 30 and the frame buffer 28 is used to receive image data during correlation and write the most recently received data to the frame buffer for future correlation. By comparing two successive data frames resulting from scanning of the camera along a line of character text, for example, the image data which is overlapped, i.e., duplicated, between the two frames may be identified so that a compressed image frame may be constructed which contains only new image data, i.e., data not captured in the previous data frame. The compressed frame data is then transmitted via cable 31 to the central controller 50 for further processing.

The video processor 30 in combination with the central controller 50 also controls the camera light source, which comprises in this embodiment two light emitting diodes (LEDs) 29A and 29B. The video processor controls the application of power to the light source LEDs 29A and 29B, as well as to the red/green status LED 29G. Thus, the processor 30 may control the duty cycle and repetition rate at which the light source LEDs are operated.

The camera function keys 26B–26N comprise normally open spring-biased push-button switches in this embodiment. The status of the keys is monitored, and the event of key closure (and release in some cases) results in issuance of a particular key token signal corresponding to the particular key. The camera status data packets identifies the highest priority function key 26C–26N that is currently active, with each packet of video frame data having a corresponding status data packet. A camera function key actuation or release generates a corresponding key token signal at the chronological point of actuation, which may only be recognized by the system when the optical scanning function of the camera is not enabled, i.e., when the scanner enable control has not been activated by the user. Alternatively, the system may be configured so that the function keys will be recognized regardless of the status of the optical scanning function.

Figure 4A:
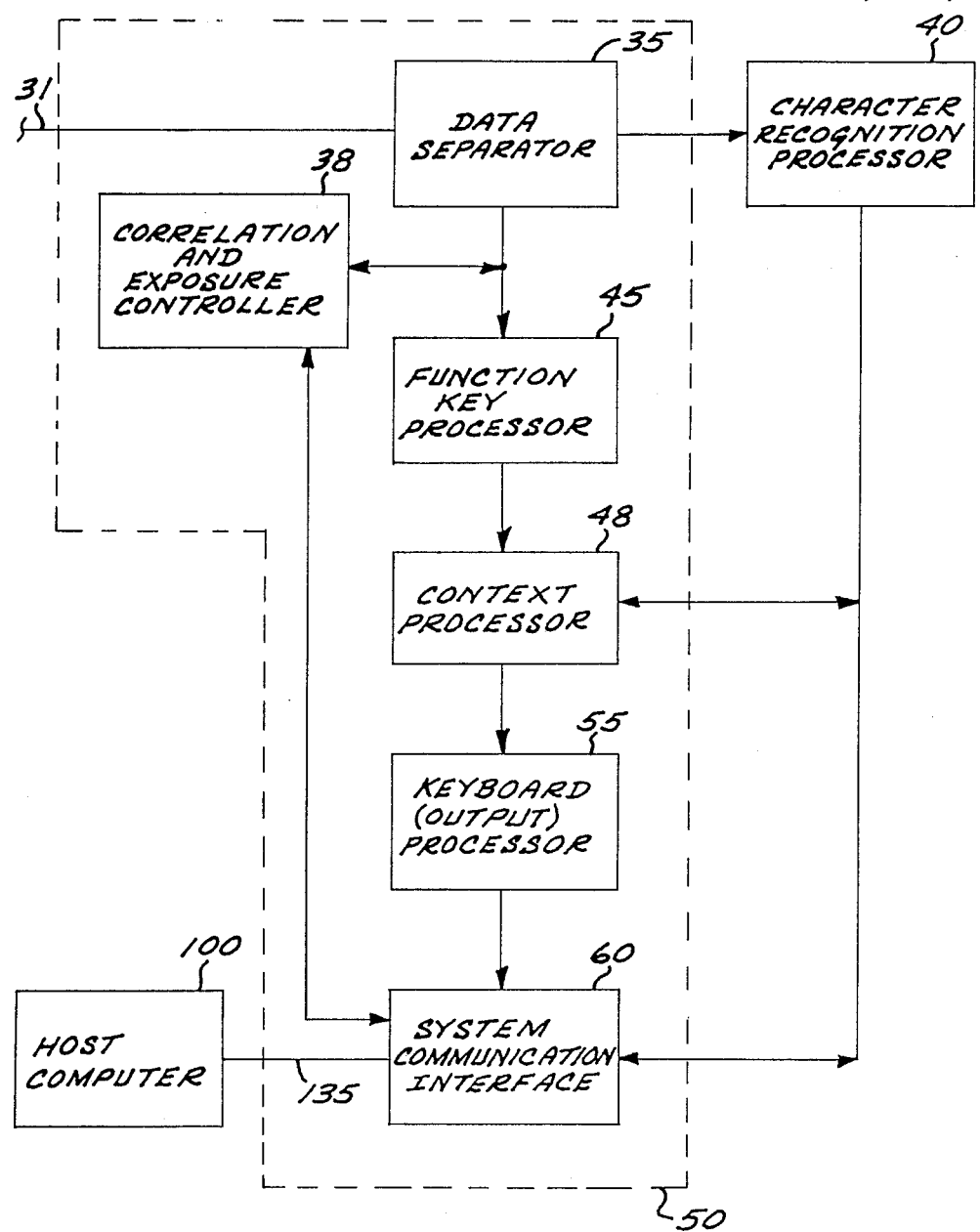
FIG. 4A is a general function diagram of the central controller of FIG. 1.

The compressed video data from the video processor 30 and camera key status signals representing the status of the camera function keys 26 are respectively coupled via a multi-wire electrical cable 31 to the central controller 50. A functional block diagram of the system controller 50 is shown in FIG. 4A. The functions carried out by the central controller 50 include data separation, function key processing, context processing, keyboard (output processing) and the interface with the host computer 100. The data separator 35 separates the data received from the video processor 30 into the compressed image data, camera status data (including function key status data) and correlation results data. The compressed image data is passed to the utilization device 40 (a character recognition processor in this example). The status data is passed to the function key processor 45. The correlation results data and status data are passed to correlation and exposure controller 38.

The compressed image data is processed by the character recognition unit 40, along with the system controller 50, to isolate and uniquely identify each image. The token stream for these images is further refined by context processing (processor 48) and translated to a set of output character codes (processor 55) which are sent through the system communication interface 60 to the host computer 100.

The system communication interface 60 communicates with host computer or terminal 100 via its CPU and peripheral bus 135. The host computer or terminal 100 may comprise, for example, a personal computer system such as the IBM PC or a terminal such as the IBM 3270 or 32XX family of terminals. In the following it will be understood that reference to computer 100 (as shown in FIG. 1) is intended in a general sense, so as to include various computer systems, including personal, mini or main frame computers with terminals, and the like. The computer 100 typically comprises central processor unit (CPU) and memory 105, keyboard 120, mass storage 130 and CRT display 125. The elements of computer 100 are conventional in nature, allowing the system user to communicate with the CPU 105 via the keys of the keyboard 120, which provides keyboard character and function key data.

In this embodiment, a software keyboard handler 110, running on the host computer 100, intercepts host computer keyboard requests, providing character codes from the system communication interface 60 if such codes are available. An alternate implementation which does not employ such a software handler is to connect the keyboard cable through a hardware keyboard emulator which would comprise a portion of the system communication interface 60. Both implementations still permit full use of host keyboard.

As described above, the keyboard processor transforms the character tokens and camera function key processor output sequences into the device-specific keyboard scan code employed by computer 100. This allows the system user to enter and edit in real time the character data being captured by the camera 25, in a manner which emulates the entry of data and function codes through the keyboard. For example, if the text being scanned by the camera 25 comprises the word "cat," the resulting output from central controller 50 to the computer 100 contains codes for the letters "c," "a" and "t" which would be generated if the word "cat" were manually entered on the keyboard 120.

The interface unit 60 is preferably arranged to allow the system user to interface with the computer 100 either through keyboard 120 or via camera 25. Thus, when entering text into the computer 100 as in a word processing application, the system user may manually enter passages of text via conventional keyboard manipulation, and, as appropriate, enter text passages from another document via the camera 25.

Figure 4B:
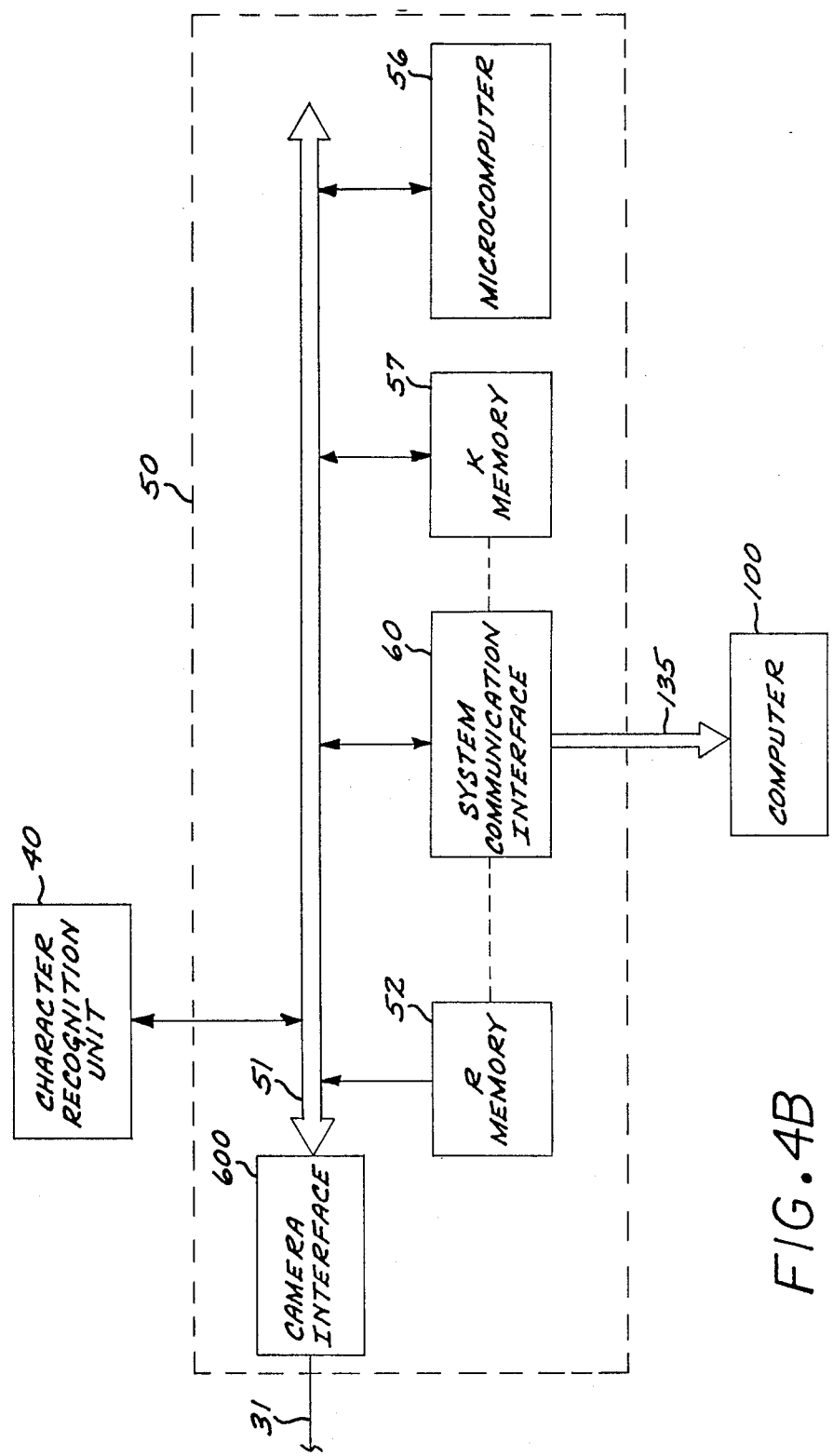
FIG. 4B is a general structural block diagram of the preferred embodiment of the central controller of FIG. 1.

Referring now to FIG. 4B, a block diagram of the structure of a preferred embodiment of controller 50 is shown. The presently preferred physical implementation of central controller 50 is as one or more integrated circuits mounted on a circuit board for a plug-in connection in an expansion board slot in the host computer, such as the IBM PC personal computer. The controller 50 comprises camera interface 600, described in further detail hereinbelow with respect to FIG. 4C. The camera interface 600 provides the function of the data separator 35 (FIG. 4A), and is connected through cable 31 to the video processor 30 and the microcomputer data and address bus 51. Also connected to the bus 51 are the R memory 52 (512 Kbytes in this embodiment), the system communication interface 60, the K memory 57 (256 Kbytes in this embodiment), and microcomputer 56. A Motorola 68000 microcomputer is advantageously employed as the microcomputer 56. The character recognition unit 40 is also coupled to the bus 51.

Figure 4C:
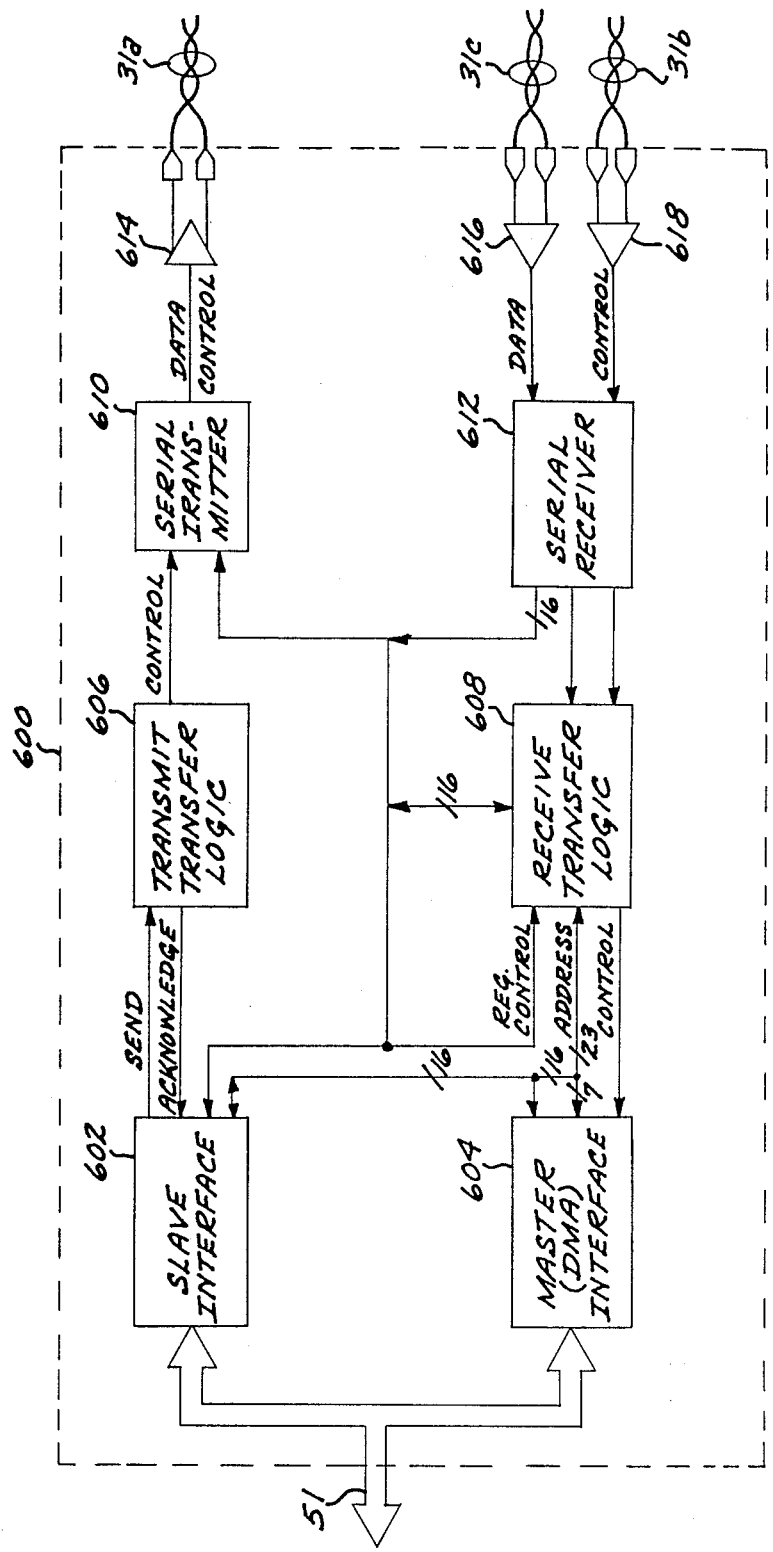
FIG. 4C is a block diagram of the camera interface comprising the central controller as shown in FIG. 4B.

Referring now to FIG. 4C, a block diagram of the camera interface 600 comprising the central controller 50 is shown. The interface 600 comprises the slave interface 602 and the master or direct memory access (DMA) interface 604, each coupled to bus 51. Control information is sent via the slave interface 602, the transmit transfer logic 606, the serial transmitter 610 and driver 614 via twisted wire pair 31a to the serial interface module 500 of the video processor 30.

The serial receiver 612 receives data and control information from the serial interface 500 via respective twisted wire pairs 31c and 31b.

Address and control information is exchanged between receive transfer logic 608, master interface 604 and slave interface 602. Register control information is exchanged between slave interface 602 and logic 608. Data information comprising filmstrip data is exchanged among serial receiver 612, serial transmitter 610, receive transfer logic 608, master interface 604 and slave interface 602.

The camera interface 600 provides the means for transferring data between the camera 25 and the central controller 50. The camera interface 600 comprises the DMA interface 604 for a automatically transferring, without requiring microcomputer 56 interrupts, the correlation results, camera status information and "filmstrip" data. The camera interface 600 further comprises the slave interface 602 for setup and control of the DMA interface 604, as well as for direct control of the camera 25.

As will be described in further detail below, the camera interface 600 transfers data to the camera 25 at a 2.5 megabit/second data rate. Data from the camera 25 to the interface 600 is provided in 16-bit packets, and is transferred by the interface 600 directly to the R memory 51 at a rate of 6.4 microseconds per word.

The camera interface 600 further comprises a control/status register (not shown) having the bit locations FEDCBA9876543210 in this embodiment having a microcomputer 56 address of FFF038H. The bits of the control/status register have the following functions.

If bit "0" is set, an interrupt will be generated when the first word of correlation results has been received. If bit "1" is set, an interrupt will be generated at the end of a camera frame when frame data, correlation results and camera status data have been received. If bit "2" is set, this indicates that the first correlation result has been received, and will cause an interrupt if bit "0" is set. Bit "2" must be cleared to receive further interrupts. If bit "3" is set, this indicates that a camera frame has been completed and all of the requested data has been received. An interrupt will occur if bit "1" is set. Bit "3" must be cleared to receive further interrupts.

Bit "4" indicates that the requested frame data has been received. Bit "5" indicates that a set of correlation results has been received. This will occur twice for a 48-column correlation. Bit "6" indicates that camera status information has been received (once per frame). Bit "7" is set when the transfer of a second word from the camera has been completed before the previous word was written to memory.

Frame data received from the camera will be written to R-memory only if bit "8" is set. The address to which the data is written is determined by the frame data pointer (described below) and is incremented after each transfer. Bit "9" indicates that all of the test data has been received from the camera. Bit "A" must be set in order for any camera interface DMAs to occur, and is the only bit which must be set to obtain camera status or test data. To obtain frame data, bit "8" must also be set. When bit "B" is set, frame data image columns are inverted top-to-bottom.

Bits "C–E" are the low order three bits from the frame data pointer. These bits should always have the values 000B on a "frame data complete" interrupt (bit 1). A residual count indicates that less than the full 8-word image column has been transferred.

Bit F is used with bit B to indicate whether the frame data image columns are to be inverted as 128-bit columns (bit F=1) for low resolution operation and compressed high resolution, or as 256-bit columns (bit F=0) for uncompressed high resolution operation.

The camera interface 600 further comprises a read/write register (not shown) or frame data pointer which supplies the "column" address in R-memory where frame data is currently being stored. The full word address is formed by appending this register value to three internal bits (readable in this embodiment as FA[3:1]in bits C–E), creating a 19-bit address. In this embodiment, the frame data pointer has the address FFF03AH for the microcomputer 56. After each frame data store operation, this 19-bit value is incremented.

When the frame pointer value is read, its current state is returned, except that bit "0" will be inverted if bits B and F of the control/status register are "1" values. The bits visible in the frame data pointer will increment only after all eight words for a column have been stored. At the beginning of each new frame of data, the three least significant bits are reset to "0," so that a column of frame data is aligned to a 16-byte boundary. After reaching the value of FFFFH, the pointer wraps around to zero.

The camera interface 600 further comprises another read/write register, the result and status pointer register, which supplies the 19-bit base address, called "RSPTR" for a 64-word block in the R-memory where correlation results, camera control and camera status are stored. This pointer register is located at memory location FFF03CH for the microcomputer 56, and has the bit locations FEDCBA9876543210. Locations within this block are fixed as shown in Table I, showing the camera result and status memory map.

The camera interface 600 further comprises a test data port write-only register (at microcomputer 56 address FFF03EH) which simulates the four packet types that can be received from the video processor 30. The data field gives the packet type, i.e., 000 specifies frame data, 001 specifies correlation results data, 010 specifies camera status data, 011 specifies video processor test register data, 100 specifies end frame data and 111 specifies end test data. The packet type will cause the data to be stored in memory with the associated pointer, as shown in Table I. The data value will be the entire 16-bit value of the test data port register value.

TABLE I
CAMERA RESULT AND STATUS MEMORY MAP

| CAMERA DATA TYPE | R-MEMORY ADDRESS | MEMORY CONTENTS |
|---|---|---|
| CORREL. RESULTS | RSPTR + 00H | Correlation Result #1 |
|  | RSPTR + 2EH | Correlation Result #24 |
|  | RSPTR + 30H | Correlation Result #25 (48-column mode only) |
|  | RSPTR + 5EH | Correlation Result #48 |
| CAMERA STATUS | RSPTR + 60H | Window Black Count |
|  | RSPTR + 62H | Exposure Register |
|  | RSPTR + 64H | Status Register |
|  | RSPTR + 66H | Frame Black Count |
| CAMERA TEST | RSPTR + 70H | Camera Control |
|  | RSPTR + 72H | Transfer Control |
|  | RSPTR + 74H | Exposure Register |
|  | RSPTR + 76H | Correlator Control |
|  | RSPTR + 78H | Target Register |

Figure 5:
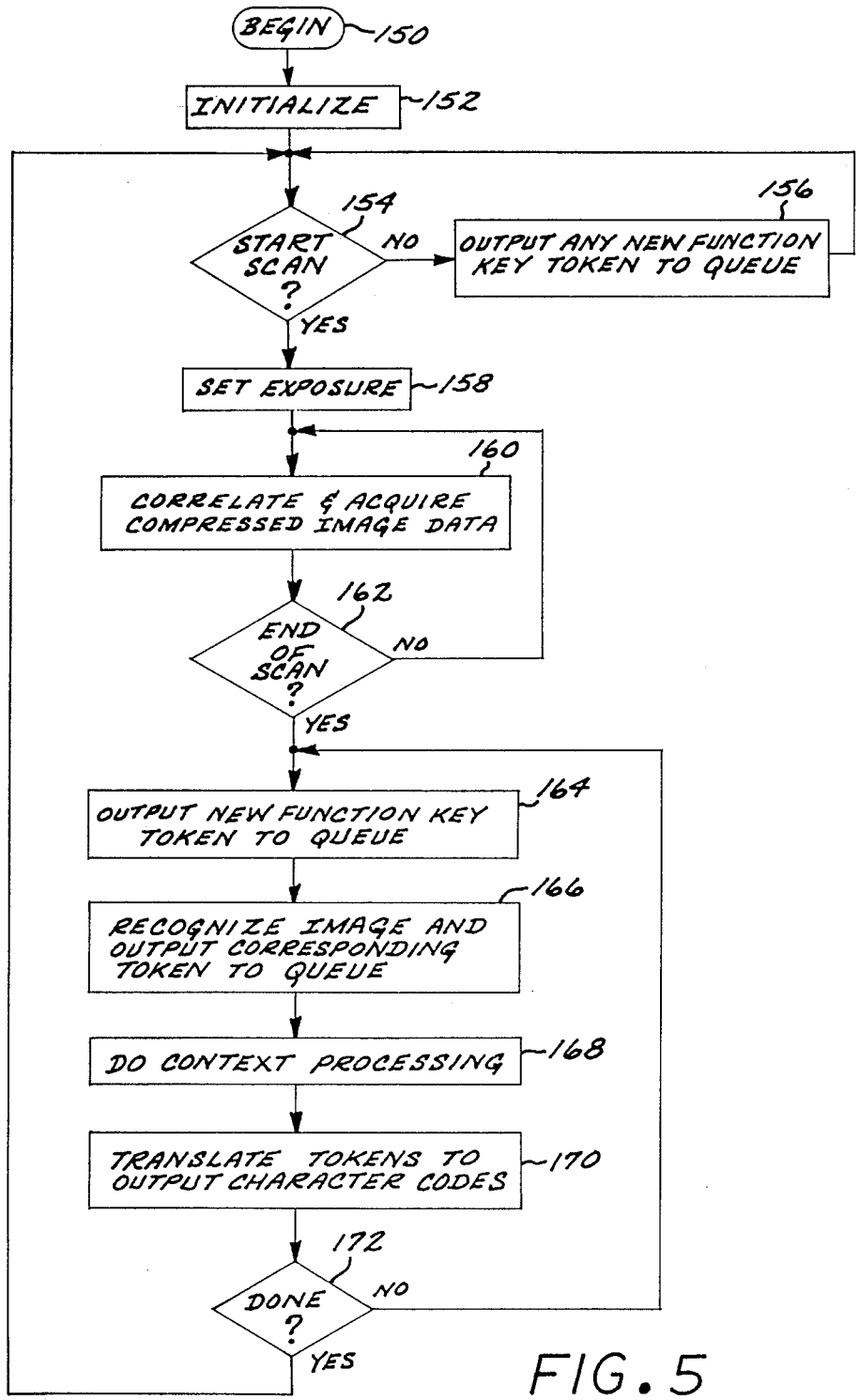
FIG. 5 is a general top level flow chart illustrative of overall operation of the preferred embodiment.

Referring now to FIG. 5, a general flow chart of the overall operation of the system generally described above with respect to FIGS. 1–4 is shown. Operation begins at step 150, and at step 152, software and hardware parameters are initialized.

At decision point 154, the "on-page" and scan or "go" function keys 26A and 26B are checked to determine if it is appropriate to commence image scanning, i.e., whether the camera is positioned "on-page" and the "go" key is actuated by the operator; in some configurations, only one of these events may be required. If not, then at step 156, any new function key tokens are output to the queue for the interface 60 and operation returns to decision point 152.

Once the result of decision point 154 is to start image scanning, then the camera exposure is adaptively determined in dependence on the reflectivity of the media being scanned (step 158). The system then proceeds to correlate and acquire compressed image data (step 160) until it is determined (at decision point 162) that the end-of-scan condition has been detected, i.e., that one of the function keys 26A or 26B is released. In some configurations, only one of these keys is monitored for the "beginning of scan" or the "end-of-scan" condition.

At step 164, the function keys 26C–26N are checked and any new function key tokens are output to the queue. At step 166, the image is recognized (character recognition processor 40) and corresponding tokens are output to the queue. At step 168, context processing occurs (processor 48) and at step 170, the resulting character tokens are translated to output character codes (processor 55). Decision point 172 returns operation to step 154 to begin again if all tokens have been queued; otherwise, operation loops back to step 164.

The exposure control and correlation functions performed in steps 158 and 160, respectively, are primary aspects of the invention and are discussed below in greater detail. Character recognition and context processing are functions which are exemplary of a particular utilization of the compressed image data provided in accordance with the invention, and are not described herein in further detail.

The clarity of the image captured by the image sensor 27 is a function of the ratio of the reflectivity of the background information to the reflectivity of the foreground image. The goal of the adaptive exposure algorithm implemented by the preferred embodiment is to produce images which are free of background noise but do not cause image data to wash out for a wide variety of media samples.

The exposure duration for a given media sample is set during an exposure measurement mode by placing the camera over a white or light-colored background on the medium surface and varying the duration of the light source LEDs 29A, 29B while holding the intensity constant. The exposure algorithm employed in the preferred embodiment assumes a fairly dark ink so that the problem is reduced to selecting an exposure which washes out the background and preserves the correct shape of the characters.

Figure 6A:
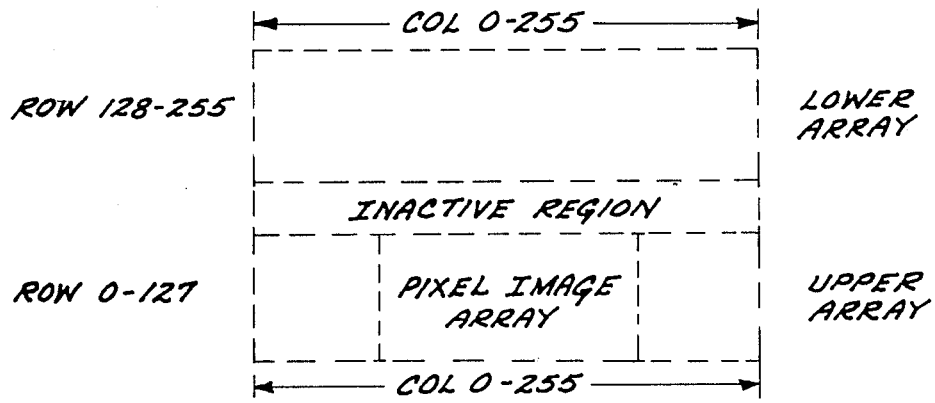
FIG. 6A is a diagrammatic depiction of the pixel array employed as the image sensor in the preferred embodiment.

The image sensor 27 used in the camera 25 is a photo sensitive dynamic RAM which can be used to acquire binary images. The image sensor 27 is physically configured as two arrays of 128 rows by 256 columns, separated by a narrow inactive region as shown diagrammatically in FIG. 6A. Because of the inactive region between the pixel arrays, only the upper array is used. The lower array produces pixel data that is inverted (i.e., black and white are reversed) as referenced to the upper array and is therefore unused. To avoid edge effects, only the middle columns of the upper array are used. The resulting image pixel array is the 16k-bit matrix of 128 columns by 128 rows. The video processor 30 produces the necessary addressing and control signals (RAS, CAS, WE) to the image sensor 27 to acquire images and perform refresh operations as required.

During the operation of the exposure algorithm, a number of image frames of the media background, i.e., a white or light-colored background, are acquired for a plurality of different soak or exposure times. For each image, the number of "black" pixels in the frame are counted. Whether a pixel is "black" or "white" is determined by comparing the voltage read out of the image sensor for that pixel against a threshold value, here 2.5 volts. If the pixel voltage exceeds the threshold, it is considered a black pixel; if the pixel voltage does not exceed the threshold, it is considered a white pixel. Each pixel value is assigned a binary signal state, a "1" representing a black pixel and a "0" representing a white pixel.

Figure 7:
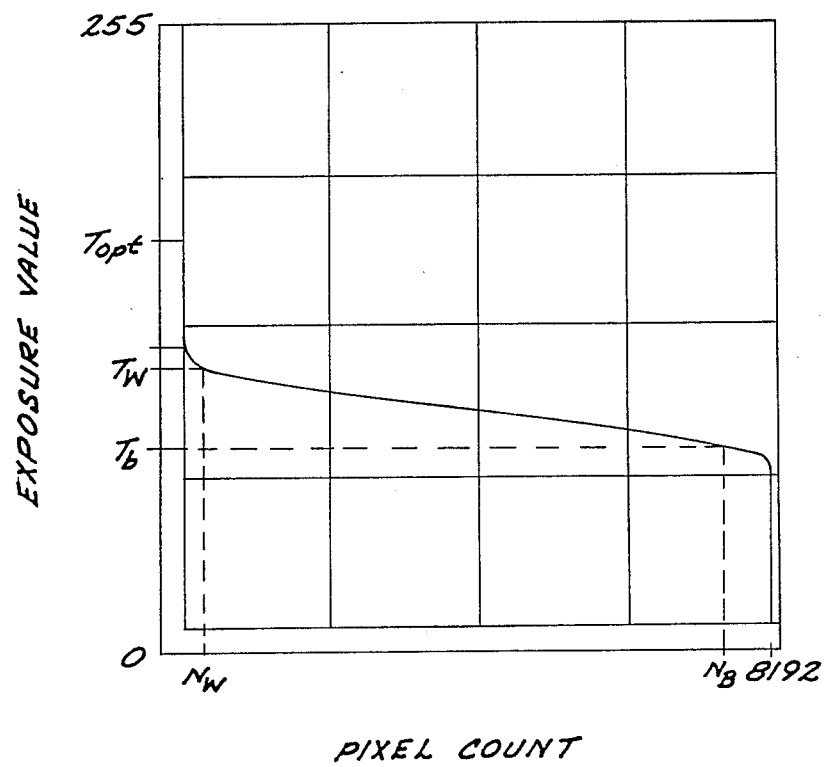
FIG. 7 is a graph of the number of black pixels per image as a function of camera exposure time for a characteristic media sample.

An example of an exemplary media characteristic curve, plotting the number of black pixels in an image taken of white background as a function of the camera exposure, is shown in FIG. 7. For the disclosed embodiment in its low resolution mode, the image sensor has 8192 pixel elements. The horizontal axis of FIG. 7 indicates the number of black pixels counted; thus, the maximum number of black pixels is 8192. The exposure duration in this embodiment is determined by the start count of an eight-bit exposure register comprising the video processor 30, and hence the exposure time "value" runs from a count of 0 to 255. The left "knee" (point of tightest curvature) of the curve is at about 3% black pixels and the right "knee" is at about 97% black pixels. The left knee corresponds to the exposure at which the camera LEDs 29 have illuminated almost all of the background. The value $N_w$ is defined as the number of black pixels in the mostly white field (about 3%) and $T_w$ is the exposure that causes this result.

Similarly, the right knee of the characteristic curve of FIG. 7 corresponds to the exposure at which the LED light source has just begun to illuminate the background. The value $N_b$ is defined as the number of black pixels in the mostly black field (about 97%) and $T_b$ is defined as the exposure which causes this result.

The media characteristic response curves for different media are proportional to each other. This is because each characteristic response curve really measures the sensor response, i.e., sensitivity, to the reflectivity of the media. The $T_w$ exposure is typically about 1.4 times the $T_b$ exposure for the particular image sensor 27 employed in this embodiment.

The optimum exposure, $T_{opt}$, is considered to be the exposure which resulted in the preservation of the smallest gaps and finest lines in the images. A least squares fit of the $T_{opt}$ values to the $T_w$ values yielded the equation $$T_{opt} = (1.57 * T_w + 32) \text{ microseconds} \tag{1}$$

Because $T_w$ is a function of $T_b$, $T_{opt}$ can be calculated in many different ways from their values. The best choice depends on consideration of the possible errors in $T_b$ and $T_w$. $T_b$ can be too low if the media has reflective specks. $T_w$ can be too high if the media has smudges or dark specks.

There are several problems that should be avoided. Blur is caused by the camera moving during the exposure. Each sensor pixel gets light from a strip of the image. The length of the strip in pixels is given by:

1+(exposure time)*(scanning speed)/(pixel size)

For scanning at 6 in/sec at a typical 2 milliseconds exposure with 1.57 mil pixels, the strip would be 1 +2*6/1.57=8.6 pixels long.

In an area of solid white or solid black, blur has no effect. In this example, however, a boundary between black and white actually affects about nine pixels. The end pixels get almost all white or almost all black values and the middle pixel gets half the brightness it normally would. Different exposure values can shift the boundary in the image.

If the exposure is less than optimum, a vertical line will appear to be wider. This will also reduce the width of gaps. Similarly, if the exposure is more than optimum, a vertical line will appear to be narrower, while a gap will appear to be larger. An optimum exposure should cause the widths of lines and gaps to be unaffected by the scanning speed. In practice, this is one of the most important effects to control.

Lines that are narrower than the length of the blur strip may be washed out entirely. The effect is aggravated by above optimum exposures, but at the optimum exposure a line less than half the blur strip will be washed out. Even at lower exposures, very narrow lines will still be washed out.

In the disclosed embodiment, the exposure and wait times may be up to 3.2 milliseconds, corresponding to a count of 255 of a 12.8 microsecond clock. The read time is 3.2 milliseconds for low resolution and 6.5 milliseconds for compressed or uncompressed high resolution.

In this embodiment the following formula is employed to calculate the optimum exposure time:

$$T_{opt} = ((13*T_w + 17*T_b)/16 + 31) \text{ microseconds} \quad (2)$$

which is ideally equivalent to $T_{opt} = 0.81*T_w + 1.06*T_b + 31$ microseconds $= 1.57*T_w + 31$ microseconds.

The video processor 30 provides the functions of data compression and formatting of the stream of digitized image data produced from the image sensor 27 in a movable camera. Because the image sensor is operated at a much higher image frame rate than would be required to assemble a filmstrip without redundant image data, a correlation operation is performed by the video processor 30 in collaboration with the system controller 50. The controller performs the decision making aspects of the correlation process, while the video processor 30 acts as a co-processor to relieve the controller 50 of computation-intensive portions of the correlation algorithm.

The function of correlation is to remove redundant data between successive camera images, allowing continuous filmstrip data to be assembled in the image buffer for further processing, for example, by the character recognition unit 40. This has the effect of isolating the rest of the system from variations in camera velocity. An overview of the correlation process will now be given to aid in understanding the process before a detailed description of the video processor 30 is given.

The frame buffer and image sensor control logic 300 of the video processor cooperates with the image sensor 27 and the frame buffer 28 to capture successive images of the media scanned by the camera 25. Three sequential images are stored by the frame buffer 28.

While a scan across the medium surface is in progress, the video processor 30 is operating at any given time on three successive frames of camera data, which shall be referred to as the "reference frame," the "current frame" and the "new frame." FIGS. 8A–8C illustrate exemplary respective reference, current and new frames of camera data.

The filmstrip data is assembled in an image line buffer in the R memory 52 of the controller 50 from successive camera image frames by recognizing and discarding the redundant overlapping columns of image frames during the correlation process. The video processor 30 simultaneously acquires a "new" image frame while correlating a "current" image frame against a "reference" image frame, and transfers to the central controller 50 only non-redundant data comprising some of the rightmost columns of the reference frame into the image line buffer. On the next frame, the "current" frame becomes the "reference" frame, the "new" frame becomes the "current" frame, and the process is repeated.

The horizontal displacement in pixels between two successive frames, referred to as "DeltaX," is the amount of new filmstrip data that is to be transferred to the camera interface module 600 of the central controller 50. In one preferred embodiment of the system, no external means for determining the camera velocity (the value for DeltaX) is provided. A value for DeltaX is derived by incrementally shifting one of the images and comparing it against a portion of the previous image. The offset with the best match becomes the new value for DeltaX. In another embodiment, a shaft encoder 22 (FIG. 3) for one of the camera tracking wheels provides a direct measure of the camera velocity. As will be described in further detail below, the process of image comparison is performed in the preferred embodiment by hardware within the video processor 30 under the control of controller 50, which returns a table of results to the controller 50. DeltaX can then be determined be the central controller 50 from these results.

The correlator logic 200 (FIG. 9A) of the video processor 30 receives the current and reference frame data, and performs the correlation process described above to determine the number of redundant pixel columns between the current and reference frames, and then on the next frame to transmit to the system controller 50 via the serial interface module 500 (FIG. 9C) of the video processor only the columns of image data of the reference frame which represent new, i.e., non-redundant, image data as compared to the previous reference frame.

The camera control logic 400 (FIG. 9D) interfaces with the system controller 50 through the serial interface 500 to control and monitor the various camera elements, including the camera light source LEDs 29 and the camera function switches 26A–26N.

It is noted that the correlation function described with respect to the preferred embodiment is invarient in the Y dimension, i.e., no attempt is made to compensate for vertical displacement as the image is scanned along the X or horizontal dimension. This has been empirically shown to have little effect upon image quality in the typical case, due to the tracking wheels 24 on the camera 25 which restrict movement in the Y direction to gradual movements while permitting ease of movement in the X direction, e.g., the direction along the lines of text shown in FIG. 2.

For clarity in describing the correlation process, images will be represented one dimensionally to illustrate features of the algorithm. Thus, FIGS. 8E and 8F are one dimensional representations of exemplary reference and current frames.

Figure 8D:
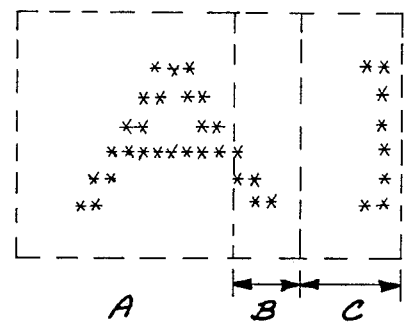
FIG. 8D shows a compressed image frame or "filmstrip" assembled from new data in FIGS. 8A-8C.

In performing the correlation process, a reference window of size W columns is positioned against the current frame for a programmable number of positions P. At each position, the number of differing pixels is counted and the result stored in an array with index P. The index of the result with the smallest number of differing pixels, i.e., the best match, is the most likely horizontal displacement of one image relative to the other. This value also indicates the amount of new data to be transmitted to the central controller 50 for assembly into the "filmstrip." FIG. 8G illustrates the various positions of the window for indices P0–Pn. FIG. 8D shows a compressed image frame, made up of "new" columns of data, the portion "A" from the reference frame (FIG. 8A), the portion "B" from the current frame (FIG. 8B), and the portion "C" from the new frame (FIG. 8C).

Three parameters completely specify a correlation, the window size, the number of positions of the window, and the current frame start position. The window size is the width in columns of the reference window. As the window is always right justified, the leftmost point of the window is given as 65 (the number of columns of the image frames plus one in this embodiment) minus the window size. In this embodiment, windows can assume sizes from 2 columns to 54 columns.

The number of positions of the reference window is the number of placements of the reference window relative to the current frame, and also is the number of valid correlation result values that will be returned to the controller 50. Typically for this embodiment 21 positions are specified, up to a maximum of 24 positions with a special case of a 48-position correlation The current frame start position value represents the rightmost position in the current frame against which the reference frame is to be correlated. The area of the frame to the right of this value has no effect of the results and is not accessed during correlation. The current frame start position value can be derived from the other two positions, as the window size minus the number of positions minus 2.

Figure 8H:
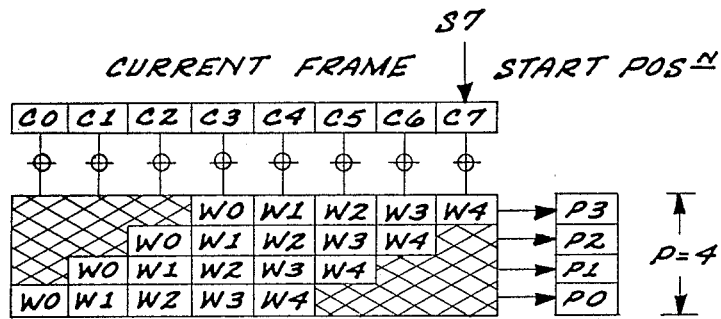
FIG. 8H illustrates a simple correlation example.

A specific correlation example is shown in FIG. 8H, wherein the frame column size is selected to be 8 columns for clarity, again for one dimensional frames. The window size is selected to be 5 columns, and the start position is selected to be at the rightmost edge of the current frame (C7). Four window positions are to be correlated, resulting in a table consisting of four correlation values P0-P3. Each corresponding pixel in the reference window is compared with a corresponding pixel in the current frame by an Exclusive-OR ("EX-OR") logical operation; when different pixel values are compared, the EX-OR result is "1." The number of "1's" indicating the number of differing pixel values are summed to provide a respective correlation value P0-P3 for each position of the window. The table of values P0-P3 can then be processed to find the minimum value, which indicates the window position having the best match between the current and reference frames.

When correlation is performed with no knowledge of the camera speed, 48-position correlation is enabled, which requires a 16-column window. The position of the best correlation provides the camera speed or DeltaX in columns per frame. DeltaX can range from 0 to 48.

When a previous DeltaX is available, it is assumed that the new DeltaX will not be greatly different. Experience indicates that the value for DeltaX generally will not change by more than two or three from one frame to the next. The disclosed embodiment allows for changes up to 10 from the previous DeltaX, and sets up correlation to cover that range of values with the largest window that will fit.

The smallest allowable window is 16 columns, or only 1/40 of an inch, for the sensor employed in this embodiment. The largest is 54 columns or 1/12 of an inch. Using a larger window increases the reliability of the correlation.

Using correlation to determine redundant data is subject to several types of possible errors; an all-white window, a window with only horizontal lines, a window that matches in more than one position, and a window that does not match.

An all-white window means that the speed of the camera cannot be tracked. While DeltaX cannot change much from one frame to the next, a large white area gives the user time to speed up or slow down to any speed. Large blank areas could also waste space in the line buffer. All-white windows are handled by deciding to use the special case of 48-position correlation when the next non-white area is reached. This allows the system to determine the new camera speed. 48 columns of data are transferred after a white gap in order to ensure that the front of the new image is not cut off. This transfers (48-DeltaX) white columns plus the new data.

The system seeks to preserve the size of small white areas, but limit the size of large white areas. This is done by backing up the line buffer position by the expected number of extra columns (48-DeltaX), but not more than the size of the window (which is all that is known to be white). The WHTCOLCNT parameter is used to limit the total number of white columns transferred.

A window with only horizontal lines gives some of the same problems as a white window in determining the camera speed. Horizontal lines will correlate perfectly with any amount of horizontal shifting. Thus, it is assumed that the camera speed is unknown until some other image data is acquired.

This situation is detected by noticing when the worst correlation result is too close to the average correlation result. This implies that all of the different correlation positions in the image were very similar to the reference window. This can only happen when almost all of the pixels in the image are horizontal bands. This situation is called weak correlation. The system recovers from it by not changing DeltaX during weak correlation. 48-position correlation is employed whenever either of the previous two correlations was weak. This provides one 48-position correlation after the reference window becomes different from a pure horizontal line pattern.

A window that matches the new frame in more than one position can happen when the window includes a small repeating feature, such as one of the two humps in the "m" or a double quote. Because the image is digitized into pixels, the two parts may match exactly or either one may match a little better than the other. The system seeks to avoid this by using a small range of expected DeltaX values and as large a window as possible. This problem most commonly occurs after white space, when 48-position correlation was used. A similar symptom may occur when the best correlation result is exactly between two columns of pixels. If the separation between the equal results is greater than one, it is treated as an accidental error and DeltaX is not changed. (Another possible solution would be to use the position closer to the current DeltaX.)

A window that does not match anywhere in the range of expected DeltaX values can be caused by losing track of the camera speed (as above), or by having the camera move backward or too fast. When the DeltaX value is at the maximum, the scan is terminated with an error indication. Otherwise, this condition is treated as weak correlation, and 48-position correlation is used to attempt to determine the camera speed.

Figure 9A:
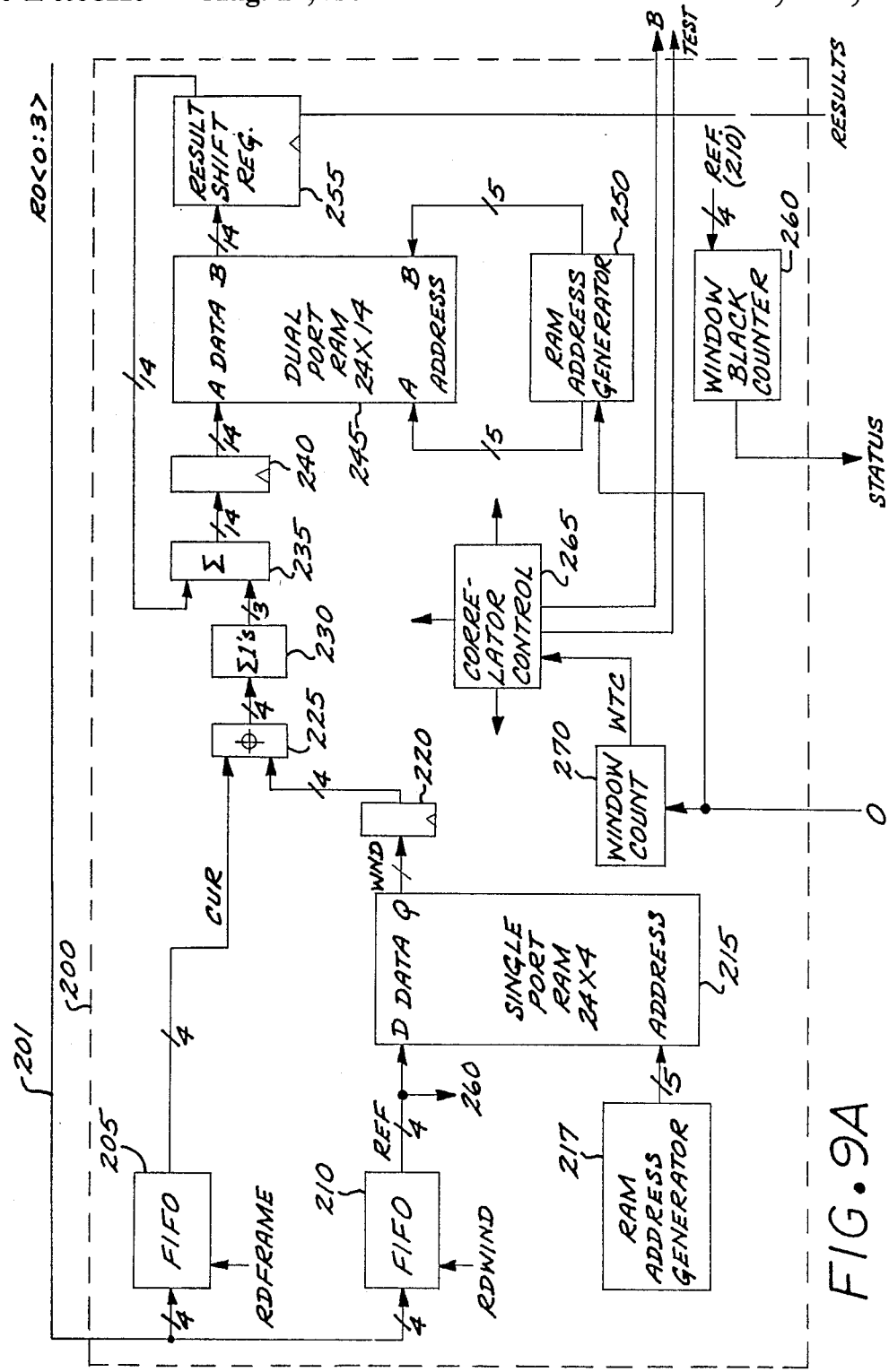
FIGS. 9A—9D are block diagrams of the respective correlator, frame buffer and image sensor control logic, serial interface and camera control logic modules.
Figure 9B:
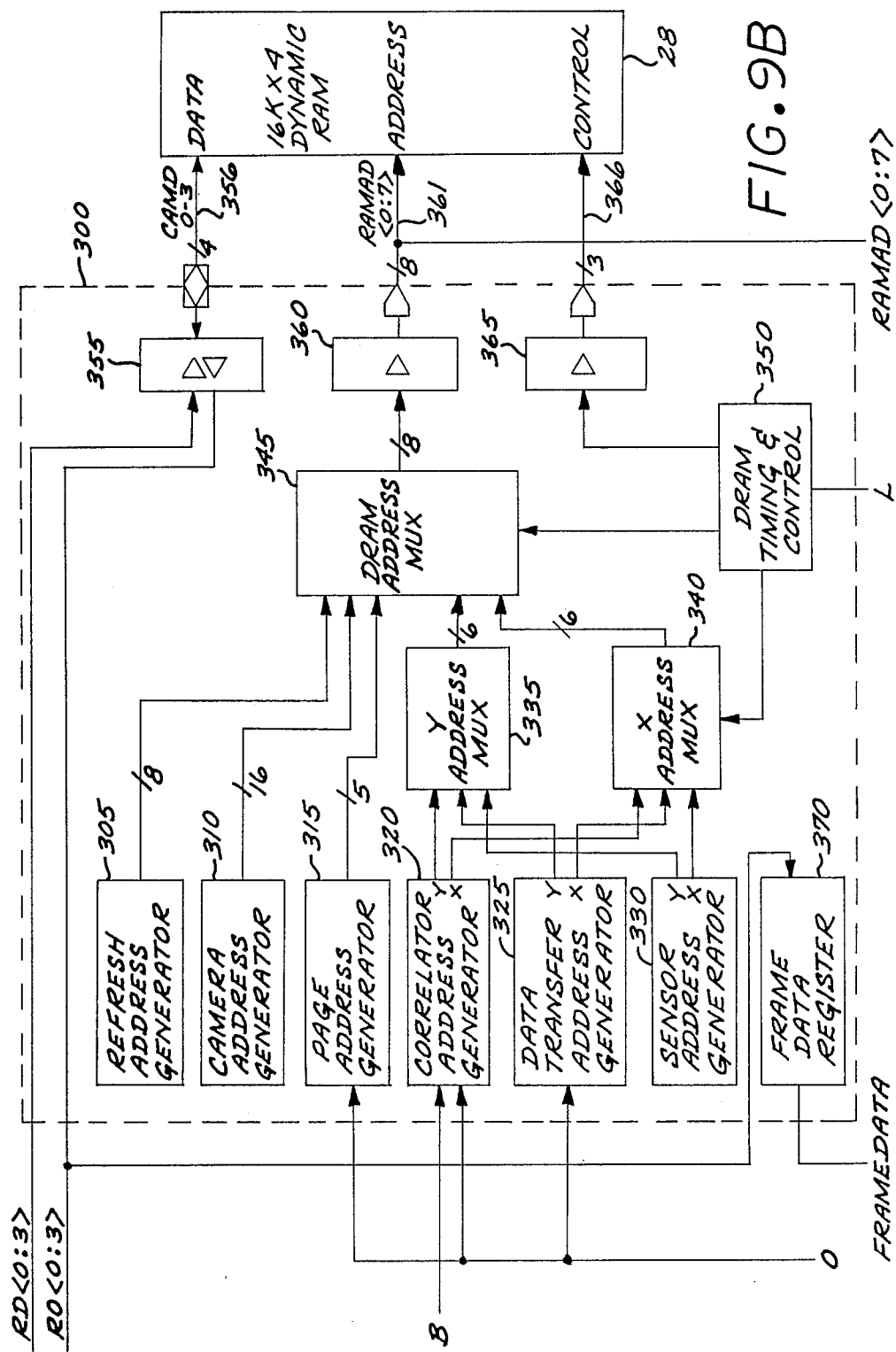

Referring now to the detailed block diagrams of FIGS. 9A-9D, six 16-bit programmable registers are used to support the exposure control and correlation functions of the video processor. These registers are the camera control register 455 (FIG. 9D), the black count/target register 410 (FIG. 9D), the exposure register 425 (FIG. 9D), the transfer control register 325 (FIG. 9B), the correlator control register 265 (FIG. 9A), and the page address register 315 (FIG. 9B). The central controller 50 has access to each of these registers via the serial interface module 500.

Figure 9C:
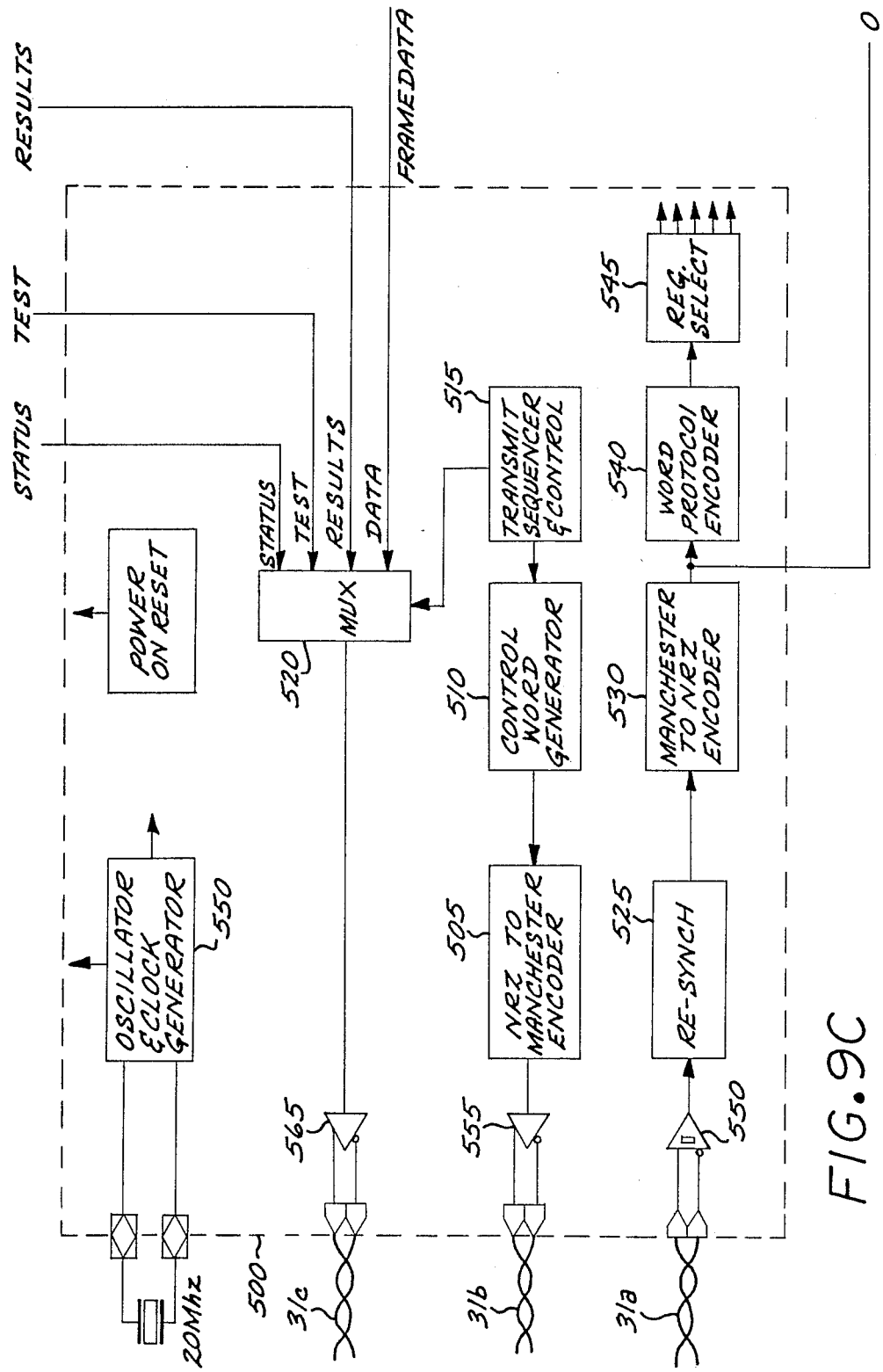

The serial interface module 500 of the video processor 30, shown in FIG. 9C, serves as the communications path for command and status information between the central controller 50 and the video processor 30. Its major function is to properly decode and encode this information into a form suitable for serial transmission across a cable 31 (typically six feet long in this embodiment) connecting the camera 25 and the video processor 30 assembly to the central controller 50.

Figure 10:
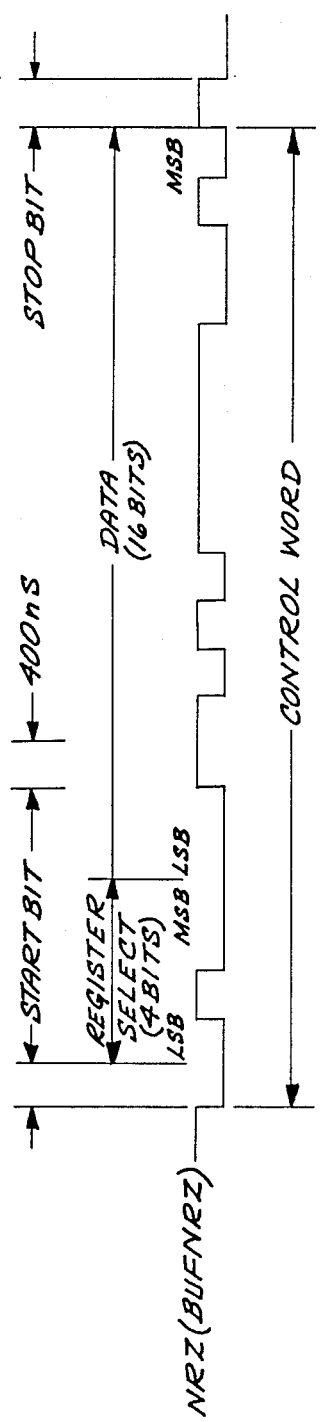
FIG. 10 shows the data packet protocol for data sent to the serial interface module of the video processor from the camera interface of the central controller.

The central controller 50 controls the video processor 30 by writing commands and parameters to eight 16-bit registers in the video processor 30. The circuitry needed to load these registers through the camera cable is contained in the system interface module 500 of the video processor 30 and in the camera interface module, resident within the central controller. The camera interface module 600 receives normal "write" operations intended for the video processor 30, and formats and encodes these operations to be sent serially over the cable to the video processor 30. Formatting the operations consists of preceding the 16-bit register data with a zero start bit and four register select bits derived from the central controller address lines, and placing a zero stop bit after the register data, as shown in FIG. 10. This data is sent over the twisted wire pair 31a of cable 31 using Manchester bit encoding. At the video processor 30, the data packet is reconverted back to NRZ, and the 16-bit data is directed to one of the eight video processor registers according to the register select information. Thus, the contents of each of the video processor's eight control registers can be individually written by the central controller 50 in any order at any time.

Data transfer in the opposite direction, from the video processor 30 to the central controller 50, is also provided via the cable 31. There are four distinct types of information available from the video processor, image frame (filmstrip) data, correlation result values, camera status, and video processor register states for test use. The contents of selected video processor registers will be transferred upon command for test and diagnostic use. Frame data, correlation results, and status data are normally sent automatically by the video processor in a burst once each frame, not upon command by the central controller 50, since the camera interface module 600 of the central controller 50 receives the information each frame and stores it in memory. Two serial paths, twisted wire pairs 31b and 31c, are used in this direction, one carrying NRZ data, the other carrying Manchester encoded clock, word timing and data type information.

Figure 11:
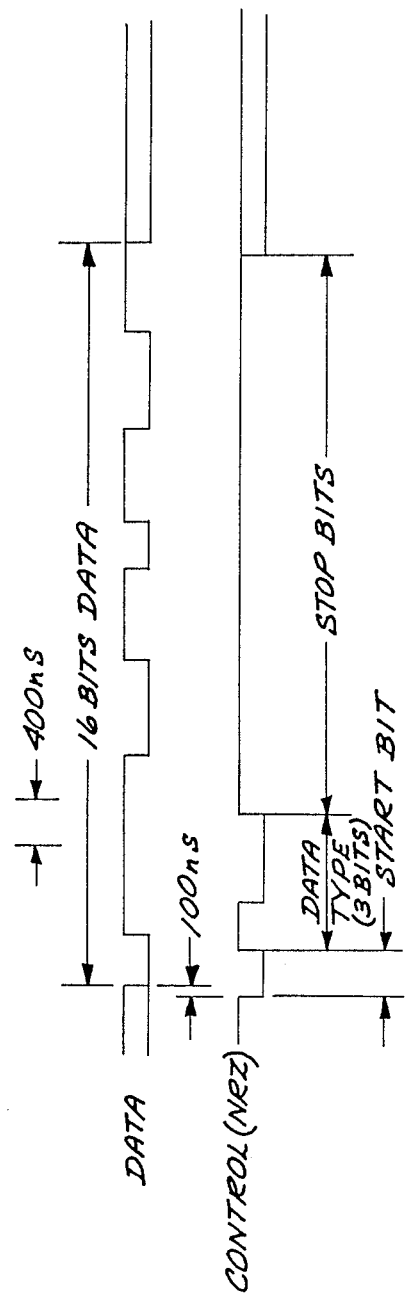
FIG. 11 illustrates the signal protocol for the frame data sent by the video processor to the central controller.

Data type and word timing information is sent on the control line. A zero start bit followed by a 3-bit data type field, in turn followed by twelve stop bits, identifies a corresponding 16-bit data word sent on the data serial path. FIG. 11 illustrates the signal protocol for the register data and control information sent by the video processor to the central controller. Upon receipt of a data word, the camera interface 600 loads it into camera interface memory at a location given by an autoincrementing pointer register Each type of data is loaded into its own region of memory, accessed by its own pointer. When all of the information for the frame has been received, the central controller 50 is interrupted.

Cable 31 provides a duplex serial transmission link with one transmission path 31a to the video processor from the central controller, and two paths 31b, 31c, from the video processor to the controller 50. The path to the video processor 30 uses differential CMOS level voltages to transmit Manchester encoded clock and data signals across a twisted wire pair 31a supporting a bit transfer rate of 2.5 Mb/second. Data is sent using an asynchronous word-oriented protocol During idle periods, the transmitter sends a continuous logic 1 stop bit. One path (twisted wire pair 31b) from the video processor to the central control uses differential CMOS levels to transmit Manchester encoded clock and control information across the cable at 2.5 Mb/sec, using an asynchronous protocol. The other path is differential CMOS NRZ data. Power for the camera is also supplied by the central controller 50 through the cable which carries these signals. One wire pair (not shown) is used to supply regulated 5 volt power.

The serial interface module 500 within the video processor 30 comprise three major sections, the clock generator, the receiver and the transmitters.

The master clock generator 550 (FIG. 9C) contains a 40 Mhz crystal oscillator circuit and a long chain of binary dividers which generate the lower frequency clocks employed by the video processor. The serial interface module 500 (FIG. 9C) and the frame buffer control logic 300 (FIG. 9B) use a 20 Mhz clock signal (CLK5). The 10 Mhz clock signal CLK10 is buffered and used as the main system clock by the video processor. Additional lower frequency clocks are used to form synchronous enable signals and to drive the external camera audio transducer. In addition to the clock signals, the clock generator block generates a synchronized system reset signal for system initialization on power-up or upon command from the central controller 50.

The serial receiver section receives differential Manchester encoded serial data from the central processor and supplies it to command and control registers in the video processor. The incoming differential signals are buffered and converted to single-ended signals, then passed through a shift register 525 (FIG. 9C) which synchronizes these incoming signals to the video processor's internal 20 Mhz clock. The Manchester-to-NRZ encoder 530 extracts the bit clock from the serial data and supplies normal NRZ data and a separate clock to the word protocol decoder 540. This decoder finds the beginning of a 16-bit data word and its associated register select bit which are encoded with an asynchronous protocol. It then sends appropriately timed shift and load pulses to the register select logic 545 which uses the register select information to direct the data word to the appropriate register. The NRZ data supplied by the decoder is passed on with these pulses. Except for two special purpose functions, the reset and test functions, the control registers are shift registers which receive the data serially. The special purpose functions do not use the 16 bits of data supplied, but only use the fact that a write to the predetermined address locations has occurred to perform their function, i.e., to reset the video processor 30, and to initiate the test mode, where video processor register data values are sent back to the central controller 50.

Operation of the serial transmitter is controlled by the transmit sequencer and controller 515, which receives requests from either the correlator controller 265 or the serial receiver to send information back to the central controller 50. Since there are four types of information to send back, there are four transfer request lines provided as inputs to the source multiplexer 520. When one of these lines is asserted, the transmit controller 515 generates properly timed load and shift pulses for the selected data register. It also generates a 3-bit datatype word which is used to select the data from the register and as the data-type field for the control word sent to the central controller 50. In this direction, data is sent in unencoded NRZ form on one set (twisted wire pair 31c) of differential lines, and a separate set of (twisted wire pair 31b) differential lines carry the word alignment information, data type and clock in Manchester encoded form. In the data path, the correct serial data source is selected in the source multiplexer 520 according to the type bits, and then the data is delayed to properly align it with the clock on the other line. Finally the data is transmitted to the central controller 50 in differential form. The control word generator 510 uses a shift register to assemble the correct sequence of start, data type, and stop bits, which it passes to the Manchester encoder 505 which combines it with the bit clock. The control word is also converted to differential form and transmitted to the central controller 50.

The frame buffer 28 and image sensor are controlled by the logic module 300 shown in FIG. 9B. Logic module 300 comprises refresh address generator 305, camera address generator 310, page address generator 315, correlator address generator 320, data transfer address generator 325, sensor address generator 330, and frame data register 370.

Generators 305, 310 and 315 are each coupled directly as inputs to the DRAM address multiplexer 345. The outputs of generator 320, generator 325 and generator 330 are coupled as inputs to Y address multiplexer 335, which selects one of these signals to be provided as a further input to multiplexer 345. Similarly, the outputs of generators 320, 325 and 330 are coupled as inputs to X address multiplexer 340, which selects one of these signals to be provided as a further input to DRAM address multiplexer 345.

The 8-bit output of the DRAM address multiplexer 345 is provided through driver 360 to the address ports of the frame buffer 28 (FIG. 9B) and the image sensor 27 (FIG. 9D), to control the memory locations being addressed at any given instant of time. Data is input and output to the data ports of the frame buffer 28 through 4-bit bus 356. Control signals are provided to the control ports of the frame buffer 28 via 3-bit bus 366 and driver 365 from DRAM timing and control circuit 350.

The function of the refresh address generator 305 is to provide address information to refresh the dynamic RAM 28 (the frame data buffer) to prevent memory loss.

Camera address generator 310 generates the addresses needed to write incoming camera image data into the frame buffer 28.

Page address generator 315 allocates the frame buffer addresses to each of the respective reference, current and new image frames or pages stored within the frame buffer 28. The register may also specify that these frames should automatically rotate their values after each frame. This would make the current frame use the previous new page, the reference page use the previous current page, and make the new page over-write the previous reference page.

The correlator address generator 320 serves to generate one Y address and two X addresses, one for the current frame, the other for the reference frame. This allows the appropriate portions (or operands) of the current and reference frame data to be read from the frame buffer 28 and sent to the correlator module 200 for the correlation function.

The data transfer address generator 325 provides the appropriate addresses, based on commands received from the central controller 50, to read out a programmable portion of the current frame from the frame buffer 28, representing the new data to be sent back to the central controller 50 to be assembled as part of the image film strip. This register sets the number of positions to correlate, and may also enable 48-position correlation. The register 325 also specifies the number of columns to transfer. It may also enable transfer and may specify transfer of zeros instead of the actual image data.

Sensor address generator 330 generates addresses which are directed to the image sensor 27 to read out image data from the image sensor 27. The address bus 361 is shared and multiplexed between the frame buffer 28 and the image sensor 27.

The Y and X address multiplexers serve to multiplex the respective different sources of Y and X addresses to be provided to the DRAM address multiplexer 345.

The DRAM address multiplexer multiplexes the various sources of X and Y addresses and the page address to produce the appropriate DRAM (either the image sensor 27 or frame buffer 28) row and column addresses.

DRAM timing and control logic 350 controls the timing for all control signals to the image sensor 27 and frame buffer 28, and accepts requests from memory addressed from other system components. Thus, logic 350 controls the camera and correlation timing, data transfer and frame buffer 28 refresh cycles. The refresh cycle is the default memory cycle when no other system components are requesting memory access.

The frame data register 370 buffers four bits of data from the frame buffer 28 and performs a parallel to serial conversion to send the data to the serial interface module 500.

The correlator logic module 200 is shown in FIG. 9A. This module comprises first-in-first-out (FIFO) data buffers 205 and 210. The inputs to both FIFO buffers are taken from 4-bit bus 201, in turn coupled through driver 355 to data ports of the frame buffer 28. The FIFO buffers 205, 210 are "elastic" buffers used to buffer data from the frame buffer 28; i.e., these buffers are employed to perform a data rate conversion between the control logic module 300 and the correlator module 200. The FIFO buffers 205, 210 fetch "operands," each comprising 4 bits of a column, from the frame buffer 28 at different times. The FIFO buffer 205 receives operands comprising the current image frame. The FIFO buffer 210 receives operands comprising the reference image frame. The output of FIFO buffer 205 is coupled to Exclusive OR ("EX OR") circuit 225. The output of FIFO buffer 210 is coupled to single port RAM device 217, having 24×4 memory locations. A RAM address generator 215 generates the RAM 215 address window addresses, as well as the start address and end address, and selection signals for the RAM 215. The output of the RAM 215 is in turn coupled through register 220 as a second set of input signals to the EX-OR circuit 225. Register 220 is used as a buffer to synchronize the reference window frame from RAM 215 with the current frame operand from FIFO 205.

As will be described further below, the RAM 215 buffers up to 24 reference frame operands, the number depending on the number of reference operands to be compared against the current frame operand received by FIFO 205. Buffer 210, RAM 215 and register 220 provide a means for sequentially providing a plurality (up to 24) of different reference frame operands to be logically EX-ORed with the current frame operand supplied by FIFO buffer 205.

Accumulator circuit 230 is connected to the output of the EX-OR circuit to sum the number of different pixel locations being compared by the EX-OR circuit 225. The output of first summing circuit 230 is in turn provided to a second summing circuit 235. The output of summing circuit 235 is in turn coupled to register 240, whose output is in turn coupled to dual port RAM 245. A RAM address generator 250 provides the appropriate RAM addresses for RAM 245. The "B" (write) output of RAM 245 is connected to the results shift register 255.

EX-OR logic circuit 225 comprises four EX-OR logic gates to perform the EX-OR logical function in parallel on the respective bits of the reference window operand and the current frame operand. Each case in which the respective two pixels are of different values, i.e., a pixel mismatch, results in a "1" value.

Circuit 230 comprises a four-bit full adder to produce a three-bit value representing the sum of the number of differing pixel values for the two respective operands.

Accumulator circuit 235 receives the three-bit sum value from circuit 230, and accumulates the sum value with previous sum values (received from dual port RAM 245) to
provide a sum represented by a 14-bit data word of the total number of differing pixel values over one position of the window. The least significant three bits are produced by a full adder circuit comprising circuit 230; the most significant 11 bits are produced by a half adder incrementing array comprising circuit 235.

Register 240 is used to provide a pipeline delay to the output of accumulator 235.

Dual port RAM 245 is employed to store the accumulated number of differing pixels for each reference window position, for up to 24 different positions, with each stored value indicating the number of differing pixels determined for that position.

RAM address generator 250 provides the start position and actual position for RAM 245, as well as the read and write addresses. The write address is the same as the read address except that the write address is delayed by two clock cycles.

The correlator logic module further comprises correlator control logic 265, window counter 270, and window black counter 260. The correlator control 265 comprises two distinct levels of control. The higher control level performs a number of synchronization and iterative functions. It interprets data loaded into the correlator control registers and synchronizes correlation to the camera cycle by detecting a "soak" state to "read" state transition. It then breaks a correlation over an entire frame into a sequence of "lines," where each "line" comprises four adjacent pixels in the vertical direction or Y direction, and extends up to the full width of the frame in the horizontal direction, i.e, four full rows. As the frame buffer RAM accesses four bits of data simultaneously, this arrangement allows four pixels to be processed in parallel.

After all lines have been correlated, the controller 265 synchronizes with the serial interface 500 and transfers the contents of the dual port memory 245 when ready. The results shift register 255 converts the 14-bit parallel data output of the dual port RAM 245 into serial data to be provided to the central controller 50 via the serial interface 500. If a 48-column correlation has been specified, the control logic initiates a second correlation to calculate values for the remaining 24 positions.

Figure 12:
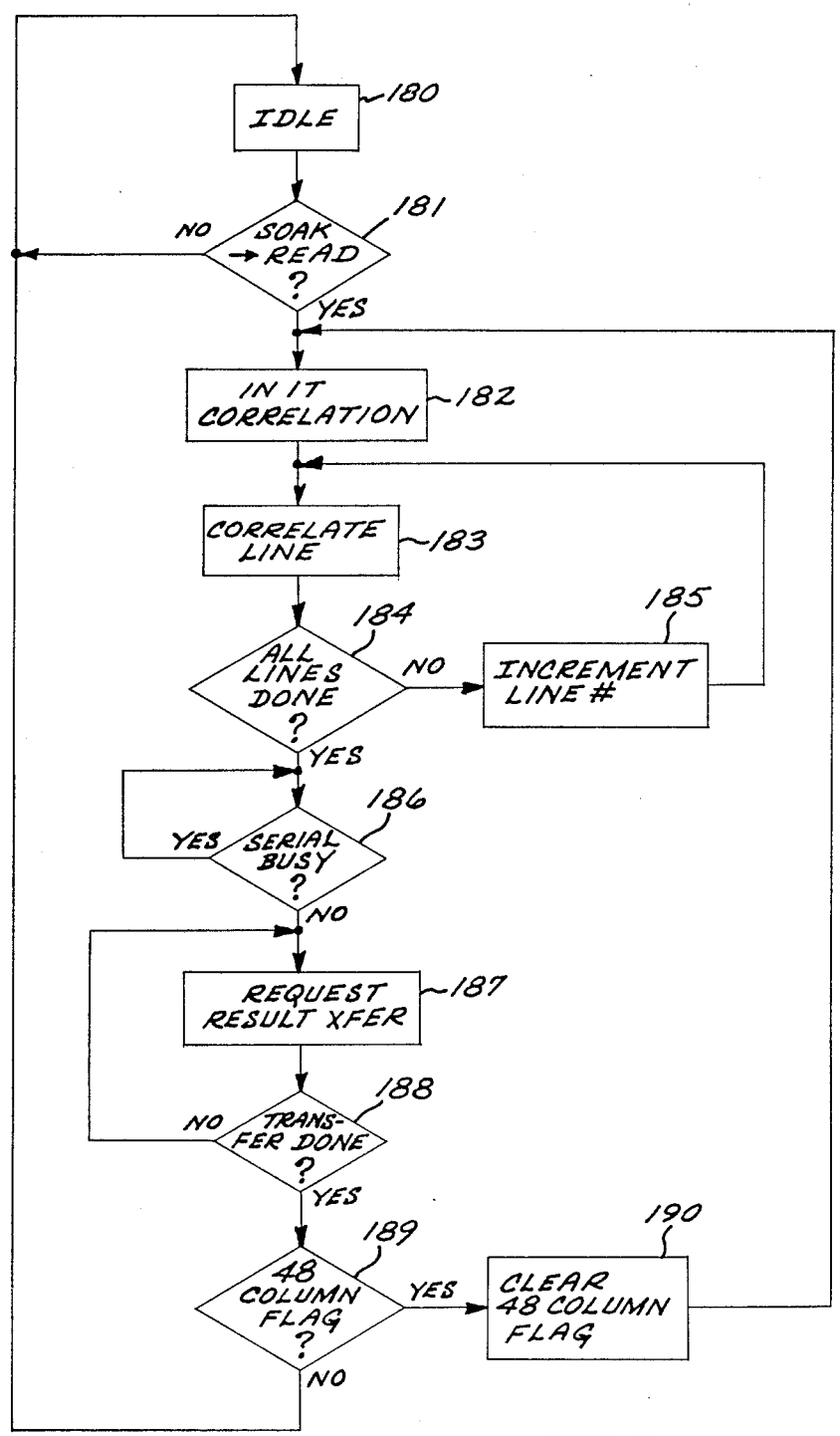
FIG. 12 is a flow chart illustrating the upper level of correlator control provided by the correlator control logic 265 of FIG. 9A.

The upper level of correlator control is implemented by a registered state machine comprising logic 265 whose operation is depicted by the control flow diagram of FIG. 12. The initial operation is an idle state (step 180). At step 181 the state machine looks for the soak-to-read state transitions in the operation of the image sensor 27 and, when the transition occurs, correlation is initialized by means of signal INITY (step 182). Control is passed via signal INITX to the lower level of correlator control which causes a line (four rows) to be correlated (step 182). At step 184, the state machine tests the signal CORRYTC. This signal indicates that the current line number is 31, and therefore that all lines comprising the current frame have been correlated. If not, the line number is incremented by means of signal INCY (step 185), and operation loops back to step 182.

Once all lines in the current frame have been correlated, then the serial interface 500 is checked (step 186) to see whether it is busy with other operations. Once the serial interface is free, then at step 187, transfer of the correlation results to the central controller 50 is requested. At step 188, the signal XFR DONE from the serial interface module 500 is tested to determine whether the transfer of the correlation results has been completed. If not, operation loops back to step 187. Once the correlation results transfer is complete, the 48-column correlation flag is checked (step 189), and if set, it is cleared (step 190), and a second 24 position correlation is performed. If the 48-column correlation flag is cleared, operation returns to step 180 to wait for the next soak-to-read state transition.

Control circuit 265 further manages the synchronization function between the operations of correlator module 200 and the module 300. The control circuit 265 also receives the signal VALID from the logic module 300. VALID indicates that window and frame data operands are available (from module 300) for correlation. The control circuit 265 detects the end of correlation and signals this detection result to the central controller 50 via the serial interface module 500. The correlation control 265 may be written to select the size of the reference window and the rightmost position to correlate. The register may also enable correlation and may specify correlation against zeros, which treats the reference window as all white regardless of its actual contents.

The window count circuit 270 comprises a programmable counter and register, and indicates to the lower level of correlation control via control signal WTC when all window operands have been accessed from the frame buffer 28. This modifies the status transmitted to module 300 and regulates the fetching of window data operands from the frame buffer 28.

The window black counter 260 provide the function of counting the number of black pixels in the reference window for use in the white space calculation (discussed in more detail below.)

Figure 13:
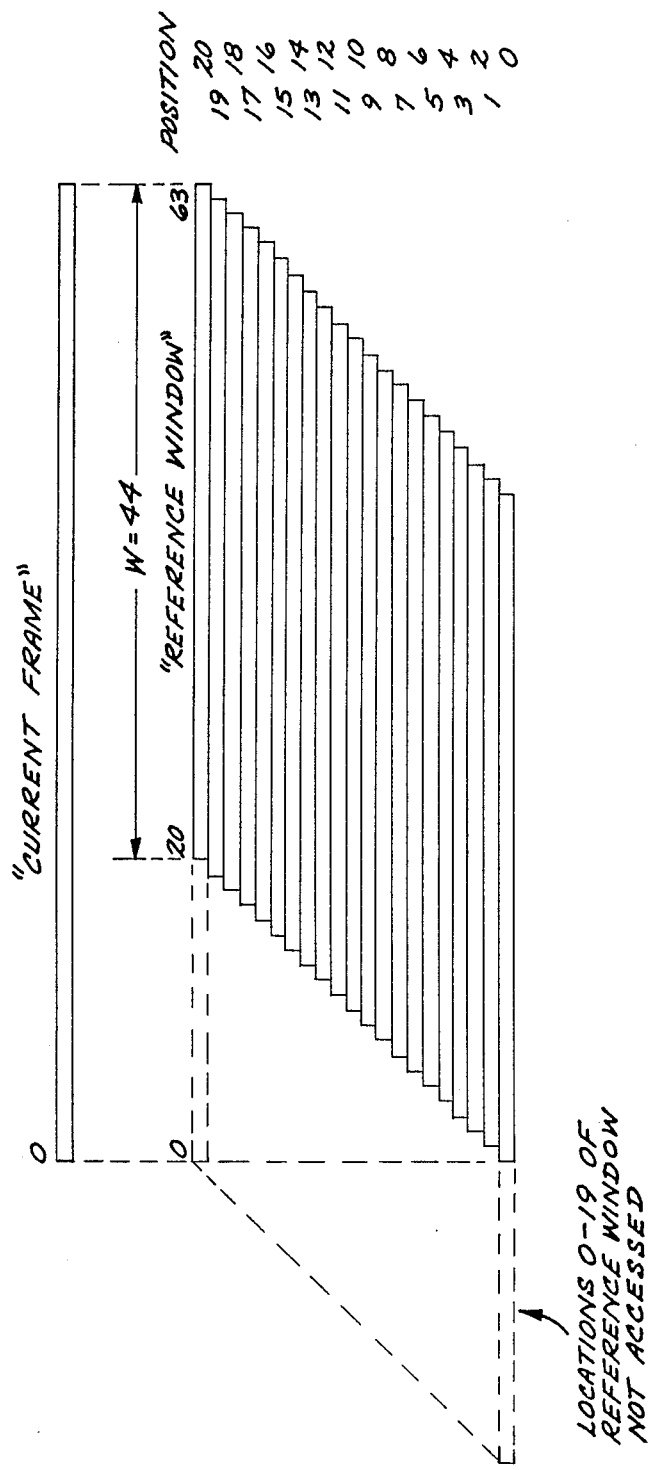
FIG. 13 is a diagrammatic illustration of an example of a single row current frame being correlated against a single row reference frame.

To further illustrate the correlation of the current frame and the reference frame, FIG. 13 depicts the correlation of one "line" of pixels of image data. In this example, a reference window 44 columns wide is correlated against the current frame at 21 different positions. At each position, each column of the reference window is compared against the corresponding 44 columns of the current frame. It would be possible to directly perform this correlation in the sequence depicted, that is by performing three nested iterations. At the outermost loop each position is referenced sequentially. A lower loop would then sequentially generate the x (column) addresses for adjoining window and frame operands, with the x dimension understood to be aligned with the direction of the image columns. For each pair of x addresses generated, the innermost loop would be called. This sequentially generates the y address for the comparison, accesses and compares the operands, and accumulates the results of the comparison. Here the y dimension is understood to be aligned with the direction of the image rows. The outermost loop would then transmit the accumulated result for that position to the central controller.

This direct implementation is unsuitable for the disclosed embodiment for practical reasons. For the example shown, the outermost loop is executed 21 times, the second loop 44 times, and the third level 32 times. At each invocation of the innermost loop, two data operands are accessed from memory. For cost requirements the frame buffer 28 employed in the disclosed embodiment is a dynamic RAM requiring 400 nanoseconds per access. Hence, the entire operation would require 23.6 milliseconds. For exposure considerations the camera cycle is of the order of 4 milliseconds and one correlation must be performed every camera cycle, making this method unsuitable for the particular frame buffer employed here. However, if a frame buffer memory is employed with much lower access times, this technique may be suitable for particular applications.

Most operands are accessed more than once using the algorithm described above. For instance all reference window values are accessed at each invocation of the second level of iteration, i.e., 21 times. Similarly, many of the current frame values overlap different window placements. For example, the rightmost current frame column, denoted as C[63] is accessed only once, when it is compared against the rightmost column of the reference window W[63] at the rightmost position P[20]. However, C[62] is accessed twice, once when compared with W[62] at P[20] and once with W[63] at P[19]. Similarly, C[20] through C[43] overlap all placements of the reference window, and thus are each accessed 21 times.

The preferred embodiment minimizes the time required to perform a correlation by accessing each individual reference window and current frame operand once only, maintaining the operands in fast internal storage (within the correlator logic 200) for as many operations as they are required. This technique is sometimes called "caching" or "buffering." This considerably reduces the time required for accesses to the frame buffer 28, in this example, $(64+44) \times 32 \times 400$ nanoseconds = 1.4 milliseconds.

It is noted that an advantage of this technique for reducing the correlation time is to increase the amount of image data which can be correlated, allowing the system to acquire high resolution images. In this embodiment, even the "low resolution" camera mode provides images made up of 8192 pixel elements.

To achieve this acceleration in the correlation time requires that the sequence in which the comparisons are performed is altered. This is done by moving some of the functions that in the first embodiment described above were done in inner loops to outer loops and vice versa. Here the outer loop sequences through the y (or row) addresses of the operands and is implemented in the upper-level correlator control described with respect to FIG. 12. This upper level control iterates with respect to y addresses and breaks the correlation into a number of lines, each comprising four pixel rows in this embodiment. The second or lower level of iteration separates each line into a number of "passes." Each pass is associated with a current frame data operand. The current frame data is stored in FIFO buffer 205 (FIG. 9A) for the duration of a pass, and is discarded at the completion. The third level of iteration sequentially accesses a varying number of reference window data operands stored in reference window buffer 215, compares them with the current frame data operands, and accumulates the results according to the appropriate position. This necessitates the use of buffer 245 (FIG. 9A) to hold the partially accumulated results and window buffer 215 (FIG. 9A) to hold previously accessed reference window operands.

Figure 14:
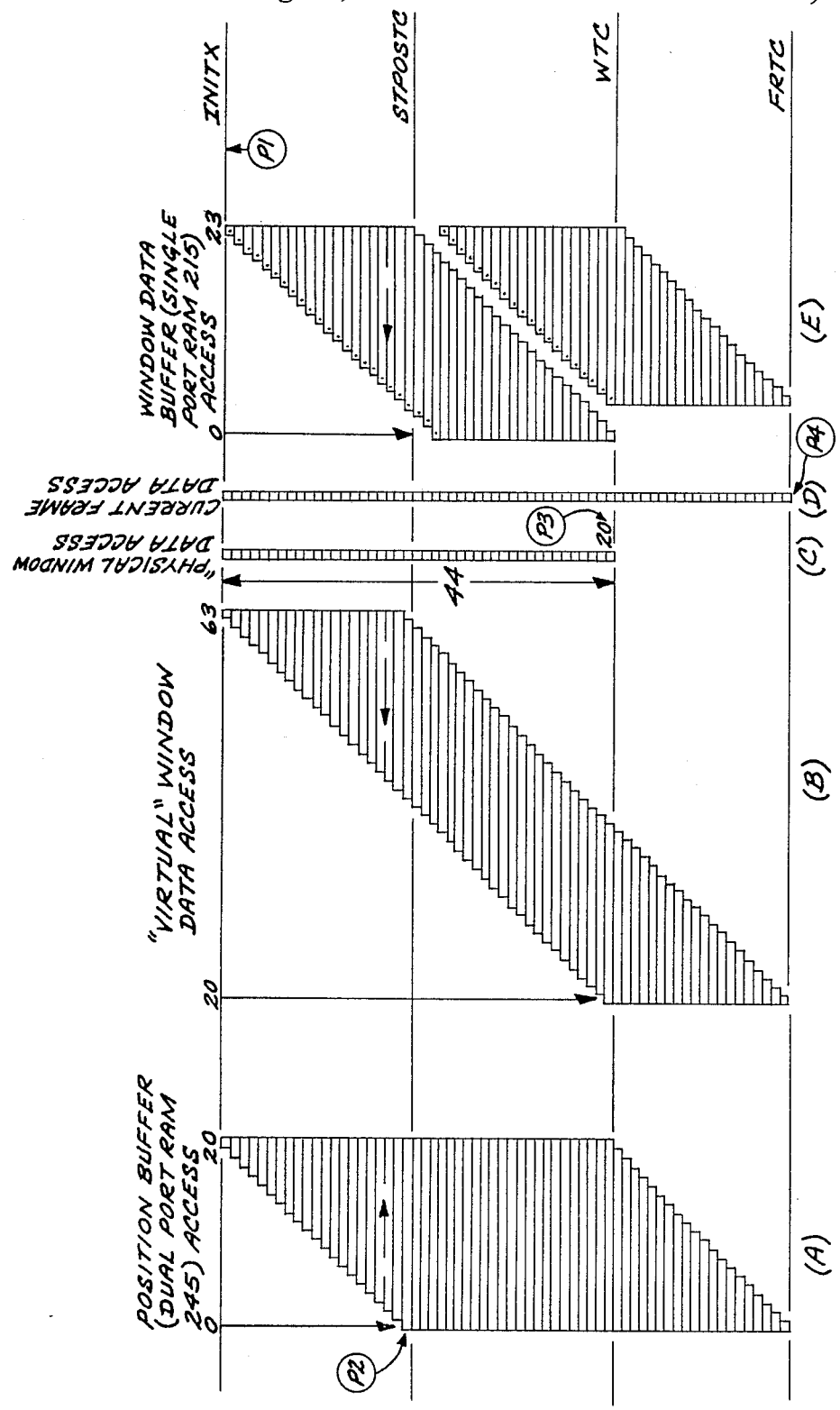
FIG. 14 illustrates the novel correlation technique of the invention.

Referring to FIG. 14, five regions (a) through (e) are depicted. Each region is divided into a series of horizontal strips where each strip represents a correlation "pass" as defined above. The second level of iteration can be viewed as a vertical traversal of the diagram. Each horizontal strip is divided into squares where each square represents the comparison of two 4-bit data operands, i.e., the current frame operand and the reference window operand. Hence, the third level of iteration can be thought of as a horizontal movement within the strips of such region. The direction of traversal is depicted by arrows in the center of regions (a), (b) and (e). It is noted that all strips in regions (a), (b) and (e) sharing the same vertical displacement are of the same length and that the areas of those regions are equal to the area of the region in FIG. 13.

Region (a) of FIG. 14 represents the accesses to the dual port RAM position buffer 245 (FIG. 9A). For example, on the first pass, only the position location for position 20, i.e., p[20], is accessed. On the second pass, positions P[19] and P[20] are accessed. On the third pass the sequence is P[18], P[19], P[20]. Each access involves a read of the accumulated value stored at the appropriate position address in buffer 245, a summing of the comparison result for the respective operands at accumulator 235, followed by a write of the updated value to the appropriate position address in buffer 245. The dual port ram implementation of the position buffer 245 (FIG. 9A) allows both these accesses to occur in one 100 nanosecond cycle, so all accesses could be performed in $22 \times 44 \times 32 \times 100$ nanoseconds = 2.9 milliseconds, an acceptably short access time for this embodiment.

Region (b) of FIG. 14 depicts the accesses to the reference window that would be made to the frame buffer 28 if no window data buffering were employed. Hence, this region is denoted as "virtual." Note that each access within a strip proceeds in the opposite direction to that of the position buffer. For example, the access sequence on the third pass is W[63], W[62], W[61].

The rightmost current frame column, denoted as C[63] is accessed only once, when it is compared against the rightmost column of the reference window W[63] at the rightmost position P[20]. This operation is performed in the first pass. C[62] is accessed twice, once when compared with window W[62] at position P[20] and once with W[63] at P[19]. This sequence is performed in the second pass.

Because each access to the frame buffer 28 requires 400 nanoseconds, directly accessing window operands from the frame buffer according to region (b) would require 22 ×44×32×400ns=12.4 milliseconds. This would violate camera illumination constraints, and mandates some form of window buffering or "caching" scheme.

By examination of region (b) in FIG. 14, it can be seen that each pass contains at most only one more reference window address value than the previous pass. For example, the first pass accesses W[63]. The second pass accesses W[63]and W[62]. If W[63]is saved from the first pass, then the second pass will have to access only one new value: W[62]. The new reference window operand value always occupies the leftmost position within the strip. It can also be seen that the last twenty passes contain no new reference window operands and, therefore, require no frame buffer access for the reference frame. Thus, each pass needs at most only two accesses to the frame buffer 28, one for the current frame operand and one for the reference window operand, if any. The current frame accesses to the frame buffer 28 are shown in region (d) of FIG. 14, and the reference window accesses are depicted in region (c). It should also be noted that the maximum length of each pass never exceeds twenty-one for this example, which corresponds to the number of positions correlated against. Thus, no more than twenty-one window values need to be buffered at any one time in this example. As the maximum number of positions allowed in correlation is twenty-four, this observation means that the window buffer need contain only twenty-four locations WB[0] to WB[23].

Region (e) of FIG. 14 represents the address sequences to the reference window buffer 215. The location to which the new window operand is written is denoted by a dot in the center of the access. Note that the window buffer addresses wrap around, i.e., when the address counter 217B (FIG. 15) is at zero and the decrement command (DEC WIND) is received, the address counter automatically reloads to 23. Note that location 23 is written to twice; on the first pass W[63]is written to WB[23], and on the 29th pass W[49]is written to WB[23]. This is because W[63]is not required after the 21st pass, allowing that location to be safely reused.

Figure 15:
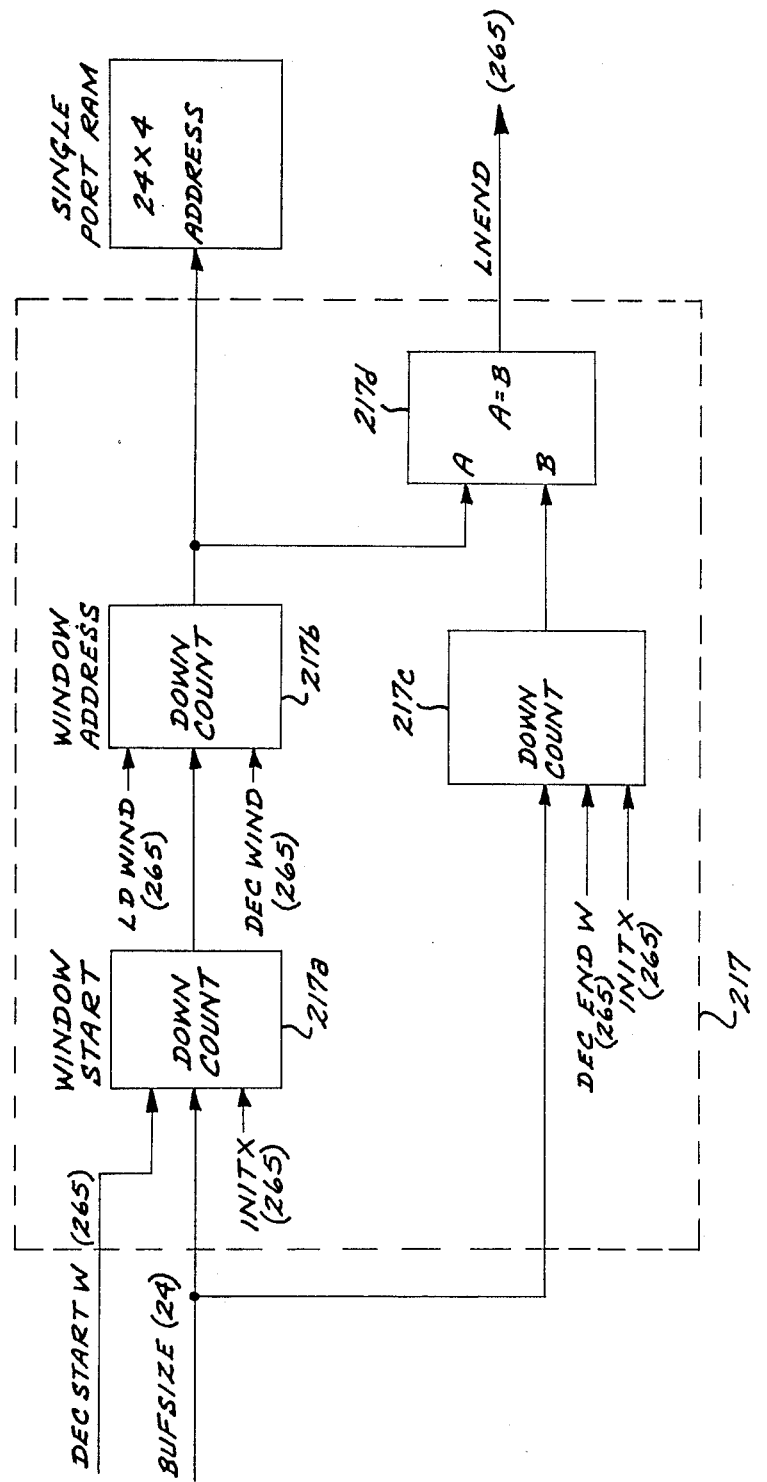
FIG. 15 illustrates in further detail the single port RAM address generator 217 (FIG. 9A).
Figure 16:
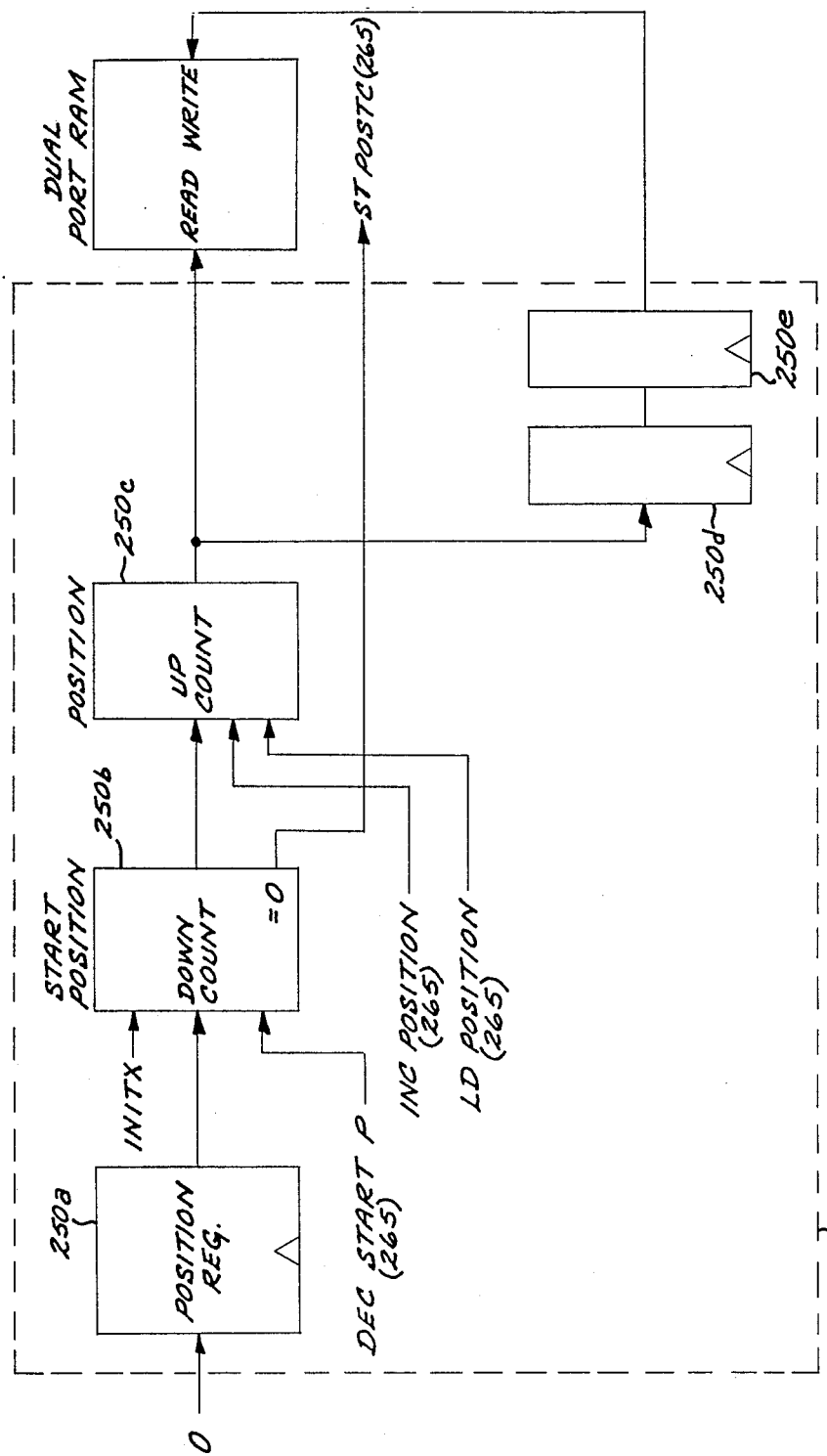
FIG. 16 illustrates in further detail the dual port RAM address generator 250 (FIG. 9A).

FIGS. 15 and 16 show the implementations of the address generators 217 and 250 (FIG. 9A) in further detail. Address generator 217 comprises the "window start" down counter 217a, the "window address" down counter 217b, the "window end" down counter 217c, and the "line end" comparator 217d (FIG. 16). The "window start" down counter 217a receives as its start count the signal BUFSIZE representing the needed size of the buffer, here 24.

FIG. 16 shows the address generator 250 (FIG. 9A) in further detail. The generator 250 comprises the "number of positions" register 250a, the "start position" down counter 250b, the "position" down counter 250C, and registers 250d and 250d, which together provide a two clock cycle delay to the B (write) address port of the dual port RAM 245. Register 250a receives input information from the central controller 50 via the serial interface 500 specifying the number of positions to be correlated, as determined by the central controller 50.

The address sequences shown in regions(a) and (e) of FIG. 14 have three properties associated with them, the generation of the starting address, the generation of intermediate addresses, and the detection of end conditions. The start address for the position buffer 245 is called the start position. At the beginning of each line, the signal "INITX" is generated, causing the start position counter 250b (FIG. 16) to be initialized to the value stored in the "number of positions" register 250a (FIG. 16), in this example 21. The window buffer start address counter 217a (FIG. 15) is always initialized to the buffer size minus one, in this embodiment, twenty-three. On each successive pass, the position start count of counter 217a is decremented (DEC START P) until it reaches zero. This condition is detected at point P2 (FIG. 14) and the signal "STPOSTC" generated to reflect this condition. STPOSTC causes the position start count of counter 217a to remain at zero and the window start address of counter 217b to decrement (DEC START W) on each successive pass.

Having computed the start addresses, the low-level controller comprising correlation control 265 waits until the frame and window FIFO buffers 205 (FIG. 9A) and 210 (FIG. 9A) indicate that the window and frame operands have been fetched from the frame buffer 28. When the data are ready (signal VALID) , the start addresses are transferred on receipt of signals LD POSITION and LD WIND to the appropriate address generators 217 and 250 (FIG. 9A). The signal "INITX" enables operation of counter 217a, 217b(FIG. 15) and 250b (FIG. 16). The address generators are updated on receipt of the INC POSITION and DEC WIND once the start addresses have been provided until the end condition is met. Because all the address sequences in one pass are of the same length, only the end condition for one of the sequences needs to be calculated, in this case the window buffer 215 address. Window addresses are generated until the contents of the window address counter 217b match the contents of the window end counter 217c.This match is called "LNEND" and indicates the end of a pass. The end window address for each pass is maintained in the "window end" counter 217c (FIG. 15) which is initialized to 23 as a result of "INITX" and decrements on receipt of DEC END W on each successive pass until all window data operands have been accessed. This condition is generated by the window FIFO 210 (FIG. 9A) at point P3 on FIG. 14 and is labelled "WTC." WTC also causes the window start address to decrement on each pass. This continues until the frame data FIFO 205 (FIG. 9A) indicates that all frame operands have been exhausted (point P4 on FIG. 14). This condition is labelled FRTC and signals the end of correlation for one line.

Figure 17A:
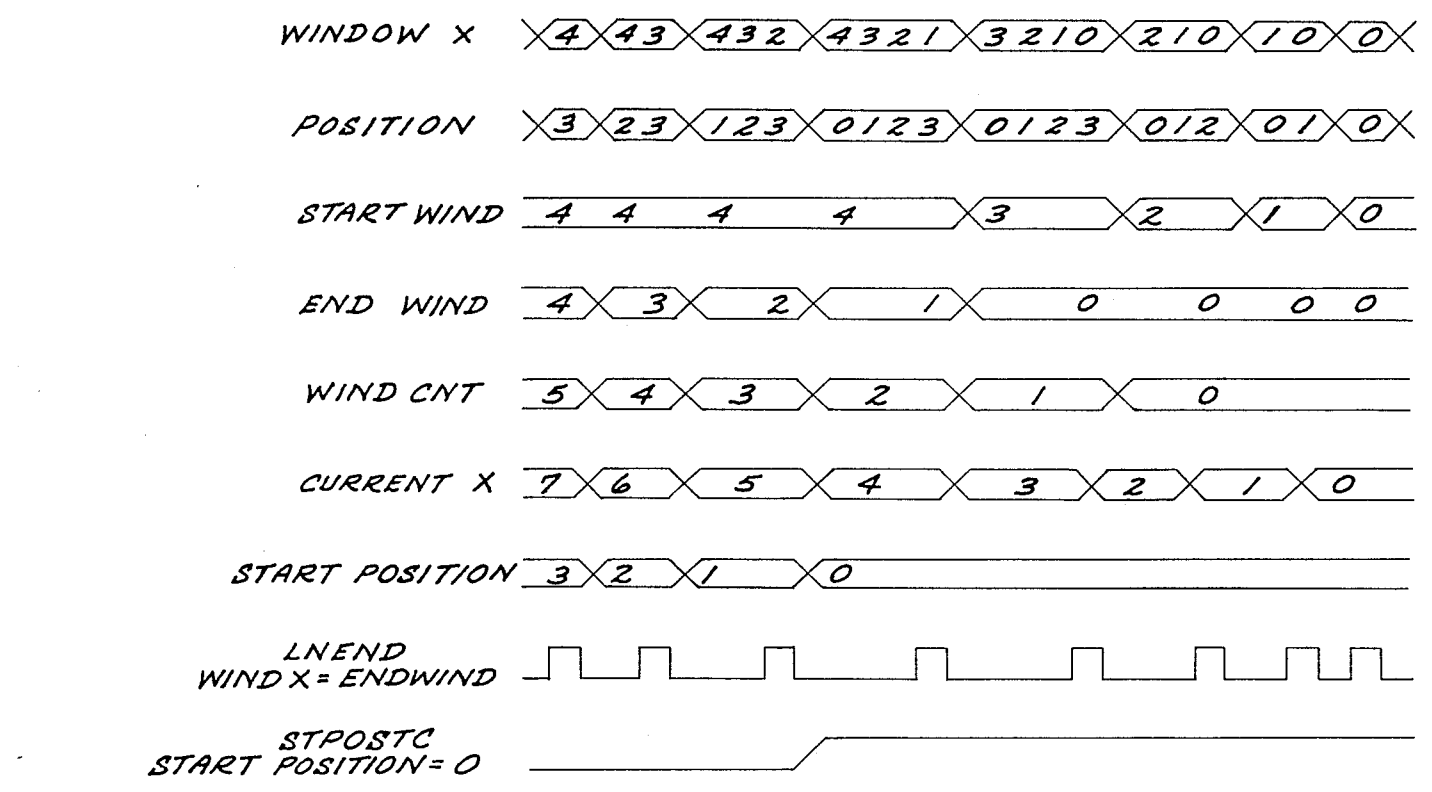
Figure 17B:
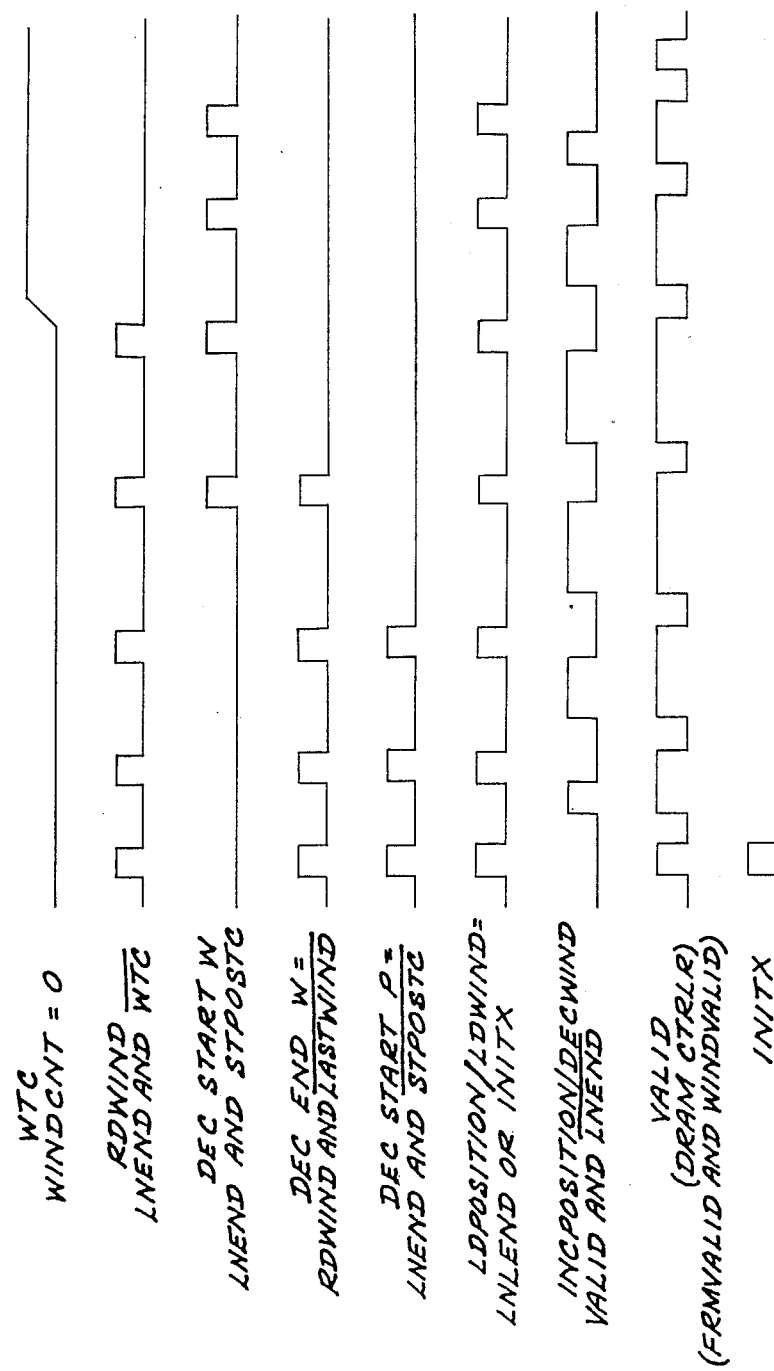
Figure 17C:
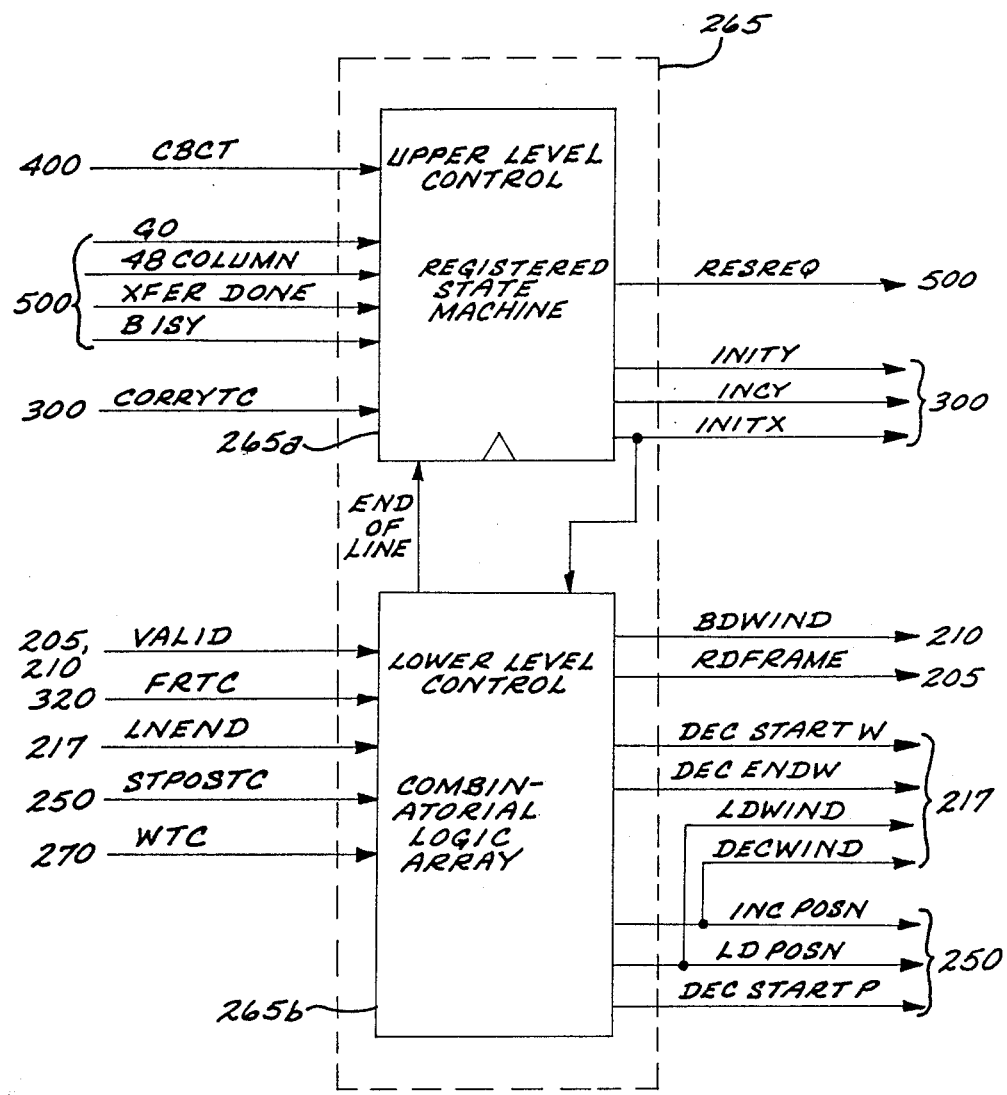
FIGS. 17C and 17D are respective schematic block diagrams of the correlator logic 265 (FIG. 9A) and the correlation address generator 320 (FIG. 9B) which provide certain of the signals shown in FIGS. 17A and 17B.

FIGS. 17A and 17B are signal waveform timing diagrams, showing the waveforms for the various timing or control signals discussed above. For simplicity and clarity, these waveforms are drawn for the simplified correlation example of FIG. 8H, i.e., a four-position correlation with a window size of 5 and a current frame length of 5. FIG. 17C illustrates the correlator control logic 265, which generates many of the control signals shown in FIGS. 17A and 17B. Logic 265 comprises a registered state machine 265a to implement the upper level control depicted in the flow diagram of FIG. 12. Thus, state machine 265 receives the control signal CBCT from logic module 400, signals 60, 48 COLUMN, XFER DONE and BUSY from the serial interface 500, the signal CORRYTC from logic module 300, and the signal "END OF LINE" from the combinatorial logic array 265b. The state machine 265 generates the signal RESREQ sent to the serial interface 500, and the signals INITY, INCY and INITX sent to the logic module 300. The INITX signal is also sent to the lower level control logic, the combinatorial logic array 265b.

The array 265b receives the signal VALID provided when the FIFO buffers are both not empty, the signal FRTC from generator 320, the signal LNEND from address generator 217, the signal STPOSTC from address generator 250, and the signal WTC from window count register 270. From these signals, the combinatorial logic array 265b generates the following signals. The signals RDWIND and RDFRAME are provided to FIFO buffers 210 and 205, respectively. The signals DEC START W, DEC END W, LD WIND and DEC WIND are provided to address generator 217. The signals INC POSITION, LD POSITION (the same as the respective signals DEC WIND and LD WIND) and DEC START P are provided to address generator 250.

Figure 17D:
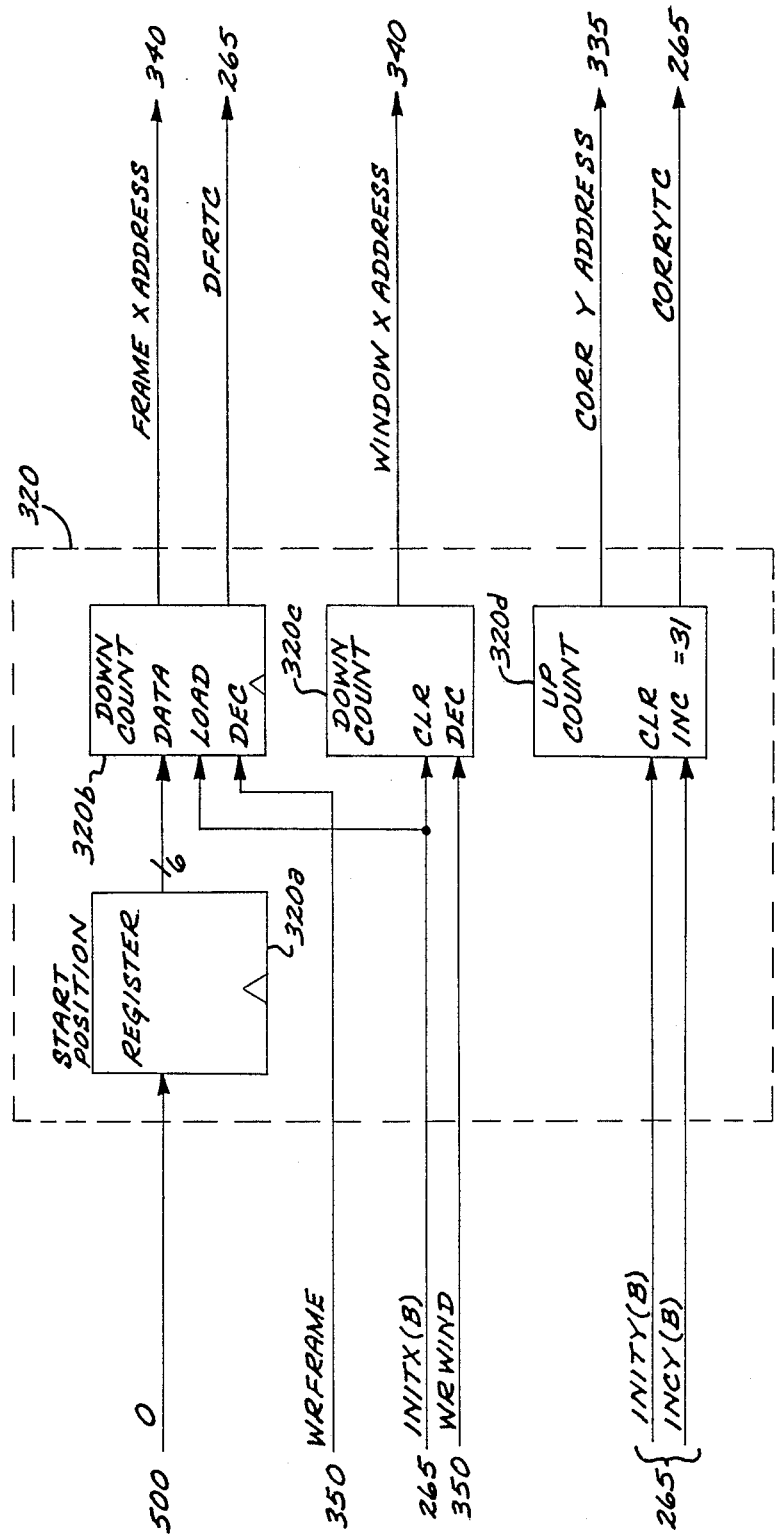

The correlator address generator 320 (FIG. 9B) is shown in further detail in FIG. 17D. The generator 320 comprises the start position register 320a, down counters 320b and 320c and up counter 320d. The start position of the address generator 320 is written to register 320a by the central controller 50 via the serial interface 500. This data is loaded into the down counter 320b upon receipt of the signal INITX from control logic 265. The counter 320b decrements upon receipt of the bussed group of signals WRFRAME from DRAM control logic 350. The current count of the counter 320b provides frame X address (FRAME X ADDRESS) to the X address multiplexer 340. When the count of counter 320b equals zero, the signal is generated and provided to control logic 265.

The counter 320c provides the X address for the window operand, the bussed group of signals (WINDOW X ADDRESS) which is also provided to multiplexer 340. The counter 320c is cleared by the signal INITX received from logic 265, and is decremented by the signal WR WIND received from DRAM control logic 350.

Up counter 320d provides the Y address used to define the window and current frame operands during correlation, i.e., the bus CORR Y ADDRESS provided to the Y address multiplexer 335. When the counter state equals 31, indicating that the last line is being correlated, the signal CORRYTC is generated and provided to correlator logic 265 The counter 320d is cleared by the signal INITY received from correlator logic 265, and is incremented by the signal INCY, also received from correlator logic 265

The image acquisition and camera control logic module 400 is shown in the block diagram of 9D. This logic module controls image acquisition, provides camera status to the central controller, provides user feedback and performs the computation-intensive operations used in the automatic exposure algorithm.

Figure 6B:
FIG. 6B illustrates the four states of operation of the image sensor.
Figure 6C:
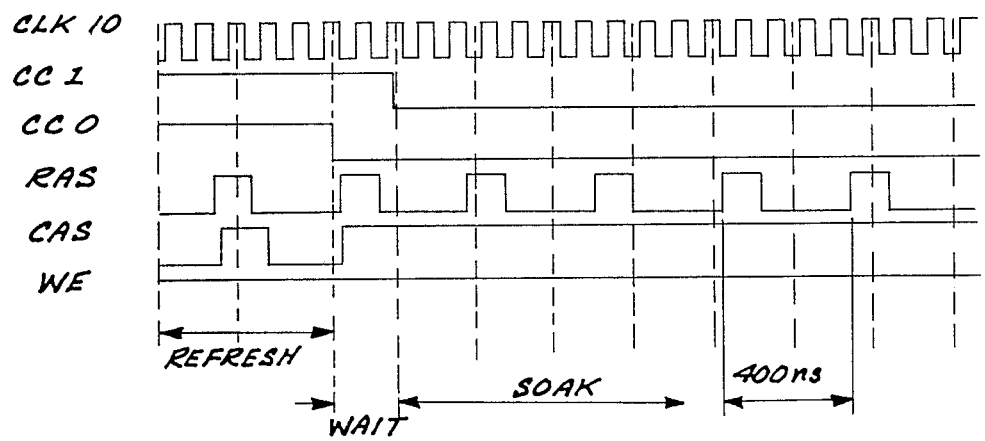
FIG. 6C-E are a signal waveform timing diagrams showing the state of the image sensor control signal during the respective soak, read and refresh states of the image sensor.
Figure 6D:
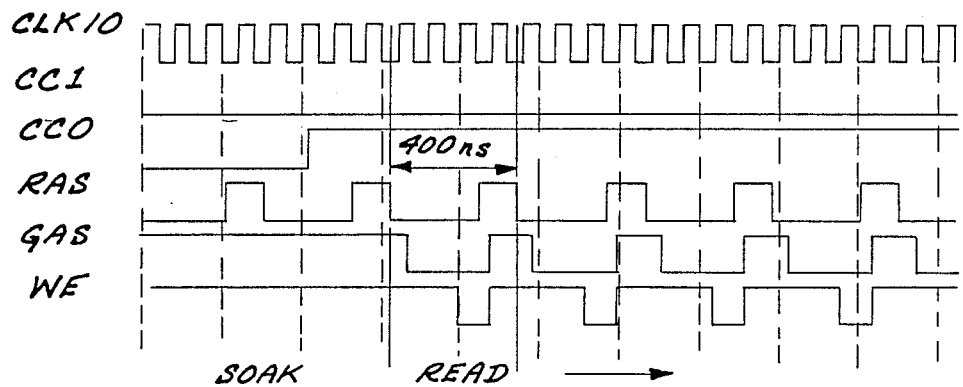
Figure 6E:
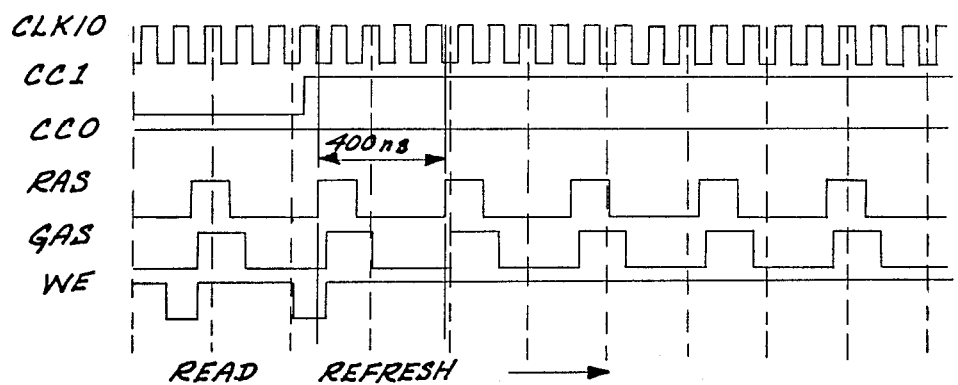
Figure 6F:
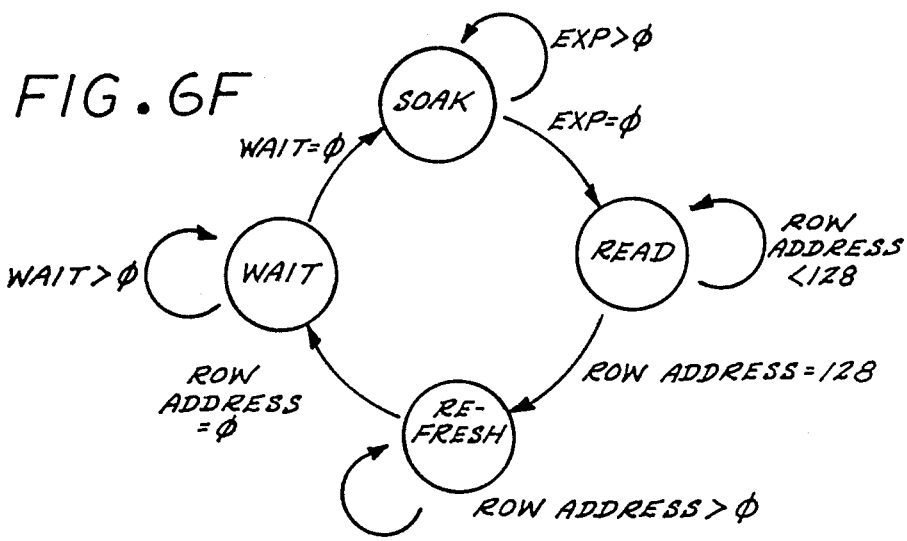
FIG. 6F is a state diagram showing the operation of the image sensor state machine controller.
Figure 9D:
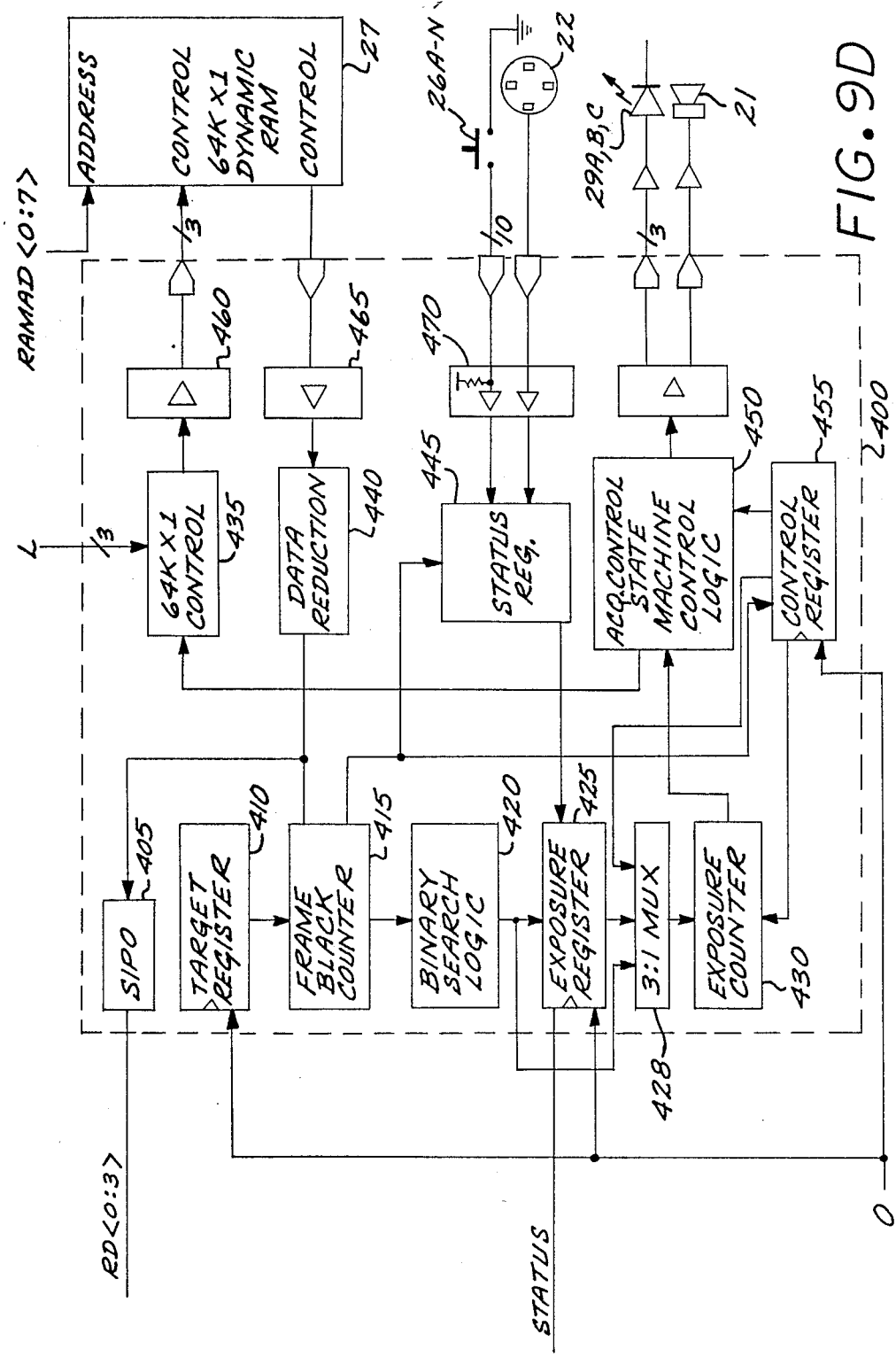

The image acquisition logic shown in the block diagram of FIG. 9D consists of the control logic 435, the data reduction logic 440, the serial-in-parallel-out (SIPO) register 405 and the acquisition control state machine 450. The acquisition control state machine 450 runs asynchronously to any other processing. The four acquisition states are read, refresh, wait and soak, as indicated in FIG. 6B. The acquisition control state machine receives inputs from the sensor address generator 330 (FIG. 9B) and the exposure counter 430 (FIG. 9D) which is loaded via the 3:1 multiplexer 428 with one of three values: the exposure register 425 value (the exposure value written by the central controller 50), the wait counter value (written to the control register 455 by the central controller), or camera trial exposure register 425 value (FIG. 9D). The acquisition state machine diagram is shown in FIG. 6F.

The soak state is the state in which the camera LEDs 29A and 29B (FIG. 2) are turned "on" and the image is exposed. The soak time is adaptively controlled by the controller 50 and for this embodiment can have a maximum value of 3.2 milliseconds. A hardware default soak time $T_{def}$ of 51 microseconds is used after power-up and when the camera is idle ("off page" ) in the absence of an exposure value from the controller 50.

During the soak state, the RAS signal must be active for proper operation of the image sensor 27 (FIG. 2). The image sensor row address must be in the unused array (rows 128–255) to ensure proper image acquisition. The soak cycle timing signal waveforms are shown in FIG. 6C.

The read state of the image sensor 27 (FIG. 2) is the state in which the image array is read and data is stored in the frame buffer 28 (FIG. 2) for correlation. A 400 nanosecond read-modify-write cycle is used in the read state. The addressed pixel is read and the memory location is written to the value 1. If sufficient light intensity falls on this location during the next soak period, the location will be read out as a 0 (white); otherwise the location will be read out as a 1 (black). The read state timing signal waveforms are shown in FIG. 6D.

The refresh state of the image sensor 27 (FIG. 2) is the state in which the unused array of the image sensor is refreshed. Although this array is unused, it must be periodically refreshed to ensure proper operation of the image sensor 27. The refresh operation is accomplished at the conclusion of the read state. An entire row is refreshed by addressing a single bit in the row. A 400 nanosecond cycle is used to refresh each row. The total time required to refresh the 128 rows of the unused array is 51.2 microseconds. During refresh, only RAS and CAS are active as shown in FIG. 6E.

The wait state is used by the controller to delay the start of the next frame acquisition. The wait time is written to the control register 455 (FIG. 9D) and loaded into the exposure counter 430 (FIG. 9D) at the refresh-to-wait state transition. As in the soak state, the RAS signal must be active in the wait state and the row address must be in the unused array (row 128–255). The wait state timing waveforms are the same as the soak state timing diagrams (FIG. 6D).

The image sensor control logic 435 (FIG. 9D) receives state input from the acquisition state machine and DRAM control signals from the DRAM timing and control logic 350 (FIG. 9B). The control logic enables the appropriate control signals for the image sensor for the given acquisition state. The control logic 435 is coupled to the image sensor through drivers 460 (FIG. 9D).

The placement of the cell locations of the device employed as the image sensor 27 (FIG. 2) in this embodiment does not allow the image sensor cells to be read in a straight line fashion. The video processor 30 contains two eight-bit up/down counters comprising sensor row address counter 330 (FIG. 9B) to provide the row and column addresses and support two addressing schemes which provide low resolution and high resolution image data.

In low resolution mode, half of the resolving power of the image sensor 27 (FIG. 2) is sacrificed. The array is scanned in a zig-zag pattern by providing a constant row address and allowing the column address to increment through the column addresses of the row. The least significant bit (LSB) of the row address is tied to the column address LSB to allow the row address to alternate between even and odd addresses as the column address increments. The resulting address pattern for row 0 would be as follows: row 0 and column 64 (i.e., R0C64) R1C65, R0C66, R1C67, R0C68, R1C69, etc. This is shown in FIG. 6G, wherein the shaded pixels are the ones read in the low resolution mode. The first column is 64 because only the middle columns of the upper array are read. The image resolution provided by this address scheme is 1.5 mils in the X or row direction and 2 mils in the Y or column direction, for the particular image sensor employed in this embodiment. A total of 8192 pixels are read in this mode for a read time of 3.28 milliseconds (400 nanoseconds per pixel). The image produced by this addressing scheme is 128 rows of pixels by 64 columns of pixels.

A second addressing mode can be used to provide higher resolution image data to preserve small features. In the high resolution mode, the entire image array 27 is addressed to provide 1.5 mil resolution in the X direction and 1 mil resolution in the Y direction. The address pattern in high resolution mode is as follows: R1C64, R0C66, R2C65, R1C67, R1C66, R0C68, R2C67, R1C69, etc. This address pattern is necessitated by the placement of cell locations on the image sensor 27. This addressing mode reads 16130 pixel locations for a read time of 6.45 milliseconds. The number of pixels read is not exactly twice the number read in low resolution because the address pattern for the final image column is as follows: R127C64, R126C66, R128C65. This address sequence attempts to read data from row 128 which is in the lower array and has inverted data (recall that this array is not used). When the row address reaches 128, the acquisition state machine makes the read-to-refresh state transition (this is also true in low resolution mode). The high resolution address mode produces images which have 63 columns by 256 rows (and two pixels in the final column which are unused).

A second high resolution mode is employed to preserve small image features while keeping the frame size below 8192 pixels. In this mode, referred to as compressed high resolution mode, adjacent pixel pairs are logically ORed. This reduces the frame size to 8065 pixels (63 columns by 128 rows and one pixel in the final column which is not used) and still preserves small features. The read state time for the compressed high resolution access mode is the same as for the uncompressed high resolution mode as the same number of pixels are read from the image sensor.

The acquisition resolution mode (low resolution, uncompressed high resolution and compressed high resolution) is controlled by the central controller 50 (FIG. 1) by writing to the camera control register 455 (FIG. 9D). At system power-up, the low resolution mode is selected.

The frame acquisition cycle time varies according to the camera resolution mode selected, the wait time and the soak time. Table II shows maximum and minimum cycle times for low resolution and high resolution modes.

TABLE II

| ACQUISITION CYCLE TIMES | | | |
|---|---|---|---|
| Low Resolution | | High Resolution | |
| Min | Max | Min | Max |
| 3.38 msec | 9.86 msec | 6.55 msec | 13.03 msec |

The values shown in Table II are specific to the disclosed embodiment. The minimum values are calculated with a soak time of 51.2 usec and a wait time of 0 (the minimum values possible). The maximum values are calculated with wait and soak times of 3.2 msec (the maximum values possible).

The data reduction logic 440 is coupled to the image sensor 27 through drivers 465 (FIG. 9D). The SIPO register 405 receives serial input data and provides four-bit output data to be written to the frame buffer for correlation. The data reduction logic 440 is used to control the shift operation of the SIPO register 405 under the three acquisition modes.

Status information consisting of the frame black pixel count, the window black pixel count, the current exposure value and user inputs (primarily function key status) is sent to the central controller 50 at the end of each data acquisition cycle. The frame black counter 415 (FIG. 9D), the window black counter 260 (FIG. 9A), the exposure register 425 (FIG. 9D), the camera status register 445 (FIG. 9D) are connected in series. Shift operation of these counters and registers is controlled by the serial interface logic 500 (FIG. 3) at the conclusion of the data acquisition cycle.

The frame black counter 415 (FIG. 9D) is a 16-bit synchronous counter with the following modes of operation: hold, increment shift, parallel load and an asynchronous clear. During data acquisition, this counter is cleared at the start of the read cycle and increments once for each black pixel which is read.

The exposure register 425 (FIG. 9D) is a read-write register. The central controller 50 writes the desired exposure values to this register (e.g., the optimum exposure, minimum exposure, etc.) and reads exposure values used to calculate the optimum exposure for a media sample. Although the register is a 16-bit register in this embodiment, only the lower eight bits are used to set exposure.

The camera status data is loaded into the camera status register 445 (FIG. 9D) at the end of each frame acquisition. The status register 445 contains sixteen possible data bits. In this embodiment, bit 0 indicates the status of the camera "go" function key 26B, bit 1 indicates the status of the "on page" function key 26A, and bits 2–4 indicate the priority encoded function key inputs. Bit 5 indicates that the binary search algorithm for the exposure control is complete and that the exposure register contents are valid. Bit 6 is a priority encoder flag for the camera function keys. Bit 7 indicates whether correlation has taken place on the last frame of data and can be used to indicate a frame overrun condition. This bit is cleared (to 0) at power-up and is set (to 1) when correlation has taken place on the previous frame of data. Bits 8 through 15 indicate the the horizontal camera velocity or DeltaX value in columns per frame. This value is cleared at power-up and increments on each pulse from the optional shaft encoder and is latched at the end of data acquisition. The resulting value can be used in estimating white space.

Camera function key inputs are debounced by clocking into D-type flip-flops. The sample rate for the flip-flops is derived from the camera acquisition time. The minimum sample period is 13.5 milliseconds. The camera 25 user feedback indicators comprise the red/green status LED 29G (FIG. 2) and the camera buzzer 21 (FIG. 3). The central controller 50 controls the status LEDs and the buzzer by writing to the control register 455 (FIG. 9D). The sixteen bits loaded into this register contain the following information. Bits 0 and 1 are used to control the red/green status LED in accordance with Table III.

TABLE III

| BIT 1 | BIT 0 | ACTION |
|---|---|---|
| 0 | 0 | Status LED off |
| 0 | 1 | Status LED red |
| 1 | 0 | Status LED green |
| 1 | 1 | not used |

Bits 2 and 3 are used to select the camera resolution mode for data acquisition in accordance with Table IV.

TABLE IV

| BIT 3 | BIT 2 | ACTION |
|---|---|---|
| 0 | 0 | Select low resolution mode |
| 0 | 1 | Select compressed high resolution mode |
| 1 | 0 | Select uncompressed high resolution |
| 1 | 1 | not used |

Bits 4 and 6 are used to control the camera buzzer in accordance with Table V

TABLE V

| BIT 6 | BIT 4 | ACTION |
|---|---|---|
| 0 | 0 | Buzzer disabled |
| 0 | 1 | DC buzzer drive signal |
| 1 | 0 | 4.8 kHz buzzer drive signal |
| 1 | 1 | 2.4 kHz buzzer drive signal |

Bit 5 is to control the camera light source LED 29 activity when the camera is "off page." When bit 5 is 0, the status LED is turned off and the hardware minimum exposure value (51 microseconds) used when the camera is taken "off page." When bit 5 is 1, the status LED activity and the camera exposure time is controlled by the central processor 50.

The status indication defaults to the "off" condition, and the hard-wired minimum exposure is selected upon power-up or after a reset. The hardwire default condition may be overridden by the central controller 50 to programmably control the status LED as desired.

Bit 7 selects the particular sensor used in the camera, here either the array described above or a CCD sensor. Bits 8 through 15 are used to delay the start of the next frame acquisition. The value is loaded into a counter with 12.8 microsecond resolution. A maximum delay of 3.2 milliseconds is possible.

The camera control register 455 specifies the "wait time" count, two-color LED control, camera resolution, buzzer control and a bit to select off-page LED control by the central processor 50. The wait time is a count of (12.8 microseconds) clock periods to delay before entering the soak phase of image acquisition at the conclusion of the refresh phase.

The target register 410 may be written by the central processor 50 with a value indicating a target number of black pixels. This value is used to start a binary search to find the exposure that produces the closest frame black count which does not exceed the target.

After receiving the "on page" indication from the "on page" function key 26A, the central controller 50 writes a default exposure value to the exposure register 425. The frame black pixel count determined by the frame black counter 415 is sent at the end of each acquisition cycle to the central processor 50 and is used to determine if the camera 25 is on background or image data. If the camera is on background the automatic exposure algorithm is used to calculate the optimum exposure for the media.

The exposure register 425 may be written to set the exposure time. This is the count of clock periods (12.8 microseconds in the this embodiment) to drive the image sensor light source LEDs and soak the reflected light into the image sensor 27.

The values $T_w$ and $T_b$ for the media characteristic curve are calculated by a binary search process performed by the binary search logic 420. The central controller 50 writes a target frame black count to the target register 410 of the video processor 30.

Two target values representing frame black counts of 97% black pixels and 3% black pixels (the breakpoints along the characteristic curve, FIG. 7) are used in the automatic exposure algorithm. A total of sixteen frames of data are acquired to achieve the two exposures values which correspond to these target frame black counts. The central controller 50 calculates the optimum exposure value for the media sample using the exposure values returned by the binary search circuitry and writes the optimum exposure value to the video processor exposure register 430 (FIG. 9D).

The binary search logic 420 employs a binary search process to find the eight bit exposure value which corresponds to a given black pixel count (referred to as the target value) for a given background color. With this binary search process, a single bit in the trial exposure register 425 is tested each frame, starting with the most significant bit and working to the least significant bit. A total of eight frames are required to test all bits. The value contained in the trial exposure register 425 determines the length of time that the image array is exposed to light (the length of the soak period). At the conclusion of the soak period, the frame black count is compared to the target value. If the black count is less than the target value, the exposure value in the trial exposure register was too high and the bit under test is set to zero. If the frame black count is greater than the target value, the exposure value in the trial exposure register is too low and the bit under test remains at 1. After all bits have been tested, the "exposure valid" flag in the status register 445 is set to 1 and the contents of the trial exposure register 425 are loaded into the exposure register 403 (FIG. 9D) and sent to the central controller 50 via the serial interface 500 with the camera status data.

Figure 18:
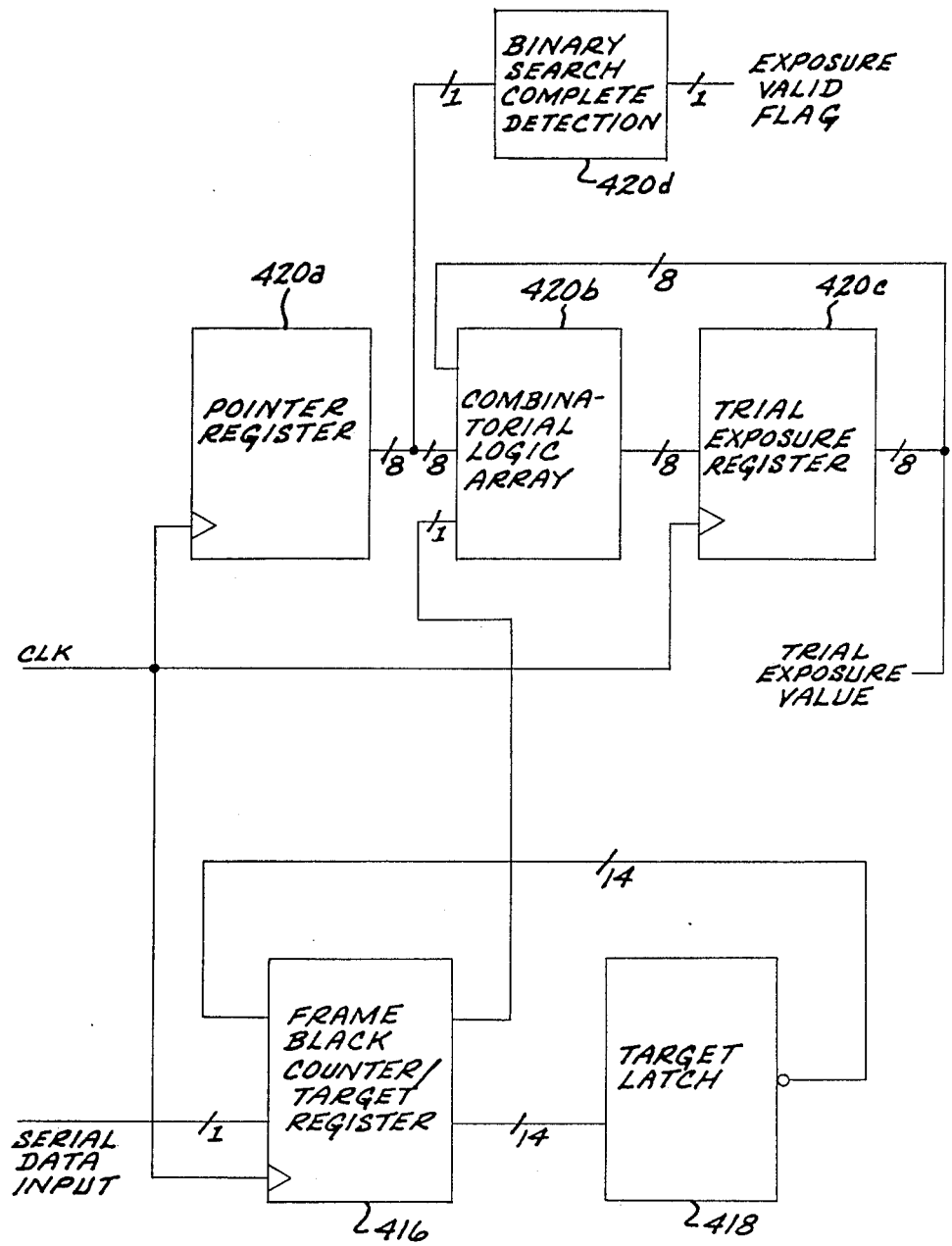
FIG. 18 is a block diagram illustrative of the binary search logic 420 (FIG. 9D).

The binary search logic 420 is shown in further detail in the block diagram of FIG. 18. The logic 420 comprises an eight bit shift register 420A (referred to as the pointer register) used to select the bit under test and to detect the completion of the binary search process, a combinatorial logic array 420B, and an eight bit register 420C (referred to as the trial exposure register). The combinatorial logic array 420B has as inputs the pointer register output, the trial exposure register 420C output, and bit 14 from the frame black counter 415.

The frame black counter 415 and the target register 410 are implemented as a single 16-bit register, shown in FIG. 18 as counter/register 416, which performs the functions of both the frame black counter 415 and target register 410. The counter/register has the following modes of operation: hold, increment, shift and parallel load. During data acquisition, the frame black counter increments when a black pixel is read from the pixel array. The counter/register 416 is shifted with serial data via the serial interface module 500 when the central controller writes to the target register. Following a write to the target register 410, the target value is loaded into the target latch 418 to store the target value for all eight frames of the binary search process and eliminate the need for the central controller 50 to write to the target register after each frame is acquired. The target value latch 418 stores only the 14 least significant bits of the target value. The target value can be represented in fourteen bits because the greatest black pixel count which can occur is 16130 (in uncompressed high resolution mode).

The binary search process is initiated by a write to the target register and is synchronized to the camera state machine. The camera control logic 450 (FIG. 9D) produces the signals necessary to shift the pointer register, load the trial exposure register and select the trial exposure register value as the data which is loaded into the exposure counter (through the 3:1 multiplexer 428), provided a write to the target register has occurred.

The frame black counter 415 is used to compare the target value to the frame black count for the data acquired in the following manner. The one's complement of the fourteen bit target value contained in the target value latch is loaded into the frame black counter at the completion of the soak period (provided a write to the target register occurred prior to the start of the soak period). The two most significant bits of the frame black counter are loaded with zeros. For example, if the target value were 8 (represented as 0008 hexidecimal), the frame black counter would be loaded with 3FF7 hexidecimal. Note that the two most significant bits are zero. During the data acquisition cycle, the frame black counter is incremented for each black pixel that is read. If the black pixel counter is less than or equal to the target value, bit 14 of the counter will remain zero. If the black pixel count is greater than the target value, bit 14 will become a 1. Returning to the example above, the counter is loaded with 3FF7 hexidecimal and frame acquisition begins. If the black pixel count is 0 to 8, the output of the frame black counter will be 3FF7 to 3FFF, respectively. If the black pixel count is 9 or more, the frame black counter value will be 4000 hexidecimal or larger. Note that the final value of bit 14 in the frame black counter indicates whether the frame black count was greater than or less than the target value. In addition, bit 14 cannot become a 0 again if it was 1 (until the frame black counter is loaded on the next frame) because the maximum black pixel count possible is 16130. Bit 14 is used as an input to the binary search logic 420 to determine the final value of the bit under test.

The binary search process tests a single bit each frame. A total of eight frames are required for completion. The frame black counter is loaded with the inverse of the target value (contained in the target value latch) each frame at the conclusion of the soak cycle. The pointer register 420A shifts once each frame to indicate which bit is under test and to cause the "exposure valid" flag to be set when all bits have been tested. The final exposure value at the conclusion of the binary search process is loaded into the exposure register and sent to the central controller 50 via the serial interface 500 with the camera status data. This exposure value is used by the central controller 50 to calculate the optimum exposure value for the media under test. The binary search process will not occur if the target register is not written by the central controller.

Referring now to FIGS. 19A–19G, a flowchart of the operation of the system is set forth. Cold start operation begins (step 1000) with the setting of the system parameters to cold default constant values (step 1002). The parameters initialized here are set forth in Table VI:

TABLE VI

| Parameter Name | Description |
| --- | --- |
| FRAME WHT | Minimum white pixel count to declare white space. |
| K0 | used to determine weak correlation. |
| K1 | used to determine poor correlation. |
| MAX PIXELS | number of pixels in one frame. |
| P0 | P0, P1, P2 used to determine |
| P1 | the optimum exposure time. |
| P2 | |
| $N_b$ | 3% black pixel count for exposure control. |
| $N_w$ | 3% white pixel count for exposure control. |
| $T_{def}$ | default exposure value. |
| $T_{min}$ | minimum exposure allowed. |
| $T_{max}$ | maximum exposure allowed. |
| WINDOW WHT | threshold to assume not all-white. |
| $T_{bckgnd}$ | black pixels required to assume on-character. |
| MAXWHTCOL | maximum number of white columns to save. |

At step 1004, the camera interrupts are disabled and the variables are initialized. These variables are set forth in Table VII:

TABLE VII

| Variable Name | Description |
| --- | --- |
| ADJCOL | number of columns in the line buffer to back up when white area begins. |
| DELTAX | number of new data columns. |
| NEWDELTAX | |
| EST. NEXT WBC | estimated value of WBC for next frame. |
| FBC | frame black count from the camera. |
| OLDFBC | FBC value from previous frame. |
| CORRSLTO | number of mismatches in leftmost correlation result. |
| $T_b$ | exposure time to obtain 97% black pixels. |
| $T_w$ | exposure time to obtain 97% white pixels. |
| $T_{opt}$ | optimum exposure time. |
| WBC | window black count from the camera. |
| WHTCOLCNT | number of contiguous white columns saved. |
| WINDOW SIZE | size of correlation window. |
| BESTCORR | number of mismatches for best correlation results. |
| WORSTCORR | number of mismatches for worst correlation results. |
| CORRWIDTH | number of positions between equal best correlations. |
| AVGCORR | average number of mismatches |

TABLE VII-continued

| Variable Name | Description |
| --- | --- |
| | for all correlation results. |

The camera interrupts are enabled at step 1006 where warm start operation commences, and at step 1008, selected parameters are changed to the current configuration, i.e., in dependence on the camera resolution in use.

Next, the software flags set forth in Table VIII are cleared.

TABLE VIII

| FLAG NAME | DESCRIPTION |
| --- | --- |
| BOS | set at beginning of each scan. |
| EOS | set at end of each scan. |
| FRZ | set to "freeze" the function keys. |
| SCN | set during a scan, cleared to terminate the scan. |
| WEAKCORR | set when a weak correlation is detected. |
| OLKWKCOR | set when the previous frame had a weak correlation. |

At step 1012 (also point A, where "hot" start operation commences), the camera hardware is initialized and the camera interrupts are enabled. A one frame wait occurs next (step 1014); the specific subroutine for performing this wait is described below with respect to FIG. 20. After waiting one frame acquisition cycle, the system is ready for operation. At step 1016 (also point B), the camera status LEDs are turned off and the value for the minimum exposure time parameter ($T_{min}$) is written to the camera. At step 1018, the idle wait time is written to the camera, and another one frame wait occurs (step 1020). The "on page" function key 26A is checked (step 1028) and if the camera is not "on page," the program operation loops back to step 1020 until the function key 26A is activated.

Once the "on page" condition is detected, the scan or "go" function key 26B is checked to determine if the operator has signaled that a scan operation is to commence (step 1030). If not, then program operation loops back to step 1020. If scan operation is to begin, i.e., with both the "on page" and scan keys activated, then at step 1032 the SCN flag is set, the FRZ flag is set and the exposure default value $T_{def}$ is written to the exposure register of the video processor 30.

Steps 1034-40 reflect the background processing to determine whether the camera is placed over an information bearing portion of the media (a character, in this embodiment). After waiting one frame (step 1034), the SCN flag is checked and if not set, program operation branches to point B (at step 1016). If the SCN flag is set, then at step 1038 the variable FBC, the frame black pixel count value, is tested to determine whether it is less than the parameter $T_{bkgnd}$. If not, this indicates that the camera is "on-character" (step 1040), i.e, the number of black pixels in the frame exceeds a threshold value indicating that a non-white image has been acquired, and program operation branches to point C (step 1080). If the value of FBC is less than the threshold, then at step 1042 several events occur. The camera red status LED is activated, indicating the system is not ready for image acquisition, and a target value equal to the number of pixels in the sensor array minus the value $N_b$ is written to the target register of the video processor.

At step 1044 a one frame wait occurs. Next, the SCN flag is checked (step 1046). If the flag is not set, then program operation branches back to point B. If the flag is set, than at step 1048 a test of the binary search algorithm is performed to determine if the algorithm is completed. If not, then operation loops back to step 1044. Once the binary search is completed, then at step 1050 the exposure found during the search is saved as the value for the variable $T_b$. This value is tested at step 1052 for the out of range condition and if out of range, an alert is sounded at step 1054 and program operation branches to point B. If the exposure value for $T_b$ is in the acceptable range, then the $N_w$ target value is written to the target register 410 (FIG. 9D) at step 1054.

At step 1056 a one frame wait occurs. Then the SCN flag is checked (step 1058) and if not set, program operation branches to point B. If the SCN flag is set, then at step 1060 a decision is made as to whether the binary search is complete (step 1060). If not complete, program operation loops back to step 1056. If the binary search is complete, then at step 1062 the exposure found during the binary search is saved as $T_w$. If this value is not within the acceptable range, than an alert is sounded (step 1066) and program operation branches to point A.

If the value saved for $T_w$ is within the acceptable range, then at step 1068, the value of the optimum exposure time $T_{opt}$ is calculated by the central controller. The calculated value is computed against the value for $T_{max}$ and if the value exceeds $T_{max}$, then $T_{opt}$ is set to $T_{max}$ (step 1072). If the value for $T_{opt}$ is less than $T_{min}$, then $T_{opt}$ is set to $T_{min}$ (step 1076). At step 1078, the value for $T_{opt}$ is written to the exposure register of the video processor. At step 1082, the wait time for the camera cycle is calculated and written to the video processor. The green status LED is activated (step 1084).

At this point the camera exposure has been adaptively determined in accordance with the reflectivity of the particular media. At step 1086 a one frame wait occurs. At step 1088 the flag SCN is checked and if not set, program operation branches to point B. If the flag is set, then at step 1094 the parameter FBC is compared against the frame white count value. If the parameter is less than this value, then operation loops back to step 1090. If FBC is not less than the frame white count value, then at step 1096, the BOS flag is set. At step 1098 a 64 column transfer of data is set from the current window. If the camera is on character (step 1100) then at step 1104 operation is set up for an 11 position correlation with window size of 54. If the camera is not on character, then at step 1102 operation is set up for a 48 position correlation with window size of 16.

The next step is to wait one frame (step 1106). At step 1108, the SCN flag is checked to determine whether it is set. If the flag is not set, then program operation branches to point F. If the flag is set, then at step 1110 the correlation results are checked. This is accomplished by accessing the subroutine set forth in FIG. 21, to be described more fully below. At step 1112, if the window black count WBC is less than the parameter value WINDOW WHITE, then the white space correlation mode is entered at point E. If WBC is greater than WINDOW WHITE, then the value for DeltaX is updated to the new calculated value (step 1114).

At step 1116, a test is made to determine whether the flags WEAKCORR or OLDWKCORR are set. If so, then at step 1118, a 48 position correlation is set up with a window size of 16. If neither flag is set, then at step 1120, correlation is set up in dependence on the value of DeltaX. Thus, the window size is set to the maximum of 16 and (54−DeltaX). The number of positions is set at the minimum of 21, (11+DeltaX), (59−DeltaX). At step 1122, the value for DeltaX is checked to determine if it is greater than 0. If so, then at step 1124 the transfer of DeltaX columns from the current window is set up. Program operation then branches to point D, i.e, at step 1106 and the operation commences again.

Figure 19A:
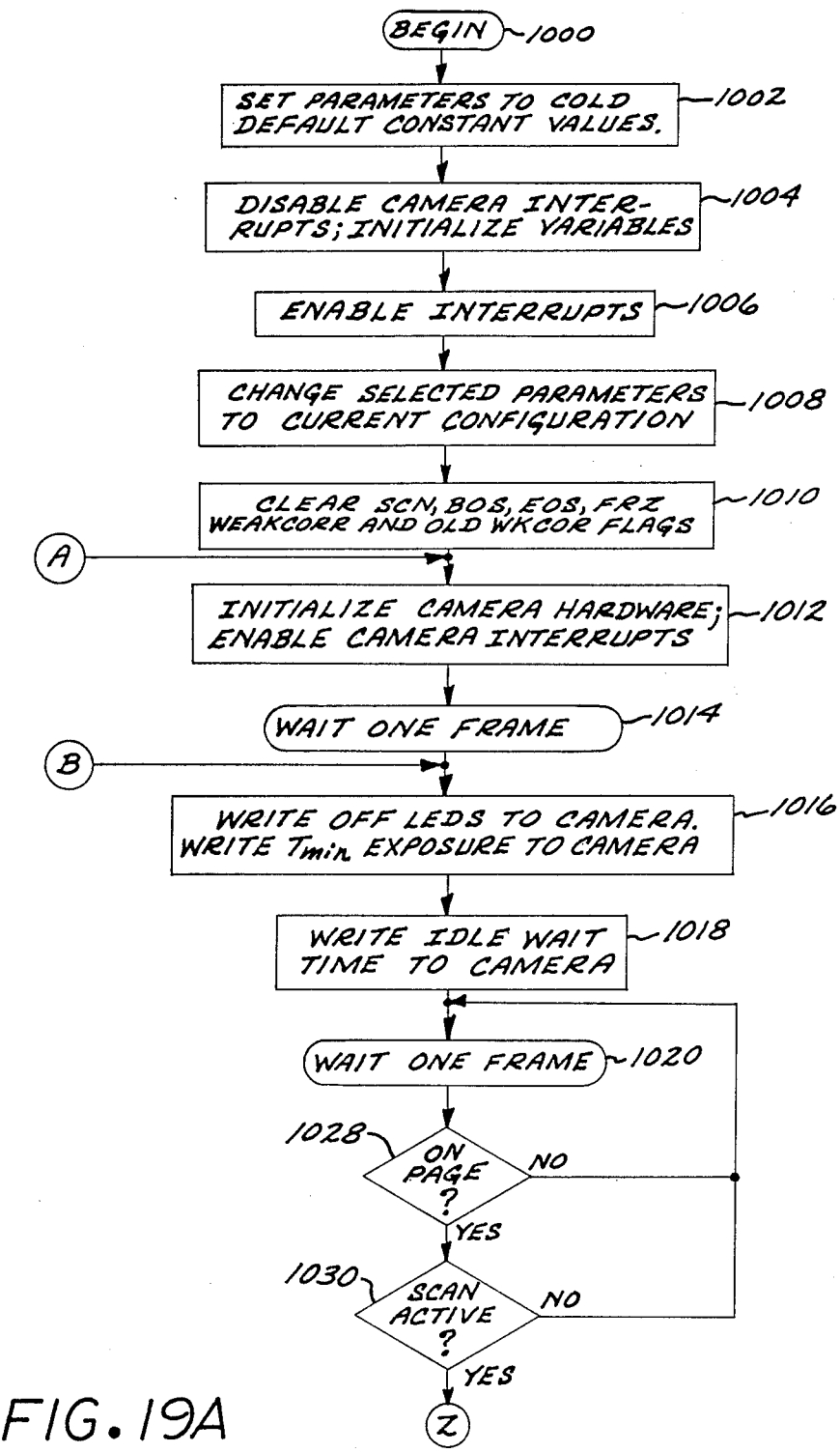
FIGS. 19A-19G are flowcharts of the exposure control and image acquisition process of the system.
Figure 19B:
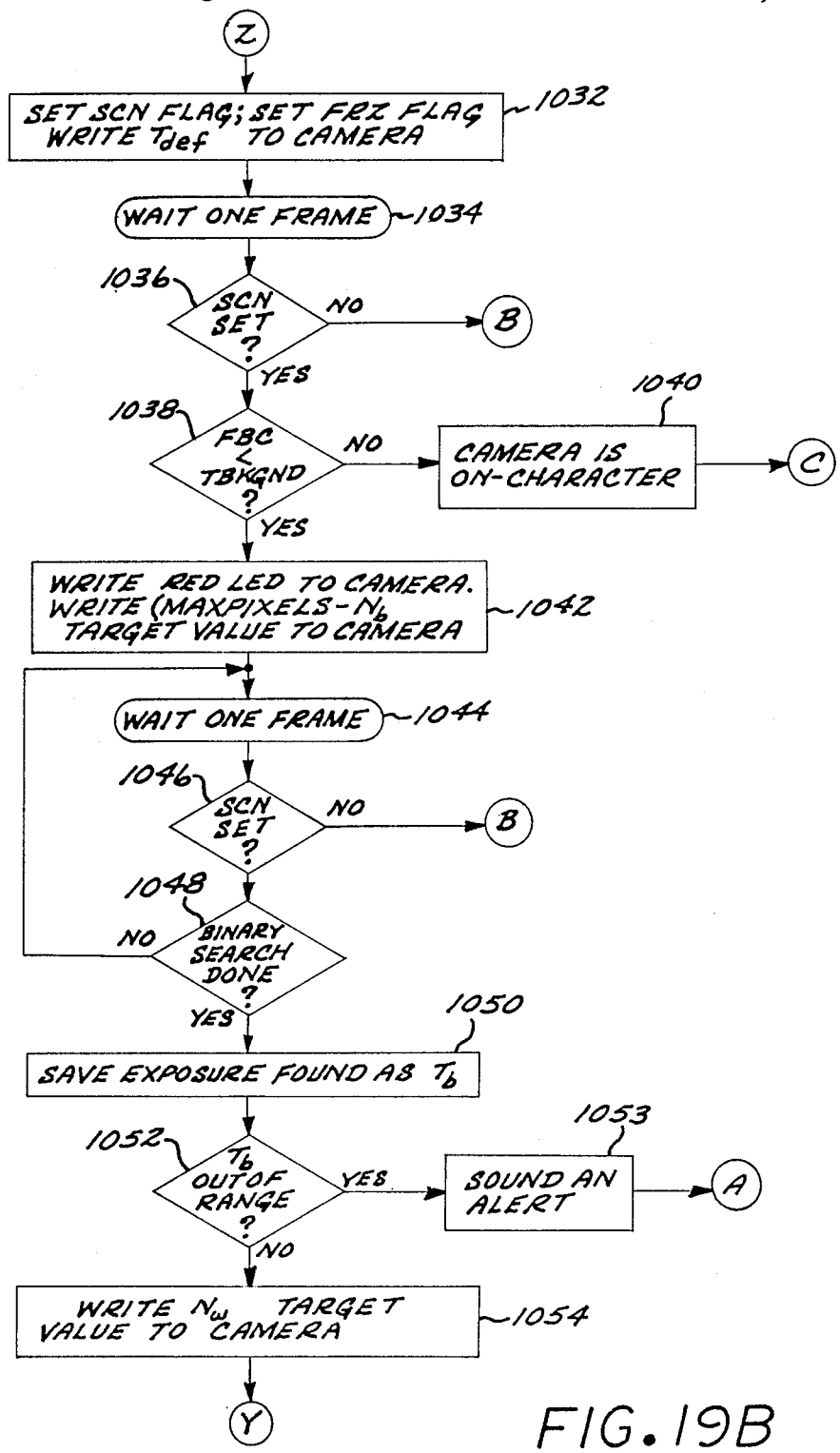
Figure 19C:
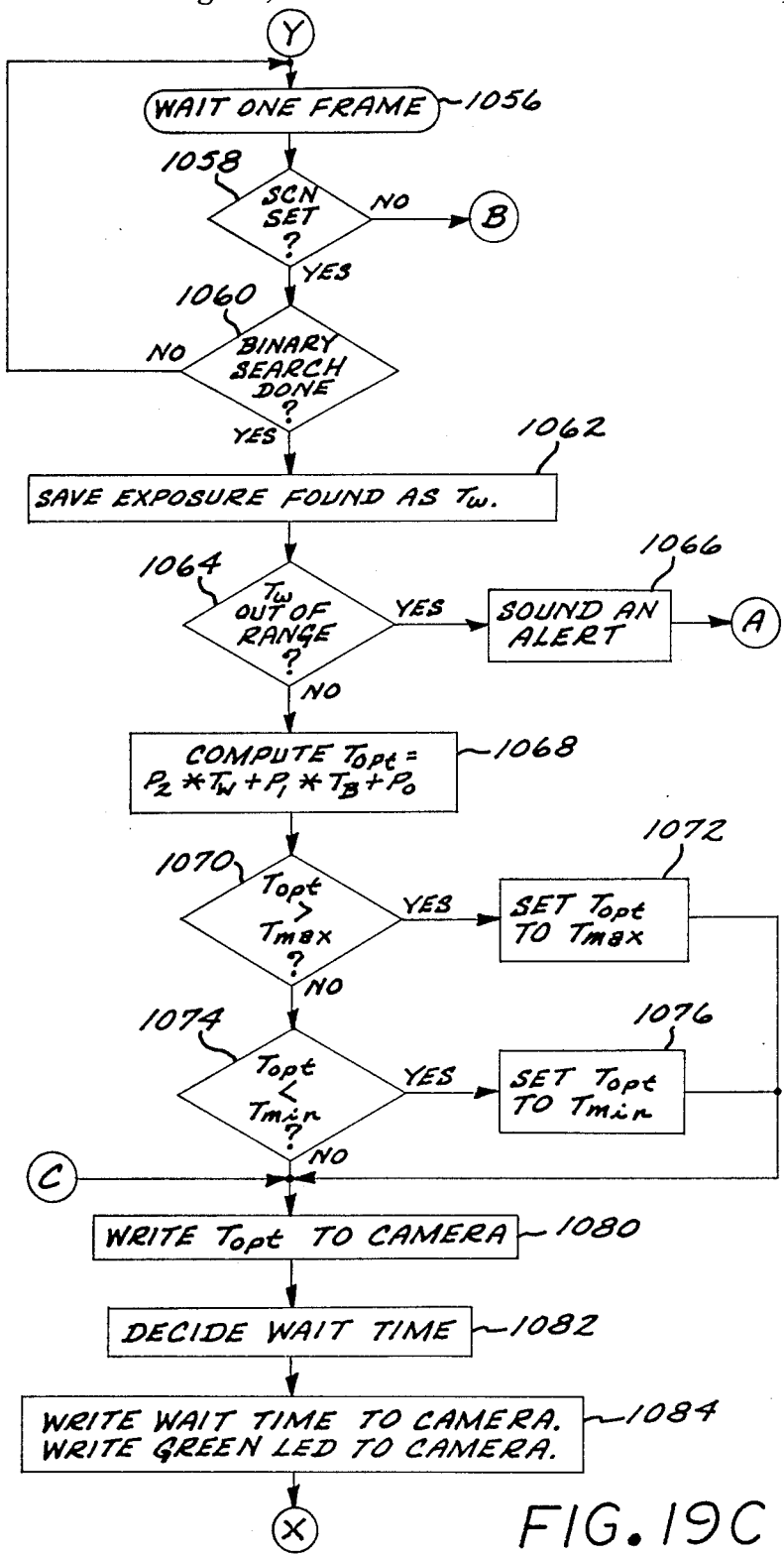
Figure 19D:
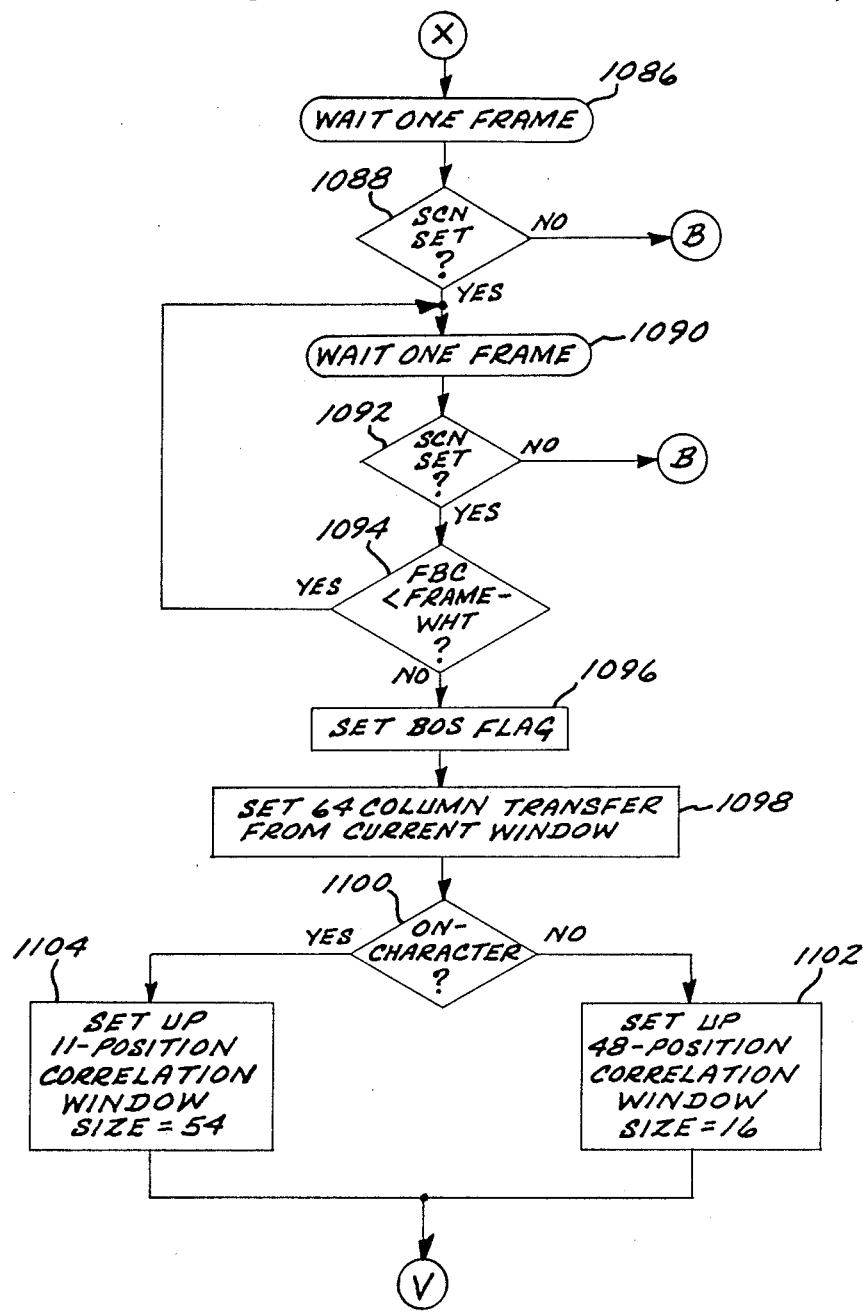
Figure 19E:
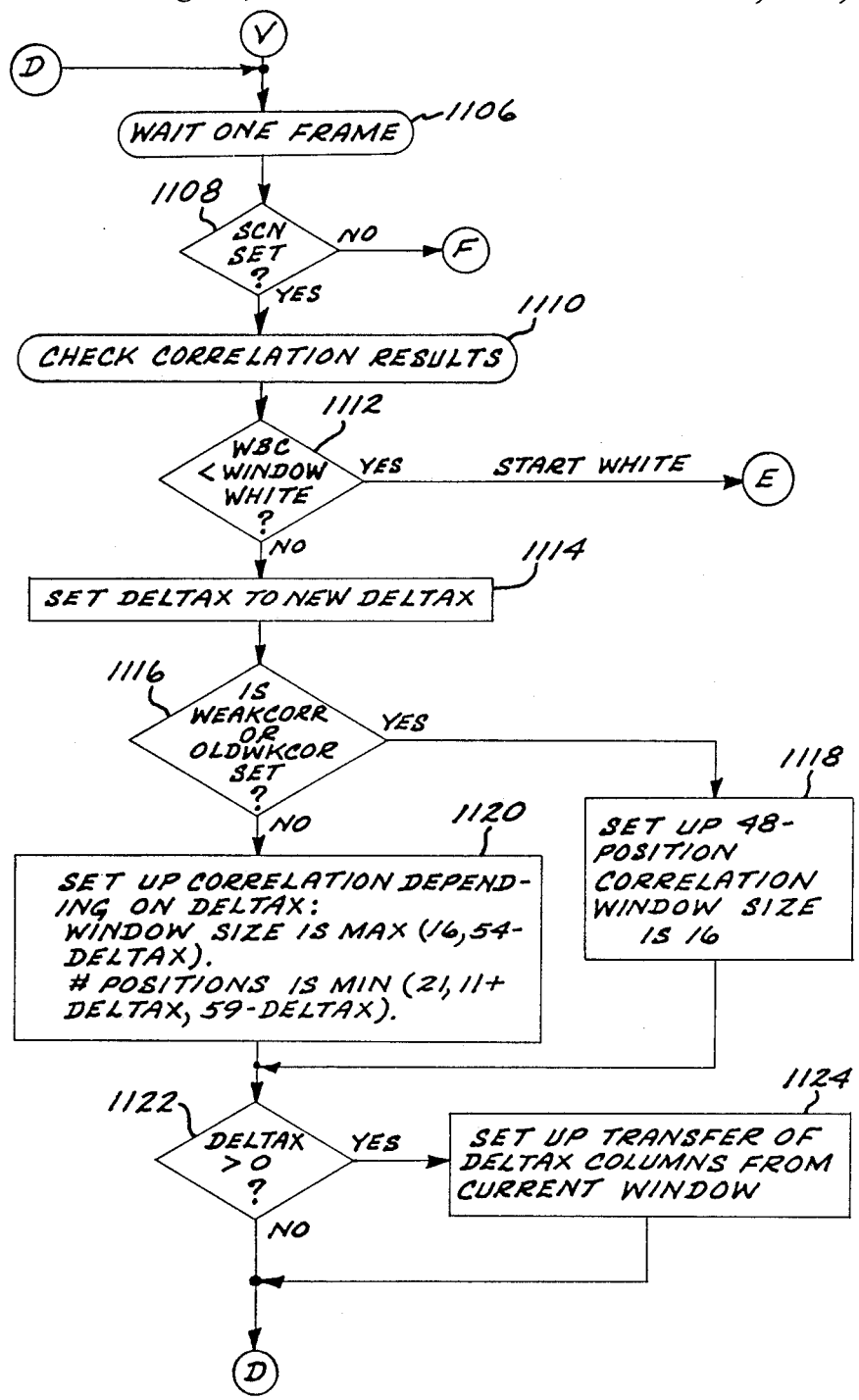
Figure 19F:
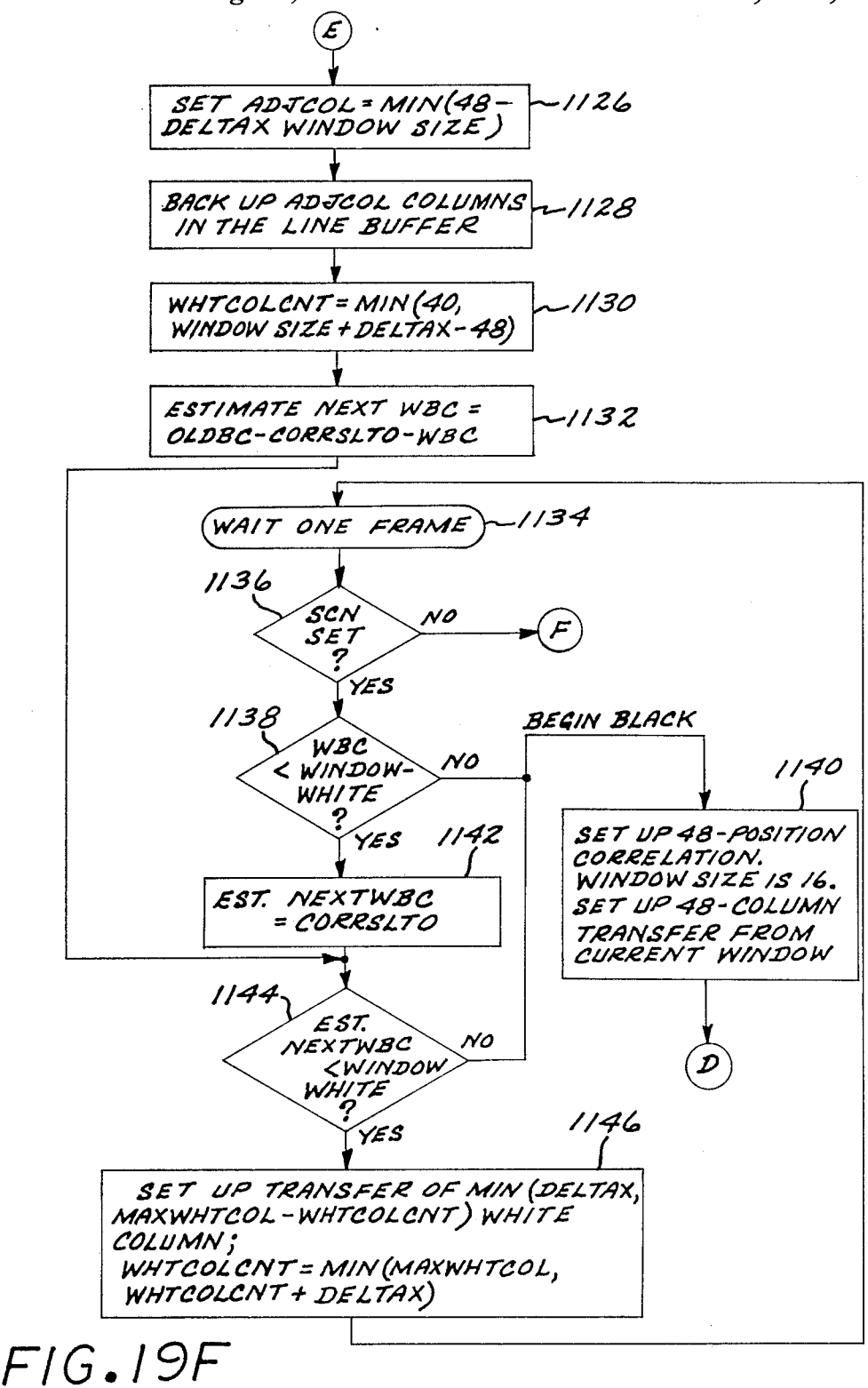
Figure 19G:
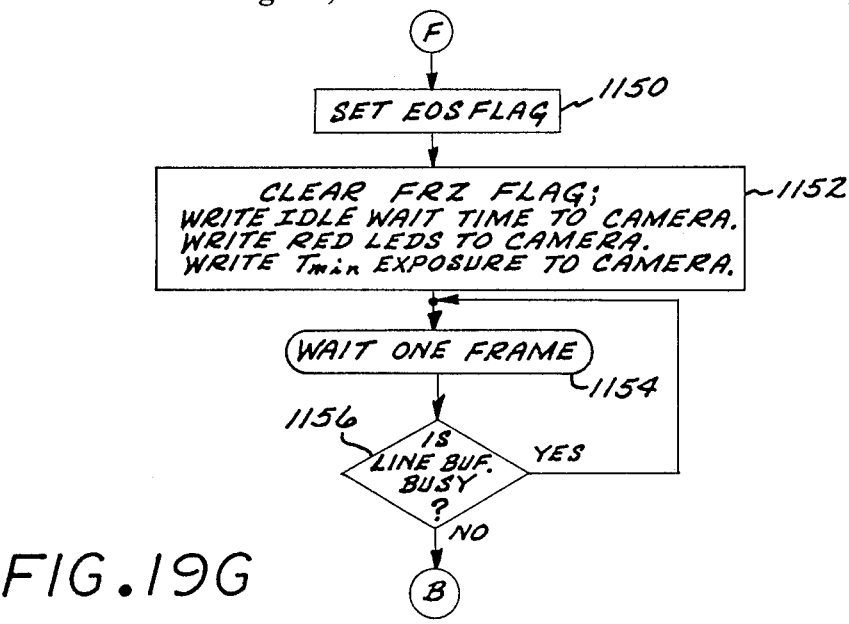

Referring now to FIGS. 19F–19G, point E is at step 1126, setting the variable ADJCOL to the minimum of (48−DeltaX) and the window size. The line buffer position is then backed up by ADJCOL columns (step 1128) and the variable WHTCOLCNT is set to the minimum of (40, window size +DeltaX −48) (step 1130). At step 1132 the variable EST.NEXTWBC is set to (OLDFBC−CORRSLT0−WBC). Control then passes to step 1144, in the middle of the following loop.

A one frame wait occurs at the top of the loop (step 1134). At step 1136 the SCN flag is checked and if not set, program operation branches to point F. If the SCN flag is set, then at step 1138 the window black count variable WBC is compared against the parameter WINDOW WHITE. If not less than the parameter, then at step 1140, a 48 position correlation is set up, with WINDOW SIZE equal to 16, and a 48 column transfer from the current window takes place. If WBC is less than WINDOW WHITE then at step 1142 the variable EST.NEXTWBC is set equal to the variable CORRSLT0.

At step 1144 the variable EST.NEXTWBC is compared against the parameter WINDOW WHITE, and is not less than the parameter, program operation goes to step 1140. If EST.NEXTWBC is less than WINDOW WHITE, then at step 1146, the transfer of a number of white columns equal to the minimum of (MAXWHTCOL−WHTCOLCNT, DELTAX) is set up, then WHTCOLCNT is set to the minimum of (MAXWHTCOL, WHTCOLCNT−+DELTAX). At step 1150, which is point F, the EOS and FRZ flags are set. Next, the idle wait time and $T_{min}$ exposure values are written to the video processor 30 and the status LED is set to red (step 1152). After a one frame wait (step 1154), the line buffer is checked to see if it is busy, and if not, program operation branches to point B; otherwise operation loops back to step 1154.

Figure 20A:
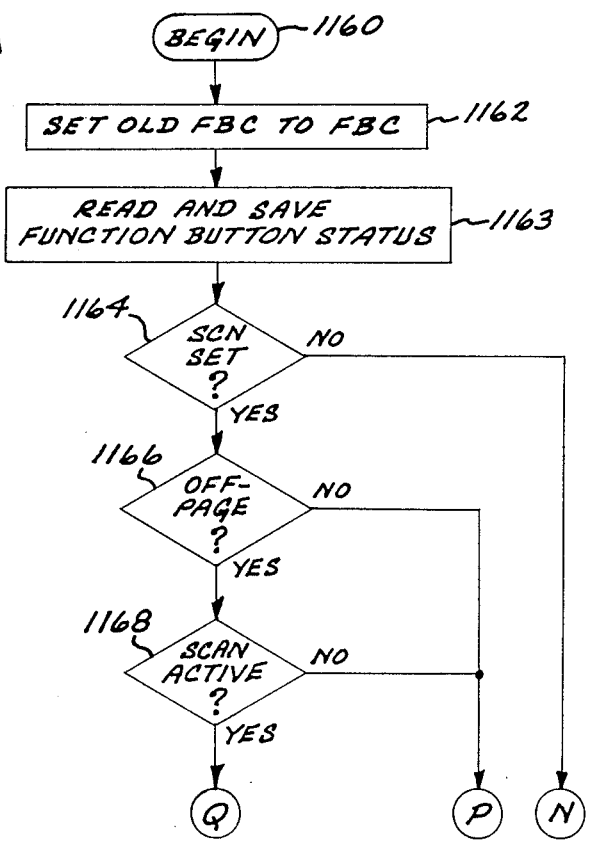
FIGS. 20A-20B are flowcharts of a "one frame wait" subroutine accessed from the operations described in FIGS. 19A-19G.
Figure 20B:
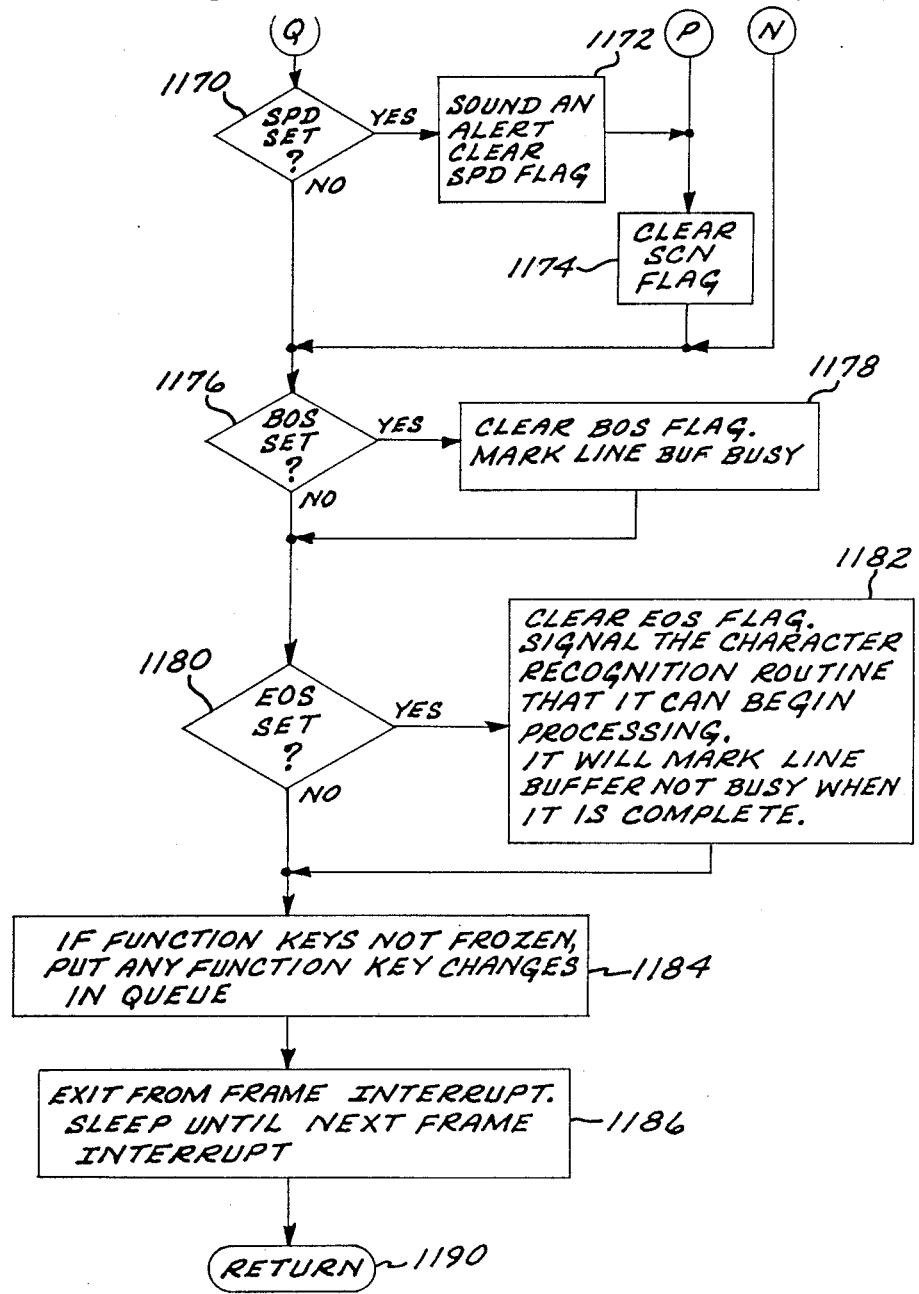

FIGS. 20A–20B illustrate the flow chart for the "wait one frame" subroutine accessed by the program of FIGS. 19A–G. The subroutine is entered at step 1160, and at step 1162, the flag OLDFBC is set to the value of the flag FBC, and the camera function key status is read and saved at step 1163.

At step 1164, the SCN flag is checked, and if not set, operation branches to step 1176. If the flag is set, then at step 1166, the on-page function key status is checked. If the camera is "off-page," operation branches to step 1174, where the SCN flag is cleared, and then to step 1176. If the camera is not "off-page," then at step 1168, the scan function key 26B status is checked to see if it is not active. If the scan key 26B status is inactive, then program operation branches to step 1174. If the scan key status is active, then at step 1170, the flag SPD is checked. If the SPD flag is set, then at step 1172 an alert is sounded and the SPD flag is cleared, and operation goes to step 1174. At step 1176, the BOS flag is checked. If it is set, then at step 1178, the BOS flag is cleared and the line buffer is marked "busy." At step 1180, if EOS is set, then at step 1182, several events occur. The EOS flag is cleared. The image data utilization device (here, the character recognition unit 40 in FIG. 1) is signaled that it may commence processing. The utilization device will mark the line buffer "not busy" when it has completed processing.

If the EOS flag is not set (step 1180) then at step 1184, any function key changes cause status tokens to be placed in the queue, and at step 1186 an exit from the frame interrupt occurs and the program "sleeps" until the next frame interrupt. Step 1190 indicates the return to the general program operation.

Figure 21:
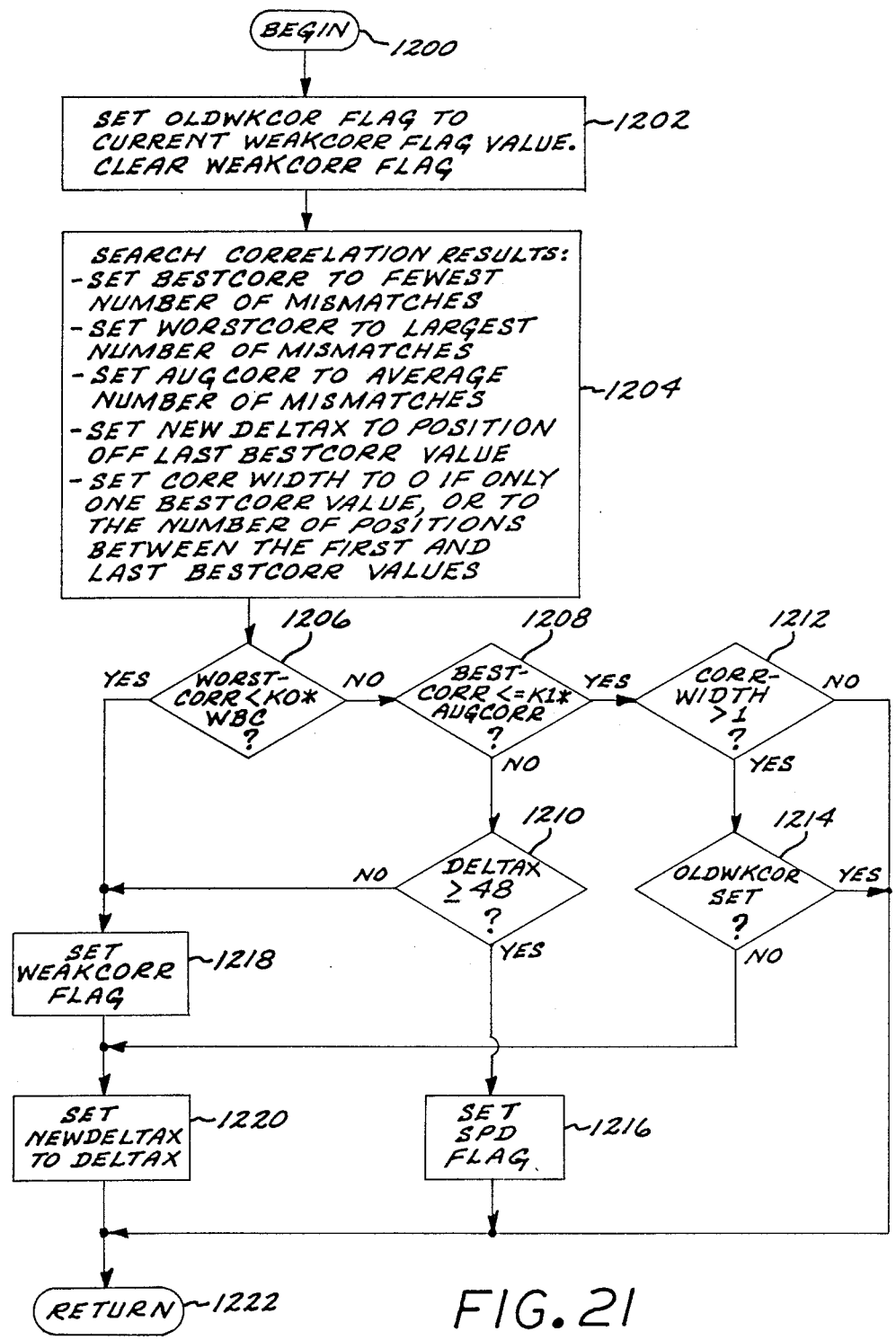
FIG. 21 is a flowchart of the "check correlation results" subroutine accessed from the operations described in FIGS. 19A-19G.

Referring now to FIG. 21, a flow chart of the "check correlation results" subroutine accessed during system operation illustrated in FIGS. 19A–19G is set forth. The subroutine is entered at step 1200, and at step 1202 the flag OLDWKCOR is set to the current value of the flag WEAKCORR, and the flag WEAKCORR is cleared.

At step 1204, the correlation results are searched by the central controller 50. This includes setting the variables BESTCORR and WORSTCORR to the fewest and largest number of mismatches, respectively. The variable AVGCORR is set to the average number of mismatches. The variable NEWDELTAX is set to the number of columns corresponding to the position of the last BESTCORR value. The variable CORRWIDTH is set to 0 if there is only one BESTCORR value, i.e., only one position yielded the fewest number of mismatches, or to the number of positions between the first and last BESTCORR values. Thus, in step 1204, the new value for DELTAX for this correlation, i.e, NEWDELTAX, is determined.

At step 1206, a comparison is made between the variable WORSTCORR and the product of the parameter K0 and the variable WBC. If WORSTCORR is not less than this product, i.e., indicating that the correlation was not weak, then at step 1208, another comparison occurs. The variable BESTCORR is compared against the product of the parameter K1 and the variable AVGCORR. If BESTCORR is less than or equal to this product, then at step 1212 the variable CORRWIDTH is compared against 1, and if not greater than 1, indicating there is only one BESTCORR value, the subroutine ends and operation returns to the main program operation (step 1222). If CORRWIDTH is greater than one, then at step 1214, the flag OLDWKCORR is checked and if set, the subroutine operation ends with a return at step 1222. If the flag is not set, then at step 1220, the value for NEWDELTAX is set to the current value of DELTAX.

If the value for BESTCORR was not less than or equal to the product of AVGCORR and K1 at step 1208, then at step 1210 the value for DELTAX is checked to determine whether it is equal to or greater than 48, i.e., whether the value exceeds the maximum value, thereby indicating the overrun condition. If so, the SPD flag is set (step 1216), and the subroutine operation ends (step 1222). Otherwise, the WEAKCORR flag is set (step 1218), NEWDELTAX is set to DELTAX (step 1220), and the subroutine operation ends (step 1222).

If the result of step 1206 is affirmative, indicating that the weak correlation exists, then the WEAKCORR flag is set (step 1218), NEWDELTAX is set to the current value of DELTAX (i.e., the value for NEWDELTAX determined in step 1204 is not saved, but the current value for DELTAX is used instead), and the subroutine operation ends at step 1222.

It is understood that the above-described embodiment is merely illustrative of the possible specific embodiments which may represent principles of the present invention. Other arrangements may readily be devised in accordance with these principles by those skilled in the art without departing from the scope of the invention. For example, instead of using the frame-to-frame correlation to determine the camera movement, a mechanical or opto-mechanical transducer, such as the shaft encoder 22 (FIGS. 3 and 9D), that generates an electrical pulse whenever the device has moved a certain fixed distance may be employed. Such a device could be employed with tracking wheel 24 to monitor movement or rotation of the wheel 24 or the shaft or axle 24A. Thus, in the embodiment described above, the input from the encoder 22 clocks an 8-bit counter in the status register 445 of FIG. 9D. At the end of each camera cycle, this shaft count is sent back to the central controller 50 along with other status information. The counter is cleared only by the system reset and, therefore, the count wraps around on each multiple of 256. The central controller calculates the difference between the current shaft count and the previous one to determine the total movement. If the current shaft count is less than the previous one (because the counter has wrapped around) then the total movement is (256+current count)−(previous count). The movement needed to generate one pulse from the encoder is predetermined, and is fixed such that fewer than 256 pulses are generated for the slowest frame cycle time. The shaft encoder may be used in combination with frame-to-frame correlation so that, upon detection of weak correlation or white space, the encoder may be employed to provide an actual movement value instead of using a DELTAX estimate.

What is claimed is:

1. An adaptive image acquisition system for optically scanning a media surface bearing static information in a particular direction and providing in real time a digital data representation of the scanned portion of the surface, comprising:
   a hand-held camera comprising an image sensor array of photosensitive pixel elements arranged in R rows and C columns;
   means for exposing said pixel elements for capturing sequential images of the portion of said media surface within the field of view of said imaging array;
   means for reading out from said imaging array resulting digital data values for said pixel elements to provide sequential frames of digital image data comprising C columns and R rows of data;
   means for real time processing of successive ones of said frames of image data to remove data therefrom which is redundant to image data in the preceding image frame, said means comprising:
      means for storing two successive frames of data, the initial frame known as the reference frame and the next frame known as the current frame;
      means for selecting a reference window defined by a subset of the pixel element values comprising said reference frame, said selecting means comprising means for adaptively determining said window size in dependence on the rate of relative movement between said imaging array and said media surface to decrease the size of said reference window as said rate increases; and
      means for accessing said storing means and comparing selected pixel element values comprising the current frame with the pixel element values comprising said reference window and determining which pixel element data of said current frame is redundant to the pixel element data comprising said reference window; and
   means for providing an output image frame data set for each acquired image frame which includes data representative of only the pixel element data determined to be non-redundant to the pixel element data of the next preceding image frame.

2. The adaptive image acquisition system of claim 1 wherein said comparing means comprises means for correlating current frame pixel values with those reference frame values within said reference window to determine the relative position of said reference window in relation to said current frame having the best match between corresponding pixel values of said reference window and current frame pixels.

3. The adaptive image acquisition system of claim 2 wherein said correlating means comprises a means for performing a one dimensional correlation between the pixel elements comprising selected compounds of said current frame and the corresponding pixel elements comprising columns comprising said reference window.

4. The adaptive image acquisition system of claim 3 wherein said hand-held camera further comprises at least one tracking wheel for contacting said surface and mounted for rotation substantially restricted to along said particular direction for inhibiting movement of said camera orthogonal to said direction.

5. The adaptive image acquisition system of claim 3 wherein said correlating means comprises:
   means for determining the number of corresponding pixel mismatches between said reference window and corresponding columns of said current frame for each of a number P of incrementally different alignment positions of said reference window and said current frame;
   means for searching the respective number of pixel mismatches for respective alignment positions to determine the alignment position having the fewest mismatches; and
   means for providing a value representing the offset of said window portion from said current image frame at said position having the fewest mismatches.

6. The adaptive image acquisition system of claim 1 wherein said means for reading out from said imaging array comprises a first reading means for reading only a first set of said pixel elements to provide image frames of a first relative resolution level, second means for reading said first set of pixel elements and a second set of pixel elements to provide image frames which are of higher resolution than said first resolution level, and means for selecting either said first reading means or said second reading means to selectively provide either image frames of said first resolution level or said second resolution level.

7. The adaptive image acquisition system of claim 6 wherein said first set of pixel elements comprises substantially one-half of the pixel elements comprising said imaging array, the pixel elements comprising said first set distributed over the area of said imaging array.

8. The adaptive image acquisition system of claim 7 wherein said second set of pixel elements comprises substantially all of the pixel elements of the imaging array which do not comprises said first set.

9. The adaptive image acquisition system of claim 6 wherein said reading means further comprises third reading means for providing image frames comprising substantially the same number of pixel values as said images provided by said first reading means, wherein each pixel value of said third reading means is the logical result of performing a logical OR function on a respective pixel element value of said first set and corresponding pixel element value of a pixel of said second set which is adjacent said pixel element of said first set, said third means for providing a data-compressed high resolution image.

10. An adaptive image acquisition system for optically scanning a media surface bearing static information in a particular direction and providing in real time a digital data representation of the scanned portion of the surface, comprising:

a hand-held camera comprising an image sensor array of photosensitive pixel elements arranged in R rows and C columns;

means for exposing said pixel elements during sequential exposure intervals of selectable duration for capturing sequential images of the portion of said media surface within the field of view of said array;

means for reading out from said imaging array after each exposure interval thereof resulting digital data values for said pixel elements to provide sequential frames of digital image data comprising C columns and R rows of data;

exposure control means for adaptively selecting the duration of said exposure intervals in dependence on the reflectivity of a background portion of said media surface, said exposure control means comprising means for acquiring a plurality of exposure measurement images of a background portion of said media surface with different exposure interval durations, and means for determining the number of black pixels in said respective images and processing said black pixel numbers to determine an exposure interval duration which yields a minimal number of black pixels for said background portion of said surface;

means for real time processing of successive ones of said frames of image data to remove data therefrom which is redundant to image data in the preceding image frame, said means comprising:

means for storing two successive frames of data, the initial frame known as the reference frame and the next frame known as the current frame;

means for selecting a reference window defined by a subset of the pixel element values comprising said reference frame; and means for accessing said storing means and comparing selected pixel element values comprising the current frame with the pixel element values comprising said reference window and determining which pixel element data of said current frame is redundant to the pixel element data comprising said reference window; and means for providing an output image frame data set for each acquired image frame which includes data representative of only the pixel element data determined to be non-redundant to the pixel element data of the next preceding image frame.

11. The adaptive image acquisition system of claim 10 wherein said exposure control means further comprises:

means for fixing a first target black pixel count $N_w$ equal to a predetermined small number of the total number of pixels in said array and a second target black pixel count $N_b$ equal to a predetermined large number of said total number of pixels;

means for determining the exposure interval duration $T_w$ required to provide a background image black pixel count substantially equal to said first target count $N_w$;

means for determining the exposure interval duration $T_b$ required to provide a background image black pixel count substantially equal to said second target count $N_b$; and means for calculating an optimum exposure duration $T_{opt}$ in dependence on said values $T_b$ and $T_w$.

12. The adaptive image acquisition system of claim 11 wherein said exposure control means further comprises an N-bit binary counter and a clock, and wherein the start count of said binary counter and the clock rate determine said exposure interval duration, and wherein said means for determining said interval duration comprises:

means for acquiring N image frames by separately testing, from the most significant bit to the least significant bit, each bit comprising the start count at the value "1," comparing the resulting image black pixel counter against the target value and setting the bit under test to "0" if the resulting count is less than the target value.

13. An adaptive image acquisition system for optically scanning a media surface bearing static information in a particular direction and providing in real time a digital data representation of the scanned portion of the surface, comprising:

an image sensor array of photosensitive pixel elements arranged in R rows and C columns;

means for exposing said pixel elements for capturing sequential images of the portion of said media surface within the field of view of said array;

means for reading out from said imaging array resulting digital data values for said pixel elements to provide sequential frames of digital image data comprising C columns and R rows of data;

means for real time processing of successive ones of said frames of image data to remove data therefrom which is redundant to image data in the preceding image frame, said means comprising:

means for storing two successive frames of data, the initial frame known as the reference frame and the next frame known as the current frame;

means for selecting a reference window of N image columns, where the number N is less than the number C of pixel columns;

means for adaptively determining the number N in dependence on the rate of relative movement between the image sensor array and said media surface to decrease the size of the reference window as the rate decreases; and means for accessing said storing means for comparing the pixel elements comprising selected columns of the current frame with the pixel elements comprising N selected columns of the reference frame within said reference window and determining which columns of pixel data of said current frame are redundant to corresponding columns of data within said reference window; and means for providing an output image frame data set for each acquired image which includes data representative of only those columns of pixel elements determined to be non-redundant to the columns of the next preceding image frame.

14. The adaptive image acquisition system of claim 13 wherein said exposing means is for exposing said pixel elements during sequential exposure intervals of selectable duration, and further comprising exposure selection means for adaptively selecting said exposure interval duration in accordance with the reflectivity of the particular medium surface and the sensitivity of said image sensor array.

15. The adaptive image acquisition system of claim 13 wherein said comparing means comprises means for correlating current frame pixel values with those reference frame values within said N column window to determine the relative column-wise position of said reference frame window in relation to said current frame having the best match between corresponding pixel values of said reference and current frame pixels.

16. The adaptive image acquisition system of claim 15 wherein said correlating means comprises a means for performing a one dimensional correlation between the pixel elements comprising selected columns of said current frame and the corresponding pixel elements comprising said columns comprising said reference window.

17. The adaptive image acquisition system of claim 16 wherein said image sensor array is contained within a hand-held camera body, and further comprising at least one tracking wheel mounted on said body for contacting said surface and mounted for rotation substantially restricted along said particular direction for inhibiting movement of said camera body orthogonal to said direction.

18. The adaptive image acquisition system of claim 15 wherein said correlating means comprises:
   means for determining the number of corresponding pixel mismatches between said reference window and corresponding columns of said current frame for each of a number P of incrementally different column-wise alignment positions of said reference window and said current frame;
   means for determining the alignment position having the fewest mismatches; and
   means for providing a value representing the column-wise offset of said window portion from said current image frame at said position having the fewest mismatches.

19. The adaptive image acquisition system of claim 13 wherein said means for reading out from said imaging array comprises a first reading means for reading only a first set of said pixel elements to provide image frames of first relative resolution level, second means for reading said first set of pixel elements and a second set of pixel elements to provide image frames which are of higher resolution than said first resolution level, and means for selecting either said first reading means or said second reading means to selectively provide either image frames of said first resolution level or said second resolution level.

20. The adaptive image acquisition system of claim 19 wherein said first set of pixel elements comprises substantially one-half of the pixel elements comprising said imaging array, the pixel elements comprising said first set distributed over the area of said imaging array.

21. The adaptive image acquisition system of claim 20 wherein said second set of pixel elements comprises substantially all of the pixel elements of the imaging array which do not comprises said first set.

22. The adaptive image acquisition system of claim 19 wherein said reading means further comprises third reading means for providing image frames comprising substantially the same number of pixel values as said images provided by said first reading means, wherein each pixel value of said third reading means is the logical result of performing a logic al OR function on a respective pixel element value of said first set and corresponding pixel element value of a pixel of said second set which is adjacent said pixel element of said first set, said third means for providing a data-compressed high resolution image.

23. The adaptive image acquisition system of claim 13 wherein said means for exposing said pixel elements comprises a scanner light source for illuminating said surface with illumination light during sequential illumination intervals, and wherein said pixel elements are responsive to illumination light reflected from said surface.

24. An adaptive image acquisition system for processing sequential frames of digital image data to remove redundant data, comprising:
   an optical camera means for providing sequential frames of digital image data, each frame representing a captured image of a portion of a surface bearing static information, each said frame comprising rows and columns of image pixel data;
   means responsive to a current image frame and the next preceding image frame for:
      (i) selecting a reference frame window size of N columns in relation to the current image frame, where the number N is adaptively selected in dependence on the relative rate of movement between said optical camera means and said surface;
      (ii) comparing selected columns of the current frame image data with the corresponding columns of said preceding frame image data within said reference frame window at a plurality P of alignment positions of the reference frame window, where the number P is selected in dependence on said relative rate of movement, and determining which columns of data of said current frame are redundant with corresponding columns of data of said preceding frame; and
      (iii) discarding said redundant columns and providing as a system output only those remaining columns of said current image frame.

25. A data compression method for processing sequential frames of digitized image data produced by a scanner moving in a predetermined direction in relation to a desired surface bearing static information, comprising a sequence of the following steps:
   (a) providing sequential image frames of digitized image pixel data of the portion of said surface within the field of view of said scanner, each frame comprising R rows and C columns of pixel data;
   (b) as the image frames are provided, storing the current frame and the next preceding reference frame in an addressable digital memory, the addresses for each frame addressable in the Y or row-wise dimension and in the X or column-wise dimension, where said predetermined movement direction is substantially aligned with said X dimension;
   (c) defining a reference frame window formed by N contiguous columns of said reference frame, where the value N is less than the value C, wherein the value N is adaptively determined in dependence on the rate of relative movement between the scanner and the surface to decrease the size of the reference window as the rate increases;

(d) for each of a plurality of contiguous column-wise alignment positions of said reference frame window in relation to contiguous columns of said current frame, comparing the corresponding respective pixel values in said respective current frame and reference frame window to determine the column-wise alignment position of said reference window in relation to said current frame providing the best match between corresponding pixels;

(e) from the best match position, determining which columns of pixel values comprising the current frame are redundant to columns of pixel data of the reference window and saving only the non-redundant columns of the current frame.

26. The method of claim 25 wherein said step (e) comprises:
   (i) determining the number (DELTAX) of pixel columns said reference window is offset from said current frame;
   (ii) saving the DELTAX value;
   (iii) repeating steps (d), e(i) and e(ii) for the next image frame provided, considering the new frame as the current frame and the frame previously considered the current frame as the reference frame, and discarding all columns of said reference frame except the DELTAX columns of said reference frame adjacent the leading edge of said reference frame.

27. The method of claim 25 wherein said step (d) comprises performing multiple-level, row-wise, column-wise and position-wise comparisons between respective current and reference window data operands, by:
   (i) fixing a frame row start value;
   (ii) fixing a frame column start value equal to the column address of the pixel column in the current data frame at the leading edge of said frame;
   (iii) iteratively comparing the current frame data operand defined by said start row and column addresses against each of the possible reference frame data operands which are aligned with said current data operand for the respective alignment positions to determine whether the pixels match, and accumulating said respective comparison results with the results of previous comparisons for the particular position in a position comparison results buffer;
   (iv) incrementally varying the column address and repeating step (iii) until all column addresses have been used;
   (v) incrementally varying the row address and repeating steps (iii) and (iv) until all row addresses have been used; and
   (vi) searching the accumulated comparison results for each alignment position to find the position providing the best match.

28. The method of claim 27 wherein said respective current frame and said next preceding reference frame are stored in a random access memory.

29. A method for sequentially acquiring digitized images of a surface bearing static information, comprising a sequence of the following steps:
   (a) providing an optical scanner having an image sensor array of photosensitive pixel elements arranged in R rows and C columns, the rows extending substantially along the X axis and the columns substantially along the Y axis in a Cartesian coordinate system;
   (b) imparting relative motion between the optical scanner and said surface substantially in a predetermined direction along the X axis;
   (c) sequentially exposing the image sensor array for an exposure duration and then reading the values of the pixel elements to provide a sequential series of digitized image data frames of the portion of the surface within the field of view of said scanner;
   (d) correlating each image data frame with a reference frame data window formed by a plurality N of contiguous columns of pixel data values of the preceding frame, where N is less than C, to determine the degree of overlap between the successive image frames and determine a variable value DELTAX representing the number of non-redundant columns for the particular image frame, wherein the value N is adaptively determined in dependence on the rate of relative movement between the image sensor array and the surface to decrease the size of the reference window as the rate increases; and
   (e) after the particular image frame has been correlated against the next successive image frame, discarding the (C-DELTAX) columns of image pixel data determined to have been redundant in step (d) and storing only the remaining DELTAX columns of pixel data for that image frame.

30. The method of claim 29 wherein said step (d) of correlating each image data frame comprises:
   (i) aligning said reference window with contiguous columns of the particular image frame at a plurality P of incrementally varied alignment positions;
   (ii) for each position, making a bit-wise comparison of the respective values of the corresponding pixel element values for the reference window and image frame;
   (iii) determining which alignment position results in the best match between the reference window and image frame; and
   (iv) determining the value DELTAX as the displacement in columns of said best match alignment position from a predetermined edge of the image frame.

31. The method of claim 28 further comprising the step of determining whether each image is of only the media surface background, and setting the value DELTAX to an estimated value when the image is of only the media background.

32. The method of claim 31 wherein said background determining step comprises:
   (i) setting the exposure interval to a predetermined exposure time;
   (ii) determining the number of black pixels in the image frame;
   (iii) comparing the number of black pixels to a predetermined threshold value; and
   (iv) declaring that the image is of only the media background if said black pixel number is less than said threshold value.

33. The method of claim 31 wherein said background determining step comprises:
   (i) determining the amount of blackness in the image frame;
   (ii) comparing the determined blackness amount against a predetermined threshold value; and (iii) declaring that the image frame is of only the media background is said determined blackness amount is less than said threshold value.

34. The method of claim 31 wherein said step of setting the value DELTAX to an estimated value comprises setting the value DELTAX to the particular calculated DELTAX value for the last image frame which was not solely of background.

35. The method of claim 30 wherein said step of making a bit-wise determination of said respective values comprises determining the number of pixel value mismatches between corresponding pixel element values for the reference window and image frame, and said step of determining which alignment position results in the best match comprises selecting the alignment position having the fewest number of mismatches.

36. The method of claim 35 further comprising the steps of:
   determining the average number of pixel mismatches per alignment position;
   comparing the number of pixel mismatches of the best match alignment position with said average mismatch number; and
   if the number of pixels for the best match position does not exceed said average number by at least a predetermined threshold value, maintaining the value DELTAX as the value used for the next preceding image frame.

37. The method of claim 29 further comprising the steps of determining whether said DELTAX value equals or exceeds a predetermined maximum value, and if so, indicating that an error condition exists and terminating said correlation.

38. An adaptive image acquisition system for optically scanning across a media surface bearing static information in a predetermined scan direction and providing a digital data representation of the scanned portion of the surface, comprising:
   a hand-held optical scanner comprising an image sensor array of photosensitive pixel elements arranged in R rows and C columns, and means for exposing said pixel elements to the media surface during sequential exposure intervals for capturing sequential images of the portion of said medium surface within the field of view of said array, said rows of elements extending generally in the direction of said scan direction and said columns extending generally orthogonally to said scan direction;
   an image frame buffer memory coupled to said imaging array for buffering digitized representations of a plurality of said images;
   a video processor coupled to said optical scanner and said buffer memory for providing control signals to said imaging array and said exposing means for controlling the start and duration of said exposure intervals, for reading out from said imaging array after each exposure interval resulting digital data values for said pixel elements to sequentially provide said digitized representations of said images, and for storing said digitized representations of a plurality of sequential images at selected memory locations within said buffer memory; and
   a central controller coupled to said video processor to control said video processor operations and receive from said video processor compressed digital data representing the non-redundant portions of the sequential images captured by the scanner;
   said video processor and said central controller being cooperatively arranged to provide a means for performing a one-dimensional correlation along said scan direction between each image frame and a selectable window portion of the next preceding image frame comprising N columns thereof to identify redundant columns of pixel data appearing in both said image frame and said selectable window portion, and to provide said compressed digital data to said controller representing only non-redundant image data.

39. The system of claim 38 wherein said means for exposing said pixel elements comprises a scanner light source for illuminating said surface with illumination light during said illumination intervals.

40. The system of claim 38 wherein said means for performing a one-dimensional correlation comprises:
   means for determining said number of corresponding pixel mismatches between said window portion and the image frame for each of a number P of incrementally different column-wise alignment positions of the window portion and the image frame;
   means for determining the position having the fewest mismatches; and
   means for providing an offset value representing the column-wise offset of said window portion from said image frame at said position having the fewest mismatches.

41. The system of claim 38 wherein said frame buffer memory comprises memory locations for storing three successive image frames, the most recently acquired or "new" frame, the next preceding or "current" frame and the second preceding or "reference" frame, and wherein said video processor comprises:
   means responsive to the termination of the exposure interval for sequentially accessing said frame buffer memory and fetching a selected data operand comprising said current frame and a selected data operand comprising said portion of said preceding frame;
   means for buffering a variable number of said selected window operands at selected locations in a reference window buffer, the number thereof dependent on the number of different reference window operands to which said image frame operand will be compared at each of the alignment positions;
   means for generating buffer addresses for selectively accessing the window operands stored in said buffering means;
   means for sequentially comparing said image frame operand to each of said varying number of buffered reference window operands to determine whether said operands match, and to provide a comparison result value indicating a mismatch for each of said window operands;
   read/write comparison results buffer memory having at least P memory locations, one for each alignment position;
   means for generating read addresses and write addresses for said results buffer memory, said means synchronized with the operation of said comparing means for addressing the buffer memory location corresponding to the same position as said comparison result value;
   means coupled to said comparing means and said results buffer memory for accumulating said respective comparison result value with the value stored in the corresponding position memory location of said results buffer memory; and means responsive to a signal indicating that the comparison between said window portion and said image frame is complete for subsequentially transferring said accumulated comparison result values from said results buffer memory to said central controller.

42. The system of claim 40 wherein central controller adaptively determines the number of columns N comprising said reference window in dependence on said offset value, wherein said value N varies between predetermined minimum and maximum values and decreases with increasing offset values.

43. The system of claim 40 wherein said central controller adaptively determines the number of alignment positions P in dependence on said offset value, wherein said value P varies between predetermined minimum and maximum values.

44. The system of claim 38 wherein said optical scanner further comprises at least one tracking wheel for contacting said surface and mounted for rotation substantially restricted along said scan direction for inhibiting movement of said optical scanner orthogonal to said scan direction.

45. The system of claim 38 wherein said central controller comprises an image buffer memory for assembling and storing said compressed digital data as a composite image representation of the portion of said surface scanned by said scanner.

46. The system of claim 45 wherein said central controller is remote from said video processor, and further comprising a serial data interface between said video processor and said central controller for transferring said compressed digital data, wherein said serial data interface comprises:

a first serial data path for carrying sequential packets of serial data comprising compressed digital data; and a second serial data path for carrying sequential packets of control data, each respective packet of control data identifying a corresponding packet of serial data carried over said first data path.

47. Apparatus for sequentially acquiring digitized images of a surface bearing static information, comprising:

a handheld optical scanner having an image sensor array of photosensitive pixel elements arranged in R rows and C columns, the rows extending substantially along the X axis and the columns substantially along the Y axis in a Cartesian coordinate system;

means for sequentially exposing the image sensor array for an exposure duration and then reading the values of the pixel elements to provide a sequential series of digitized image data frames;

means for determining the effective spatial position of one data frame to the next frame in relation to said surface;

means responsive to said spatial position means for determining the data in the each frame which is not redundant to the data in the preceding frame, said means comprising means for adaptively selecting a reference window of N rows of the data in the preceding frame, the size N being adaptively selected in dependence on the rate of relative movement between the sensor array and the surface so as to reduce the size N as the rate increases, and means for comparing the reference frame data and next framed data for determining the non-redundant data; and means for buffering said non-redundant data with the non-redundant data from previous frames, to assemble a composite image of said surface.

48. The apparatus of claim 47 wherein said hand-held camera comprises a tracking wheel mounted on an axle for contacting said surface and rotating as said scanner moves in relation to said surface, and said means for determining the effective spatial position of said data frames comprises a means for measuring said movement, said movement comprising an encoder device for providing electrical signals indicative of rotation of said wheel by predetermined amounts.

49. An adaptive image acquisition system for optically scanning a media surface in a particular direction and providing in real time a compressed digital data representation of the scanned portion of the surface, comprising:

a hand-held camera comprising an image sensor array of photosensitive pixel elements arranged in R rows and C columns;

means for exposing said pixel elements during sequential exposure intervals of selectable duration for capturing sequential images of the portion of said medium surface within the field of view of said array;

means for reading out from said imaging array after each exposure interval thereof resulting digital data values for said pixel elements to provide sequential frames of digital image data comprising C columns and R rows of data;

means for real time processing of successive ones of said frames of image data to remove data therefrom which is redundant to image data in the preceding image frame, said means comprising:

means for storing two successive frames of data, the initial frame known as the reference frame and the next frame known as the current frame;

means for selecting a reference window comprising a subset of the pixel element values comprising said reference frame;

means for adaptively determining the size of said reference window in dependence on the rate of relative movement between said imaging array and said media surface to decrease the size of said reference window as said rate increases; and means for accessing said storing means and comparing selected pixel element values comprising the current frame with the pixel element values comprising said reference window and determining which pixel element data of said current frame is redundant to the pixel element data comprising said reference window; and means for providing an output image frame data set for each acquired image frame which includes data representative of only the pixel element data determined to be non-redundant to the pixel element data of the next preceding image frame.

50. An adaptive image acquisition system for optically scanning a media surface in a particular direction and providing in real time a compressed digital data representation of the scanned portion of the surface, comprising:

an image sensor array of photosensitive pixel elements arranged in R rows and C columns;

means for exposing said pixel elements during sequential exposure intervals of selectable duration for capturing sequential images of the portion of said medium surface within the field of view of said array;

means for reading out from said imaging array after each exposure interval thereof resulting digital data values for said pixel elements to provide sequential frames of digital image data comprising C columns and R rows of data;

means for real time processing of successive ones of said frames of image data to remove data therefrom which is redundant to image data in the preceding image frame, said means comprising:

means for storing two successive frames of data, the initial frame known as the reference frame and the next frame known as the current frame;

means for selecting a reference window of N image columns, where the number N is less than the number C of pixel columns;

means for adaptively determining the size of said reference window in dependence on the rate of relative movement between said imaging array and said media surface to decrease the size of said reference window as said rate increases; and means for accessing said storing means for comparing the pixel elements comprising selected columns of the current frame with the pixel elements comprising N selected columns of the reference frame within said reference window and determining which columns of pixel data of said current frame are redundant to corresponding columns of data within said reference window; and means for providing an output image frame data set for each acquired image which includes data representative of only those columns of pixel elements determined to be non-redundant to the columns of the next preceding image frame.

51. The adaptive image acquisition system of claim 50 wherein said processing means further comprises means for providing a data signal indicative of the number of non-redundant frame columns determined by said comparing means, and wherein said window size determining means is responsive to said data signal.

52. A method for sequentially acquiring digitized images of an information bearing surface, comprising a sequence of the following steps:

(a) providing an optical scanner having an image sensor array of photosensitive pixel elements arranged in R rows and C columns, the rows extending substantially along the X axis and the columns substantially along the Y axis in a Cartesian coordinate system;

(b) imparting relative motion between the optical scanner and the information bearing surface substantially in a predetermined direction along the X axis;

(c) sequentially exposing the image sensor array for an exposure duration and then reading the values of the pixel elements to provide a sequential series of digitized image data frames;

(d) correlating each image data frame with a reference frame data window comprising a plurality N of contiguous columns of pixel data values of the preceding frame, where N is less than C, to determine the degree of overlap between the successive image frames and determine a variable value DELTAX representing the number of non-redundant columns for the particular image frame; and (e) adaptively selecting the size N of the reference window used in correlation the next successive image frame in dependence on the magnitude of the variable value DELTAX, such that the value N has a minimum value and increases with decreasing values of DELTAX to a maximum window size which is less than the number of pixel element columns in the image frame, and (f) after the particular image frame has been correlated against the next successive image frame, discarding the (C-DELTAX) columns of image pixel data determined to have been redundant in step (d) and storing only the remaining DELTAX columns of pixel data for that image frame.

53. A method for sequentially acquiring digitized images of an information bearing surface, comprising a sequence of the following steps:

(a) providing an optical scanner having an image sensor array of photosensitive pixel elements arranged in R rows and C columns, the rows extending substantially along the X axis and the columns substantially along the Y axis in a Cartesian coordinate system;

(b) imparting relative motion between the optical scanner and the information bearing surface substantially in a predetermined direction along the X axis;

(c) sequentially exposing the image sensor array for an exposure duration and then reading the values of the pixel elements to provide a sequential series of digitized image data frames;

(d) adaptively selecting a reference frame data window comprising a plurality N of contiguous columns of pixel data values of the preceding frame, where N is less than C, in dependence on the magnitude of said relative motion, such that the size N of the window increases as the magnitude of the motion decreases;

(e) correlating each image data frame with said reference frame data window to determine the degree of overlap between the successive image frames and determine a variable value DELTAX representing the number of non-redundant columns for the particular image frame; and (f) after the particular image frame has been correlated against the next successive image frame, discarding the (C-DELTAX) columns of image pixel data determined to have been redundant in step (d) and storing only the remaining DELTAX columns of pixel data for that image frame.

* * * * *